(12) United States Patent
Brendel et al.

(10) Patent No.: US 9,251,960 B2
(45) Date of Patent: Feb. 2, 2016

(54) DUAL STAGE EMI FILTER AND OFFSET HIGHLY EFFICIENT MULTI-POLAR ACTIVE CAPACITOR ELECTRODES FOR AN ACTIVE IMPLANTABLE MEDICAL DEVICE

(75) Inventors: Richard L. Brendel, Carson City, NV (US); Robert A. Stevenson, Canyon Country, CA (US)

(73) Assignee: Greatbatch Ltd., Clarence, NY (US)

( * ) Notice: Subject to any disclaimer, the term of this patent is extended or adjusted under 35 U.S.C. 154(b) by 577 days.

(21) Appl. No.: 13/547,484

(22) Filed: Jul. 12, 2012

(65) Prior Publication Data
US 2013/0070387 A1   Mar. 21, 2013

Related U.S. Application Data

(63) Continuation-in-part of application No. 13/401,608, filed on Feb. 21, 2012, which is a continuation-in-part of application No. 12/407,402, filed on Mar. 19, 2009, now Pat. No. 8,195,295.

(60) Provisional application No. 61/535,554, filed on Sep. 16, 2011, provisional application No. 61/535,587, filed on Sep. 16, 2011.

(51) Int. Cl.
*H01G 4/35* (2006.01)
(52) U.S. Cl.
CPC ...................... *H01G 4/35* (2013.01)
(58) Field of Classification Search
USPC .............................................. 607/37; 361/302
See application file for complete search history.

(56) References Cited

U.S. PATENT DOCUMENTS

| | | |
|---|---|---|
| 4,152,540 A | 5/1979 | Duncan et al. |
| 4,247,881 A | 1/1981 | Coleman |
| 5,333,095 A | 7/1994 | Stevenson et al. |
| 5,650,759 A | 7/1997 | Hittman et al. |
| 5,751,539 A | 5/1998 | Stevenson et al. |
| 5,896,267 A | 4/1999 | Hittman et al. |
| 5,905,627 A | 5/1999 | Brendel et al. |
| 6,008,980 A | 12/1999 | Stevenson et al. |
| 6,529,103 B1 | 3/2003 | Brendel et al. |
| 6,765,779 B2 | 7/2004 | Stevenson et al. |
| 6,765,780 B2 | 7/2004 | Brendel et al. |
| 7,035,076 B1 * | 4/2006 | Stevenson .................. 361/302 |

* cited by examiner

*Primary Examiner* — Nicole F Lavert
(74) *Attorney, Agent, or Firm* — Michael F. Scalise

(57) ABSTRACT

A multipolar feedthrough filter capacitor assembly for an active implantable medical device includes a feedthrough filter capacitor including a first active electrode plate, a second active electrode plate and a plurality of ground electrode plates. The plates are in spaced parallel relation disposed within a monolithic dielectric substrate where the first and second active electrode plates are disposed between the plurality of ground electrode plates. A first conductive terminal pin is disposed through the feedthrough filter capacitor electrically coupled to the first active electrode plate and in non-conductive relation to both the second active electrode plate and ground electrode plate. A second conductive terminal pin may be disposed through the feedthrough filter capacitor electrically coupled to the second active electrode plate and in non-conductive relation to both the first active electrode plate and ground electrode plate.

85 Claims, 36 Drawing Sheets

$$C = \frac{kA(n-1)}{d}$$

Where:

C = Capacitance
k = Dielectric Constant
n = Number of Electrode Plates
d = Dielectric Thickness

FIG. 26

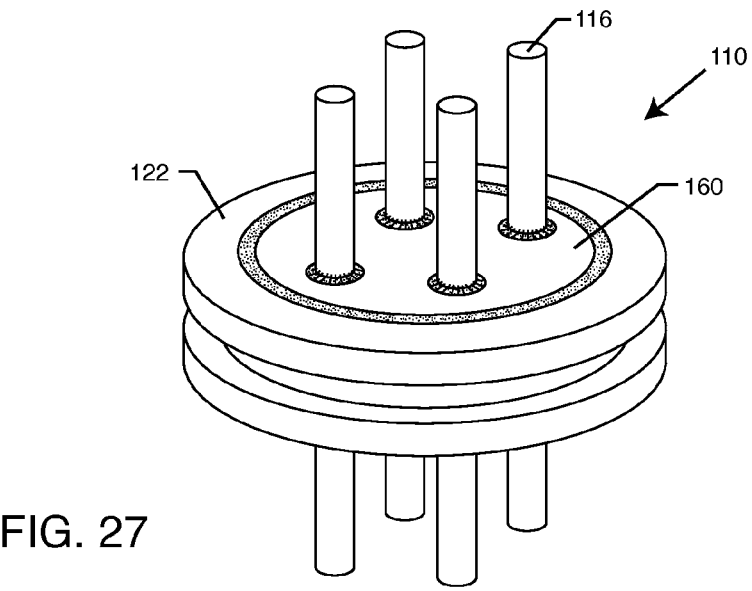
FIG. 27
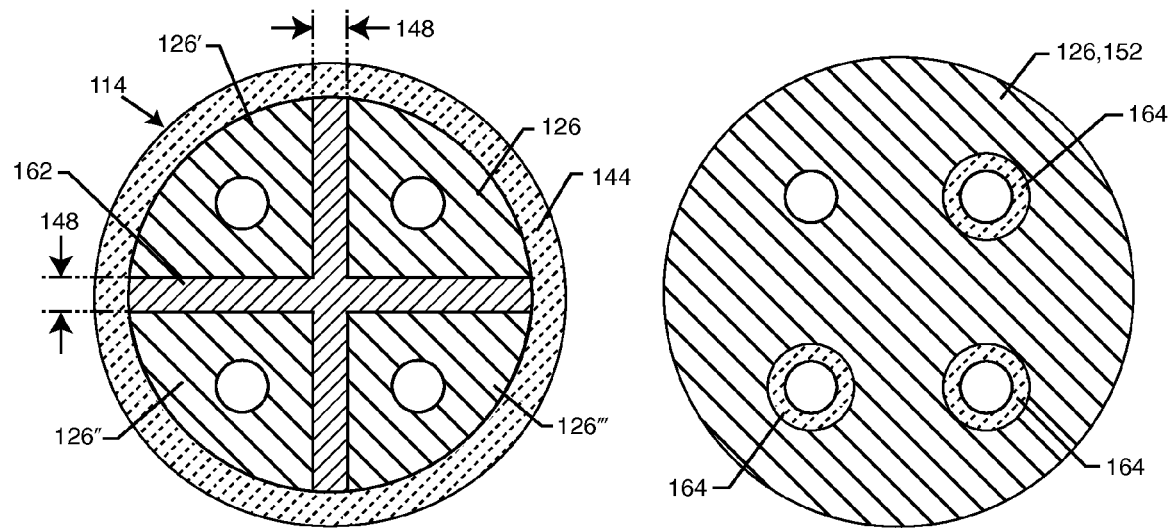
FIG. 28
PRIOR ART
FIG. 29

DUAL STAGE EMI FILTER AND OFFSET HIGHLY EFFICIENT MULTI-POLAR ACTIVE CAPACITOR ELECTRODES FOR AN ACTIVE IMPLANTABLE MEDICAL DEVICE

CROSS-REFERENCE TO RELATED APPLICATIONS

This non-provisional patent application claims priority from U.S. Provisional Application Nos. 61/535,554, filed on Sep. 16, 2011 and also 61/535,587 also filed on Sep. 16, 2011, and also claims priority as a Continuation-In-Part Patent Application of Ser. No. 13/401,608 filed on Feb. 21, 2012 which was itself a Continuation-In-Part Patent Application of Ser. No. 12/407,402 filed on Mar. 19, 2009 now U.S. Pat. No. 8,195,295 issued on Jun. 5, 2012, the contents of which all applications are fully incorporated herein with this reference.

DESCRIPTION

1. Field of the Invention

The present invention generally relates to active implantable medical devices (AIMDs) and to feedthrough filter capacitors. More particularly, the present invention relates to a dual stage EMI filter and offset highly efficient multi-polar active capacitor electrodes for an active implantable medical device, wherein a portion of the dual stage EMI filter resides in capacitor electrode plates that are embedded within an insulator of an AIMD hermetic seal.

2. Background of the Invention

A wide assortment of implantable medical devices are presently known and in commercial use. Such devices include cardiac pacemakers, cardiac defibrillators, cardioverters, neurostimulators, and other devices for delivering and/or receiving electrical signals to/from a portion of the body. Sensing and/or stimulating leads extend from the associated implantable medical device to a distal tip electrode or electrodes in contact with body tissue.

One problem associated with implanted leads is that they act as an antenna and tend to pick up stray electromagnetic signals from the surrounding patient environment. This is particularly problematic in an MRI environment where the currents imposed on the leads can cause the leads to heat to the point where tissue damage is likely. Moreover, the currents developed in the leads during an MRI procedure can disrupt or damage the sensitive electronics within the implantable medical device. Bandstop filters, such as those described in U.S. Pat. No. 6,008,980, which is herein incorporated by reference, reduce or eliminate the transmission of damaging frequencies along the leads while allowing the desired biologic frequencies to pass efficiently through.

In general, a feedthrough capacitor EMI filter may be disposed at, near or within the feedthrough hermetic terminal resulting in a feedthrough filter capacitor which diverts high frequency electrical signals from a lead conductor(s) to the housing or case of an AIMD. Feedthrough hermetic terminals are generally well-known in the art for connecting electrical signals through the housing or case of an AIMD. For example, in implantable medical devices such as cardiac pacemakers, implantable cardioverter defibrillators, and the like, a hermetic terminal comprises one or more conductive terminal pins supported by an insulative structure for feedthrough passage from the exterior to the interior of an AIMD electromagnetic shield housing. Many different insulator structures and related mounting methods are known in the art for use in AIMDs, wherein the insulative structure also provides a hermetic seal to prevent entry of body fluids into the housing of the AIMD. However, the feedthrough terminal pins are typically connected to one or more lead wires which effectively act as an antenna and thus tend to collect stray EMI signals for transmission into the interior of the medical device. In the prior art devices, the hermetic terminal pin subassembly has been combined in various ways with a ceramic feedthrough filter capacitor to decouple interference signals to the housing of the medical device.

In a typical prior art unipolar construction (as described in U.S. Pat. No. 5,333,095 and herein incorporated by reference), a round/discoidal (or rectangular) ceramic feedthrough filter capacitor is combined with a hermetic terminal pin assembly to suppress and decouple undesired interference or noise transmission along a terminal pin. The feedthrough capacitor is coaxial having two sets of electrode plates embedded in spaced relation within an insulative dielectric substrate or base, formed typically as a ceramic monolithic structure. One set of the electrode plates are electrically connected at an inner diameter cylindrical surface of the coaxial capacitor structure to the conductive terminal pin utilized to pass the desired electrical signal or signals. The other or second set of electrode plates are coupled at an outer diameter surface of the round/discoidal capacitor to a cylindrical ferrule of conductive material, wherein the ferrule is electrically connected in turn to the conductive housing of the electronic device. The number and dielectric thickness spacing of the electrode plate sets varies in accordance with the capacitance value and the voltage rating of the coaxial capacitor. The outer feedthrough capacitor electrode plate sets (or "ground" plates) are coupled in parallel together by a metallized layer which is either fired, sputtered or plated onto the ceramic capacitor. This metallized band, in turn, is coupled to the ferrule by conductive adhesive, soldering, brazing, welding, or the like. The inner feedthrough capacitor electrode plate sets (or "active" plates) are coupled in parallel together by a metallized layer which is either glass frit fired or plated onto the ceramic capacitor. This metallized band, in turn, is mechanically and electrically coupled to the lead wire(s) by conductive adhesive, soldering, or the like. In operation, the coaxial capacitor permits passage of relatively low frequency biologic signals along the terminal pin, while shielding and decoupling/attenuating undesired interference signals of typically high frequency to the AIMD conductive housing. Feedthrough capacitors of this general type are available in unipolar (one), bipolar (two), tripolar (three), quadpolar (four), pentapolar (five), hexpolar (6) and additional lead configurations. The feedthrough capacitors (in both discoidal and rectangular configurations) of this general type are commonly employed in implantable cardiac pacemakers and defibrillators and the like, wherein the pacemaker housing is constructed from a biocompatible metal such as titanium alloy, which is electrically and mechanically coupled to the ferrule of the hermetic terminal pin assembly which is in turn electrically coupled to the coaxial feedthrough filter capacitor. As a result, the filter capacitor and terminal pin assembly prevents entrance of interference signals to the interior of the pacemaker housing, wherein such interference signals could otherwise adversely affect the desired cardiac pacing or defibrillation function.

Although feedthrough filter capacitor assemblies of the type described above have performed in a generally satisfactory manner, the associated manufacturing and assembly costs are unacceptably high. The choice of the dielectric material for the capacitor has significant impacts on cost and final performance of the feedthrough filter capacitor. Alumina ceramic has not been used in the past as the dielectric material for AIMD feedthrough capacitors. Alumina ceramic is structurally strong and biocompatible with body fluids but has a dielectric constant around 6 (less than 10). There are other more effective dielectric materials available for use in feedthrough filter capacitor designs. Relatively high dielectric constant materials (for example, barium titanate with a dielectric constant of over 2,000) are traditionally used to manufacture AIMD feedthrough capacitors for integrated ceramic capacitors and hermetic seals resulting in more effective capacitor designs. Yet ceramic dielectric materials such as barium titanate are not as strong as the alumina ceramic typically used to manufacture the hermetic seal subassembly in the prior art. Barium titanate is also not biocompatible with body fluids. Direct assembly of the ceramic capacitor results in stress to the capacitor due to the mismatch in thermal coefficients of expansion between the titanium pacemaker housing (or other metallic structures) and the capacitor dielectric. Particular care must be used to avoid cracking of the capacitor element. Accordingly, the use of dielectric materials with a low dielectric constant and a relatively high modulus of toughness are desirable yet still difficult to achieve for capacitance-efficient designs.

Accordingly, there is a need for a novel AIMD feedthrough filter capacitor hermetic seal assembly that addresses the drawbacks noted above in connection with the prior art. In particular, there is a need for a highly efficient multi-polar feedthrough filter capacitor which utilizes a strong, brazeable and biocompatible dielectric. The present invention fulfills these needs and provides other related advantages.

SUMMARY OF THE INVENTION

An exemplary embodiment of the present invention includes a multipolar feedthrough filter capacitor assembly for an active implantable medical device. A feedthrough filter capacitor includes a first active electrode plate disposed parallel to a ground electrode plate which is disposed parallel to a second active electrode plate. The plates are disposed within a dielectric substrate. A conductive ferrule is electrically coupled to the ground electrode plate. A first hermetic seal is between the conductive ferrule and the feedthrough filter capacitor. A first passageway is disposed through the feedthrough filter capacitor disposed perpendicular to the plates. A second passageway is disposed through the feedthrough filter capacitor disposed perpendicular to the plates. A first conductive terminal pin is disposed through the first passageway electrically coupled to the first active electrode plate and in non-conductive relation to both the second active electrode plate and ground electrode plate. A second hermetic seal is between the first conductive terminal pin and the feedthrough filter capacitor. A second conductive terminal pin is disposed through the second passageway electrically coupled to the second active electrode plate and in non-conductive relation to both the first active electrode plate and ground electrode plate. A third hermetic seal is between the second conductive terminal pin and the feedthrough filter capacitor.

The first and second conductive terminal pins may be in non-conductive relation to the conductive ferrule. The conductive ferrule may be circumferentially disposed about the feedthrough filter capacitor. The feedthrough filter capacitor may be disposed substantially within the conductive ferrule. The ground electrode plate may include a plurality of ground electrode plates. The first and second active electrode plates may be disposed between the plurality of ground electrode plates. The dielectric substrate may include a monolithic dielectric substrate. The monolithic dielectric substrate of the feedthrough filter capacitor may include alumina. The feedthrough filter capacitor substrate may include a dielectric constant including a value below 10.

A secondary capacitor may be electrically coupled between the conductive ferrule and either the first or second conductive terminal pins. The secondary capacitor may include a secondary dielectric constant including a value above 10, 100 or 1,000. The secondary capacitor may include a dielectric substrate including barium titanate. The secondary capacitor may include a monolithic chip capacitor. The secondary capacitor may be directly attached to the conductive ferrule. The secondary capacitor may be disposed on a circuit board inside the active implantable medical device utilizing the multipolar feedthrough filter capacitor assembly. The secondary capacitor may be not directly attached to the conductive ferrule.

The feedthrough filter capacitor may be defined including a body fluid side and a device side, wherein both the body fluid side and the device side are biocompatible.

Another exemplary embodiment of the present invention may include a multipolar feedthrough filter capacitor assembly for an active implantable medical device including a feedthrough filter capacitor including a first active electrode plate disposed parallel to a ground electrode plate which is disposed parallel to a second active electrode plate. The plates may be disposed within a dielectric substrate. A conductive ferrule may be electrically coupled to the ground electrode plate. A hermetic seal may be formed between the conductive ferrule and the feedthrough filter capacitor. A first passageway may be disposed through the feedthrough filter capacitor disposed perpendicular to the plates. A second passageway may be disposed through the feedthrough filter capacitor disposed perpendicular to the plates. A first conductive terminal pin may be disposed through the first passageway electrically coupled to the first active electrode plate and in non-conductive relation to both the second active electrode plate and ground electrode plate. A second conductive terminal pin may be disposed through the second passageway electrically coupled to the second active electrode plate and in non-conductive relation to both the first active electrode plate and ground electrode plate.

The first and second conductive terminal pins may be in non-conductive relation to the conductive ferrule. The conductive ferrule may be circumferentially disposed about the feedthrough filter capacitor. The feedthrough filter capacitor may be disposed substantially within the conductive ferrule. The ground electrode plate may include a plurality of ground electrode plates. The first and second active electrode plates may be disposed between the plurality of ground electrode plates. A second hermetic seal may be between the first conductive terminal pin and the feedthrough filter capacitor. A third hermetic seal may be between the second conductive terminal pin and the feedthrough filter capacitor.

The dielectric substrate may include a monolithic dielectric substrate. The monolithic dielectric substrate of the feedthrough filter capacitor may include alumina. The feedthrough filter capacitor substrate may include a dielectric constant including a value below 10.

A secondary capacitor may be electrically coupled between the conductive ferrule and either the first or second conductive terminal pins. The secondary capacitor may include a secondary dielectric constant including a value above 1000. The secondary capacitor may include a dielectric substrate including barium titanate. The secondary capacitor may include a monolithic chip capacitor. The secondary capacitor may be directly attached to the conductive ferrule. The secondary capacitor may be disposed on a circuit board inside the active implantable medical device utilizing the multipolar feedthrough filter capacitor assembly. The secondary capacitor may be not directly attached to the conductive ferrule. The feedthrough filter capacitor may be defined including a body fluid side and a device side, wherein both the body fluid side and the device side are biocompatible.

Another exemplary embodiment of the present invention may include a multipolar feedthrough filter capacitor assembly for an active implantable medical device including a feedthrough filter capacitor including a first active electrode plate, a second active electrode plate and a plurality of ground electrode plates. The plates may be in spaced parallel relation disposed within a monolithic dielectric substrate where the first and second active electrode plates are disposed between the plurality of ground electrode plates. A first conductive terminal pin or first metallization may be disposed through the feedthrough filter capacitor electrically coupled to the first active electrode plate and in non-conductive relation to both the second active electrode plate and ground electrode plate. A second conductive terminal pin or second metallization may be disposed through the feedthrough filter capacitor electrically coupled to the second active electrode plate and in non-conductive relation to both the first active electrode plate and ground electrode plate.

A conductive ferrule may be electrically coupled to the plurality of ground electrode plates. The first and second conductive terminal pins or metallizations may be in non-conductive relation to the conductive ferrule. A hermetic seal may be between the conductive ferrule and the feedthrough filter capacitor. A second hermetic seal may be between the first conductive terminal pin or first metallization and the feedthrough filter capacitor. A third hermetic seal may be between the second conductive terminal pin or second metallization and the feedthrough filter capacitor.

The conductive ferrule may be circumferentially disposed about the feedthrough filter capacitor. The feedthrough filter capacitor is disposed substantially within the conductive ferrule. A conductive housing may be electrically coupled to the plurality of ground electrode plates. The first and second conductive terminal pins or metallizations may be in non-conductive relation to the conductive housing. A hermetic seal may be between the conductive housing and the feedthrough filter capacitor. A second hermetic seal may be between the first conductive terminal pin or first metallization and the feedthrough filter capacitor. A third hermetic seal may be between the second conductive terminal pin or second metallization and the feedthrough filter capacitor.

The conductive housing may include an active implantable medical device housing. The monolithic dielectric substrate of the feedthrough filter capacitor may include alumina. The feedthrough filter capacitor substrate may include a dielectric constant including a value below 10.

A secondary capacitor may be electrically coupled between the conductive ferrule and either the first or second conductive terminal pins. The secondary capacitor may include a dielectric substrate including barium titanate. The secondary capacitor includes a monolithic chip capacitor. The secondary capacitor may be directly attached to the conductive ferrule. The secondary capacitor may be disposed on a circuit board inside the active implantable medical device utilizing the multipolar feedthrough filter capacitor assembly. The secondary capacitor may be not directly attached to the conductive ferrule.

The feedthrough filter capacitor may be defined including a body fluid side and a device side, wherein both the body fluid side and the device side are biocompatible.

Another exemplary embodiment of the present invention may include a multipolar feedthrough filter capacitor assembly for an active implantable medical device including a feedthrough filter capacitor including a first active electrode plate disposed parallel to a ground electrode plate which is disposed parallel to a second active electrode plate. The plates may be disposed within a dielectric substrate. A conductive ferrule may be in conductive relation with the ground electrode plate. A first hermetic seal may be between the conductive ferrule and the feedthrough filter capacitor. A first, second and third passageway may be disposed through the feedthrough filter capacitor disposed perpendicular to the plates. A first conductive terminal pin may be disposed through the first passageway electrically coupled to the first active electrode plate and in non-conductive relation to both the second active electrode plate and ground electrode plate. A second hermetic seal may be between the first conductive terminal pin and the feedthrough filter capacitor. A second conductive terminal pin may be disposed through the second passageway electrically coupled to the second active electrode plate and in non-conductive relation to both the first active electrode plate and ground electrode plate. A third hermetic seal may be between the second conductive terminal pin and the feedthrough filter capacitor. A ground conductive terminal pin may be disposed through the third passageway electrically coupled to the ground electrode plate and the conductive ferrule and in non-conductive relation to both the first and second active electrode plates. A fourth hermetic seal may be between the ground conductive terminal pin and the feedthrough filter capacitor.

The monolithic dielectric substrate of the feedthrough filter capacitor may include alumina. The feedthrough filter capacitor substrate may include a dielectric constant including a value below 10.

A secondary capacitor may be electrically coupled between the conductive ferrule and either the first or second conductive terminal pins. The secondary capacitor may include a secondary dielectric constant including a value above 1000. The secondary capacitor may include a dielectric substrate including barium titanate.

The feedthrough filter capacitor may be defined including a body fluid side and a device side, wherein both the body fluid side and the device side are biocompatible.

Another exemplary embodiment of the present invention may include a multipolar feedthrough filter capacitor assembly for an active implantable medical device including a feedthrough filter capacitor including a first active electrode plate, a second active electrode plate and a plurality of ground electrode plates. The plates may be in spaced parallel relation disposed within a monolithic dielectric substrate, wherein the first and second active electrode plates are disposed between the plurality of ground electrode plates. A conductive ferrule may be in conductive relation with the plurality of ground electrode plates. A first conductive terminal pin or first metallization may be disposed through the feedthrough filter capacitor electrically coupled to the first active electrode plate and in non-conductive relation to the second active electrode plate, ground electrode plate and conductive ferrule. A second conductive terminal pin or second metallization may be disposed through the feedthrough filter capacitor electrically coupled to the second active electrode plate and in non-conductive relation to the first active electrode plate, ground electrode plate and conductive ferrule. A ground conductive terminal pin or ground metallization may be disposed through the feedthrough filter capacitor electrically coupled to the plurality of ground electrode plates and the conductive ferrule.

The monolithic dielectric substrate of the feedthrough filter capacitor may include alumina. The feedthrough filter capacitor substrate may include a dielectric constant including a value below 10.

A secondary capacitor may be electrically coupled between the conductive ferrule and either the first or second conductive terminal pins. The secondary capacitor includes a secondary dielectric constant including a value above 1000. The secondary capacitor includes a dielectric substrate including barium titanate.

The feedthrough filter capacitor may be defined including a body fluid side and a device side, wherein both the body fluid side and the device side are biocompatible.

Another exemplary embodiment of the present invention includes a multipolar feedthrough filter capacitor assembly for an active implantable medical device including a feedthrough filter capacitor including a first, second, third and fourth active electrode plate disposed parallel to a plurality of ground electrode plates. The first and second active electrode plates may be disposed substantially within a first plane in non-conductive relation to one another. The third and fourth active electrode plates may be disposed substantially within a second plane and in non-conductive relation to one another. At least one of the plurality of ground electrodes plates may be disposed between the first and second planes. All of the plates may be disposed within a dielectric substrate. A conductive ferrule may be electrically coupled to the plurality of ground electrode plates. A first, second, third and fourth passageway each may be disposed through the feedthrough filter capacitor perpendicular to the plates. A first conductive terminal pin may be disposed through the first passageway electrically coupled to the first active electrode plate and in non-conductive relation to the second, third and fourth active electrode plates. A second conductive terminal pin may be disposed through the second passageway electrically coupled to the third active electrode plate and in non-conductive relation to the first, second and fourth active electrode plates. A third conductive terminal pin may be disposed through the third passageway electrically coupled to the second active electrode plate and in non-conductive relation to the first, third and fourth active electrode plates. A fourth conductive terminal pin may be disposed through the fourth passageway electrically coupled to the fourth active electrode plate and in non-conductive relation to the first, second and third active electrode plates.

A first hermetic seal may be between the conductive ferrule and the feedthrough filter capacitor. A second hermetic seal may be between the first conductive terminal pin and the feedthrough filter capacitor. A third hermetic seal may be between the second conductive terminal pin and the feedthrough filter capacitor. A fourth hermetic seal may be between the third conductive terminal pin and the feedthrough filter capacitor. A fifth hermetic seal may be between the fourth conductive terminal pin and the feedthrough filter capacitor.

The first, second, third and fourth conductive terminal pins may be in non-conductive relation to the conductive ferrule. The dielectric substrate may include a monolithic dielectric substrate including alumina.

A secondary capacitor may be electrically coupled between the conductive ferrule and either the first, second, third or fourth conductive terminal pins. The secondary capacitor may include a secondary dielectric constant including a value above 1000. The secondary capacitor may be directly attached to the conductive ferrule. The secondary capacitor may be disposed on a circuit board inside the active implantable medical device utilizing the multipolar feedthrough filter capacitor assembly.

The feedthrough filter capacitor may be defined including a body fluid side and a device side, wherein both the body fluid side and the device side are biocompatible.

Another exemplary embodiment of the present invention includes a composite electromagnetic interference filter assembly for an active implantable medical device including a feedthrough filter capacitor including an active electrode plate disposed parallel to a ground electrode plate disposed within a monolithic dielectric substrate. A conductive terminal pin or metallization may be disposed through the feedthrough filter capacitor. A conductive ferrule or substrate may be attached to the feedthrough filter capacitor. A secondary capacitor may be electrically coupled between the conductive ferrule and the conductive terminal pin. The conductive ferrule may be electrically coupled to the ground electrode plate. The conductive terminal pin may be electrically coupled to the active electrode plate and in non-conductive relation to the conductive ferrule and the ground electrode plate. A dielectric constant of the feedthrough filter capacitor substrate may include a value less than 10.

A hermetic seal may be directly between the conductive ferrule and the feedthrough filter capacitor. A second hermetic seal may be directly between the conductive terminal pin and the feedthrough filter capacitor.

The monolithic dielectric substrate of the feedthrough filter capacitor may include alumina. A conductive ferrule may be circumferentially disposed about the feedthrough filter capacitor. The feedthrough filter capacitor may be disposed substantially within the conductive ferrule.

The feedthrough filter capacitor may be defined including a body fluid side and a device side, wherein both the body fluid side and the device side are biocompatible.

The secondary capacitor may include a secondary dielectric constant including a value above 10, 100 or 1,000. The secondary capacitor may include a dielectric substrate including barium titanate. The secondary capacitor includes a monolithic chip capacitor. The secondary capacitor may be directly attached to the conductive ferrule. The secondary capacitor may be disposed on a circuit board inside the active implantable medical device. The secondary capacitor may be not directly attached to the conductive ferrule.

Another exemplary embodiment of the present invention includes a reversible and biocompatible feedthrough filter capacitor assembly for an active implantable medical device including a feedthrough filter capacitor including an active electrode plate disposed parallel to a ground electrode plate. The plates may be disposed within a biocompatible and monolithic dielectric alumina substrate. The feedthrough filter capacitor may be defined as including a body fluid side opposite a device side about a center plane. A conductive terminal pin may be disposed through the feedthrough filter capacitor. A conductive ferrule may be disposed about the feedthrough filter capacitor. The conductive ferrule may be electrically coupled to the ground electrode plate. The conductive terminal pin may be electrically coupled to the active electrode plate and wherein the conductive terminal pin may be in non-conductive relation to the conductive ferrule. A first hermetic seal may be between the feedthrough filter capacitor and the conductive terminal pin. A second hermetic seal may be between the feedthrough filter capacitor and the conductive ferrule. Both the body fluid side and device side may be biocompatible and reversible, such that the feedthrough filter capacitor assembly may be reversibly installed within the active implantable medical device without regard to the body fluid side and device side.

A center of the conductive ferrule may be aligned with the center plane. A center of the feedthrough filter capacitor may be aligned with the center plane. The feedthrough filter capacitor and conductive ferrule may be substantially symmetrically shaped about the center plane. The conductive ferrule may include an H-flange, a L-flange, a F-flange, an indent flange or a barrel flange. The first and second hermetic seals may include a noble metal. The conductive ferrule and the feedthrough filter capacitor may be substantially coplanar.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 26 is an mathematical equation representing how capacitance depends upon the dielectric constant, the number of electrode plates and the dielectric thickness;

FIG. 27 is a perspective view of a round quadpolar feedthrough filter capacitor assembly embodying the present invention;

FIG. 28 is a sectional view of a prior art active electrode plate of a prior art round quadpolar feedthrough filter capacitor;

FIG. 29 is a sectional view of an exemplary embodiment of the present invention illustrating one active electrode plate from the round quadpolar feedthrough filter capacitor of FIG. 27;

DETAILED DESCRIPTION OF THE PREFERRED EMBODIMENTS

Figure 1:
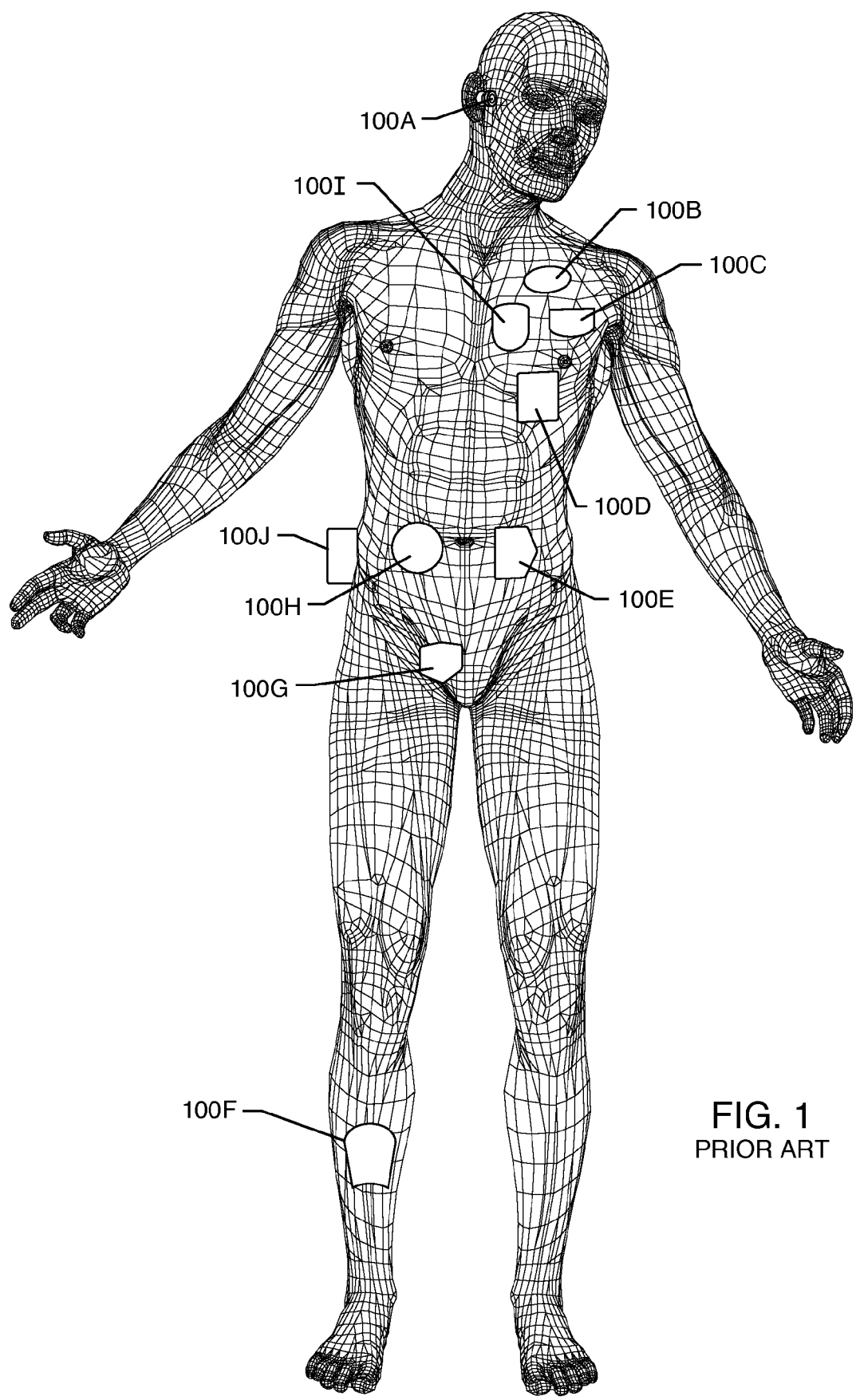
FIG. 1 is a wire-formed diagram of a generic human body showing a number of exemplary implantable medical devices.

As shown in the drawings for purposes of illustration, the present invention relates to a dual stage electromagnetic interference (EMI) filter and offset highly efficient multi-polar active capacitor electrodes for an active implantable medical device.

As used herein, the term "lead," which is synonymous with "implanted lead," shall mean the lead or leads that are routed from the exterior of the AIMD electromagnetic shield housing 112 into body tissues. Lead includes its electrodes that are in contact with body tissue.

As used herein, the term "leadwires" refers to the wiring, flex cables or circuit traces inside of the AIMD electromagnetic shield housing 112.

As used herein, the term "ferrule" is used to define where the capacitor's ground electrode plates are attached at an outer periphery or outside diameter of the feedthrough capacitor. In general, the outside diameter of the perimeter of the feedthrough capacitor is metalized to put all of the ground electrode plates in parallel. These are in turn, connected to a ferrule. As used herein, the term "ferrule" could also include a plate, a shield, an equipotential surface, a ground plane or the like.

FIG. 1 is a wire-formed diagram of a generic human body showing a number of exemplary prior art implantable medical devices. FIG. 1 illustrates various types of active implantable medical devices referred to generally by the reference numeral 100 that are currently in use. 100A is a family of implantable hearing devices which can include the group of cochlear implants, piezoelectric sound bridge transducers and the like. 100B includes an entire variety of neurostimulators and brain stimulators. Neurostimulators are used to stimulate the Vagus nerve, for example, to treat epilepsy, obesity and depression. Brain stimulators are similar to a pacemaker-like device and include electrodes implanted deep into the brain for sensing the onset of the seizure and also providing electrical stimulation to brain tissue to prevent the seizure from actually happening. 100C shows a cardiac pacemaker which is well-known in the art. 100D includes the family of left ventricular assist devices (LVAD's), and artificial hearts, including the recently introduced artificial heart known as the Abiocor. 100E includes an entire family of drug pumps which can be used for dispensing of insulin, chemotherapy drugs, pain medications and the like. Insulin pumps are evolving from passive devices to ones that have sensors and closed loop systems. That is, real time monitoring of blood sugar levels will occur. These devices tend to be more sensitive to EMI than passive pumps that have no sense circuitry or externally implanted leadwires. 100F includes a variety of implantable bone growth stimulators for rapid healing of fractures. 100G includes urinary incontinence devices. 100H includes the family of pain relief spinal cord stimulators and anti-tremor stimulators. 100H also includes an entire family of other types of neurostimulators used to block pain. 100I includes a family of implantable cardioverter defibrillator (ICD) devices and also includes the family of congestive heart failure devices (CHF). This is also known in the art as cardio resynchronization therapy devices, otherwise known as CRT devices. 100J illustrates an externally worn pack. This pack could be an external insulin pump, an external drug pump, an external neurostimulator or even a ventricular assist device.

As used herein, the term "active implantable medical device" (AIMD) shall be inclusive of all the devices previously described in FIG. 1. The term AIMD is not limited solely to the devices illustrated in FIG. 1 and generally includes any active implantable medical device, wherein there are electronic circuits contained within a housing, wherein there is at least one implantable lead that extends from the housing to a distal electrode in contact with biological cells. The AIMD may have a primary battery or a secondary battery or even be powered from internal or external sources of energy.

Figure 2:
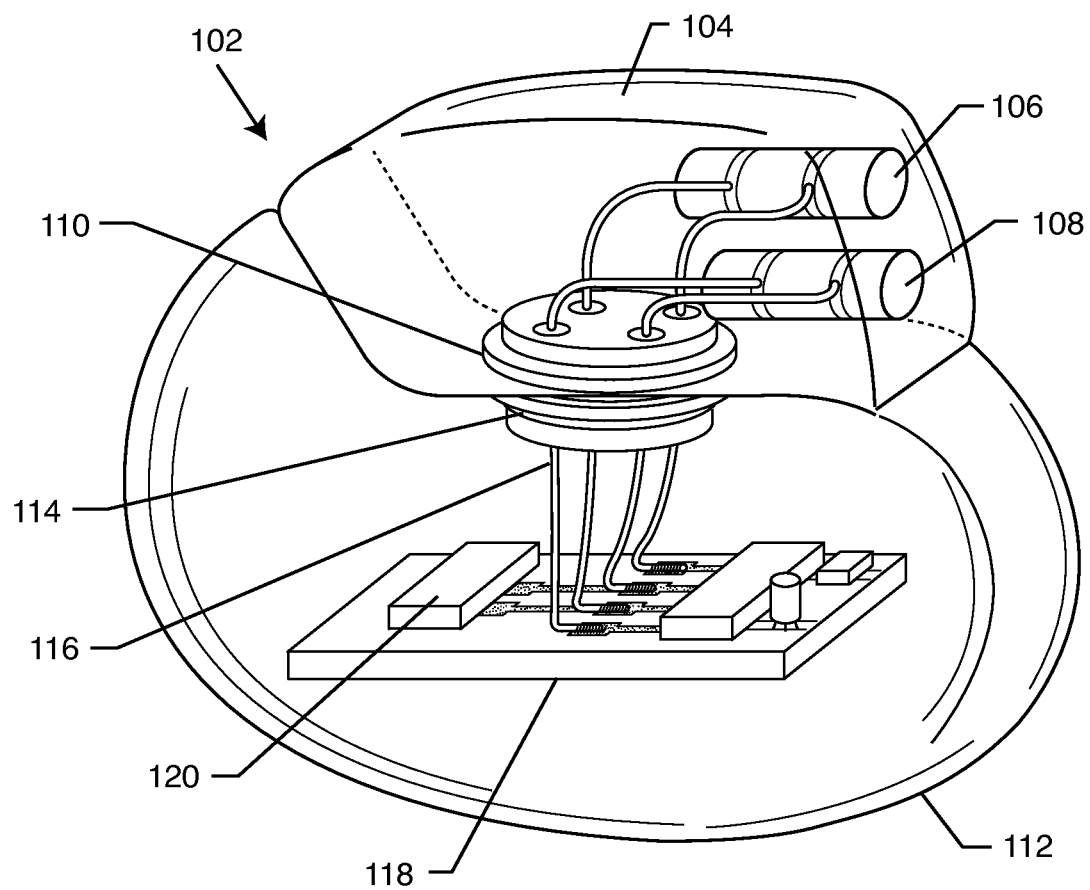
FIG. 2 is a perspective and schematic view of a prior art active implantable medical device.

FIG. 2 is a perspective and schematic view of a prior art active implantable medical device (AIMD) 102. FIG. 2 illustrates the prior art AIMD 102 as a dual chamber bipolar cardiac pacemaker. A header block 104 contains bipolar connector receptacles 106 and 108 in accordance with ISO Standard IS-1. The AIMD 102 is enclosed by a titanium or stainless steel housing 112. The titanium housing 112 is hermetically sealed with a hermetic feedthrough terminal assembly 110 where leadwires 116 penetrate from a feedthrough filter capacitor 114 to a circuit board 118. The feedthrough filter capacitor 114 is disposed inside the titanium housing 112 away from bodily fluids. The feedthrough filter assembly 110 is laser welded 128 at the ferrule 122 to the housing 112. It should be noted that each of the bipolar connector receptacles 106 and 108 would have bipolar leads (not shown) associated with them when in implanted into a patient. These leads have bipolar electrodes wherein one lead conductor is routed to the tip electrode and the other is routed to the ring electrode.

In the embodiment shown in FIG. 2, the onboard EMI filter components 120 have optionally been mounted on the internal circuit board 118 inside of the AIMD electromagnetic shield housing 112. This illustrates a mistake in that, the feedthrough filter capacitor 114 is removed and the filtering is placed on the circuit board 120 as shown. By improperly locating the filtering 120 on the internal circuit board 118, this presents a low impedance which tends to pull an undesirable EMI signal that couples to the implanted lead 122 inside the AIMD electromagnetic shield housing 112. These EMI signals can then reradiate as EMI re-radiation from the internal leadwires 116. It has been shown in the past that such re-radiation can cause AIMD internal electronic circuit malfunction. It is an acceptable practice to have circuit mounted filter components 120 often in cooperation with a feedthrough filter capacitor 114. What is important is that high frequency energy be intercepted as it is picked up by the implanted lead conductors before it can enter the shielded housing 112 of the AIMD 102 and before it can reradiate to sensitive electronic circuits.

Using a cardiac pacemaker as an example, the AIMD electromagnetic shield housing 112 is typically made of titanium, stainless steel, or other suitable biocompatible material which creates an equipotential shield housing. Seams are uniformly laser welded so that there are no openings. An alternative is use of a ceramic, plastic or composite housing with an electromagnetic shield coating disposed on either its interior and/or exterior surfaces. The AIMD electromagnetic shield housing 112 may also be coated with nano materials that form an RF shield. The AIMD electromagnetic shield housing 112 provides hermeticity to protect the sensitive electronic circuits from the intrusion of body fluids.

At high frequencies, the AIMD electromagnetic shield housing 112 both reflects and absorbs incident electromagnetic waves. For example, the evolution and design of such electromagnetically shielded titanium housings have made pacemakers relatively immune to microwave ovens and other high frequency interference sources. The AIMD electromagnetic shield housing 112 also forms a very convenient equipotential surface to which high frequency EMI signals conducted from the implanted leads may be decoupled/diverted. This is typically done using passive or active filter elements which can be mounted directly on or adjacent to the point of AIMD housing implanted lead ingress. In the prior art, the optimal location is to place such bypass (lowpass) filters on or adjacent to the hermetic feedthrough pin terminal. The ceramic feedthrough filter capacitors are typically mounted directly on the hermetic terminal ferrule 122 and provide a low impedance at high frequencies from the leadwires 116 to the AIMD electromagnetic shield housing 112, thereby shorting or diverting high frequency EMI signals to the housing 112. When the high frequency EMI energy is diverted to the AIMD electromagnetic shield housing 112, it simply circulates as eddy currents resulting in a few milliwatts of insignificant power dissipation as a small amount of heat. This results in a miniscule and insignificant temperature rise of the AIMD electromagnetic shield housing 112.

Other (early) prior art designs attempted to provide effective filtering by providing on-board or circuit board substrate mounted low pass EMI filter elements. Although, the filters did their job and acted as a low impedance, they tended to pull stray EMI RF currents from the outside world to the point of filtering. Because these filters were connected at the end of the flex cable or a leadwire inside of the AIMD housing, these stray EMI signals tended to radiate from the flex cable/leadwires and cross-couple to other sensitive electronics inside the AIMD housing. It is a basic principle of good EMI filter engineering that filters be placed at a point of entry to a shielded housing where they can immediately decouple the stray EMI signals to the housing or overall shield of the electronics module. Therefore it has become common to locate the EMI filters directly at, near or within the hermetic terminal 110 which is the point of ingress of the implanted lead from the outside world (body fluid side) to the inside of the AIMD electromagnetic shield housing 112.

Figure 3:
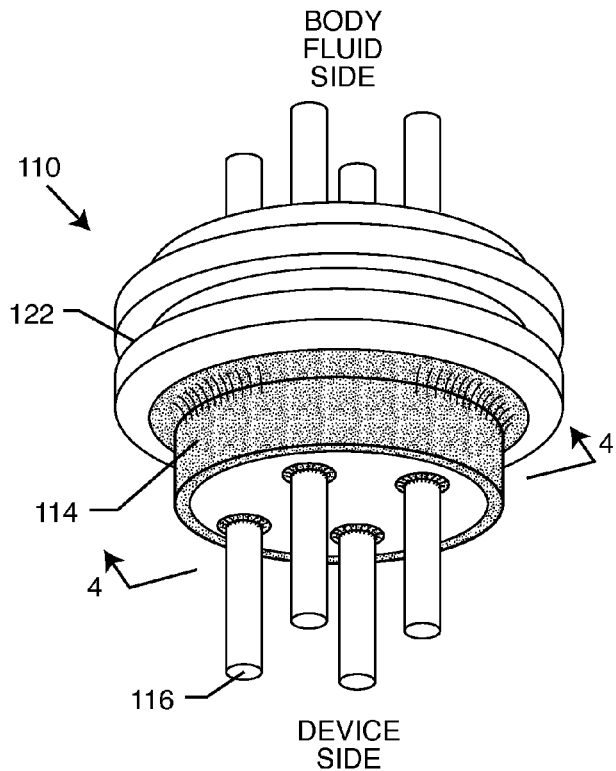
FIG. 3 is a perspective view of a prior art round quadpolar feedthrough capacitor assembly.

FIG. 3 is a perspective view of a prior art round quadpolar feedthrough capacitor assembly 110. The feedthrough filter capacitor 114 is mounted on the device side of the AIMD away from bodily fluids. The capacitor 114 is mounted to the ferrule 122. Leadwires 116 penetrate through the ferrule insulator 136 and capacitor 114 from the outside of the AIMD to the inside of the AIMD.

Figure 4:
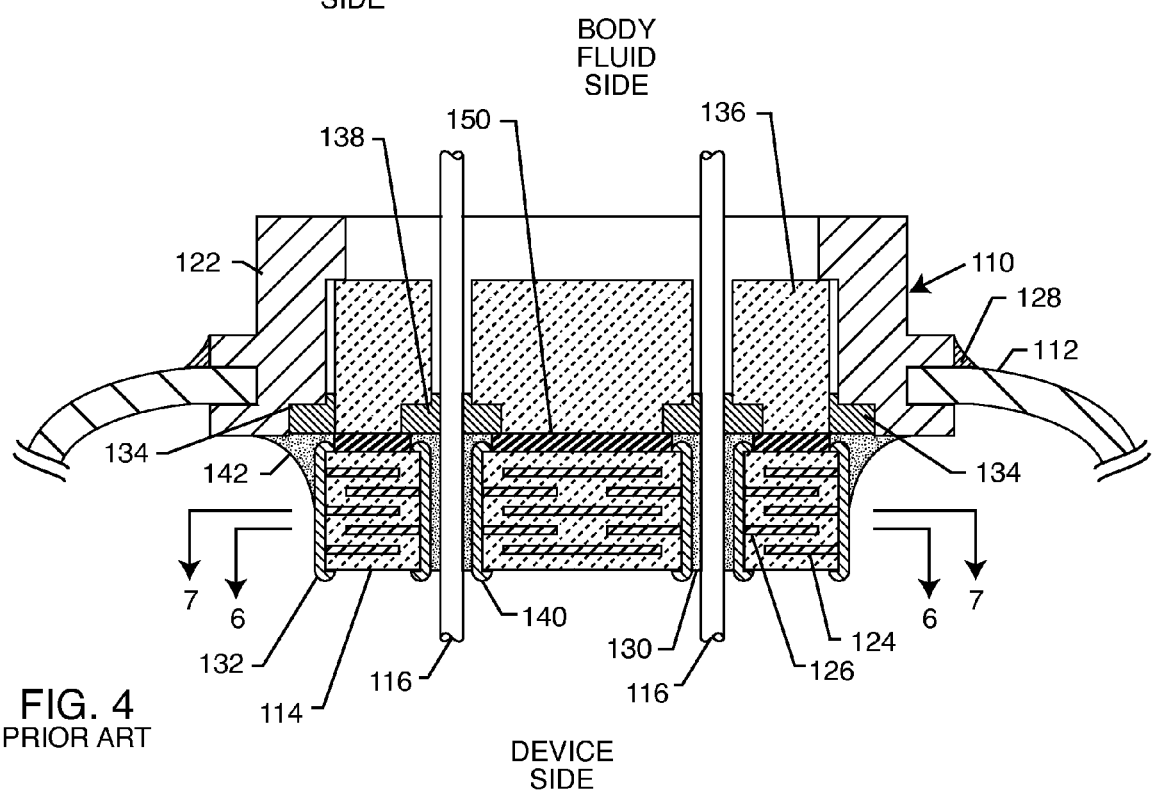
FIG. 4 is a sectional view of the prior art quadpolar feedthrough capacitor assembly of FIG. 3 taken along line 4-4.

FIG. 4 is a sectional view of the prior art quadpolar feedthrough capacitor assembly 110 of FIG. 3 taken along line 4-4. The ground electrode plates 124 are electrically connected at an outside diameter electrical connection 142 to the ferrule 122. The active electrode plates 126 are electrically connected along an inner electrical connection 130 to the leadwires 116. A laser weld 128 forms a hermetic seal between the housing 112 and the ferrule 122. In prior art round/discoidal feedthrough capacitor devices, the lead wire 116 is continuous. An insulator 136, like alumina ceramic or glass, is disposed within the ferrule 122 and forms a hermetic seal against body fluids at locations 134 and 138. The terminal pin or lead wire 116 extends through the hermetic seal 138, passing through aligned passageways through the insulator 136 and the capacitor 114. A gold braze 138 forms the hermetic seal joint 138 between the terminal pin 116 and the insulator 136. Another gold braze 134 forms a hermetic seal joint 134 between the alumina insulator 136 and the titanium ferrule 122. The feedthrough filter capacitor 114 is shown surface mounted in accordance with U.S. Pat. No. 5,333,095, and has an electrical connection 130 between its inside diameter metallization 140 and the active electrode plate set 126 and lead wire 116. There is also an outside diameter electrical connection 142 which connects the capacitor's outside diameter metallization 132 and the ground electrodes plates 124 to the ferrule 122.

Figure 5:
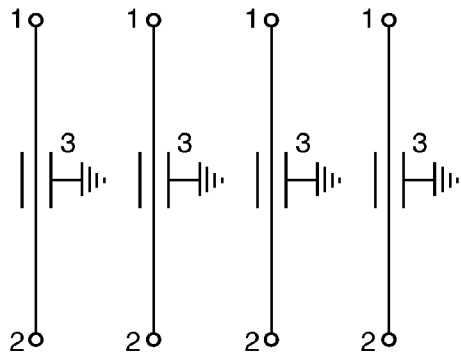
FIG. 5 is an electrical schematic corresponding to the quadpolar feedthrough capacitor assembly of FIG. 3.

FIG. 5 is an electrical schematic corresponding to the quadpolar feedthrough capacitor assembly 110 of FIG. 3. Feedthrough capacitors are very efficient high frequency devices that have minimal series inductance. This allows them to operate as EMI filters over very broad frequency ranges. One skilled in the art can see that another way to describe a prior art discoidal feedthrough filter capacitor assembly 110 is as a three-terminal capacitor. Three-terminal devices generally act as transmission lines. For a prior art AIMD, on the body fluid side there is generally an implanted lead which can undesirably act as an antenna which can pick up energy from environmental emitters. This energy is known as electromagnetic interference (EMI). Cell phones, microwave ovens and the like have all been implicated in causing interference with active implantable medical devices. If this interference enters lead wire 116, it is attenuated along its length by the feedthrough filter capacitor 114. Upon exiting, the undesirable high frequency EMI has been cleaned off of the normal low frequency circuit current (such as pacemaker pacing pulses or biologic frequency sensors) so that the high frequency EMI has been significantly attenuated. Another way of looking at this is as the high frequency energy passes from terminal 1 to terminal 2 (FIG. 5), it is diverted through the feedthrough capacitor 114 to the ground terminal which is also known as the third terminal or terminal 3. The feedthrough filter capacitor 114 also performs two other important functions: a) its internal ground electrodes 124 act as a continuous part of the overall electromagnetic shield housing of the electronic device or module which physically blocks direct entry of high frequency RF energy through the hermetic seal or equivalent opening for lead wire 116 ingress and egress in the otherwise completely shielded housing (such RF energy, if it does penetrate inside the shielded housing can couple to and interfere with sensitive electronic circuitry), and; b) the feedthrough filter capacitor 114 very effectively shunts undesired high frequency EMI signals off of the lead wires to the overall shield housing 112 where such energy is dissipated in eddy currents resulting in a very small temperature rise.

Figure 6:
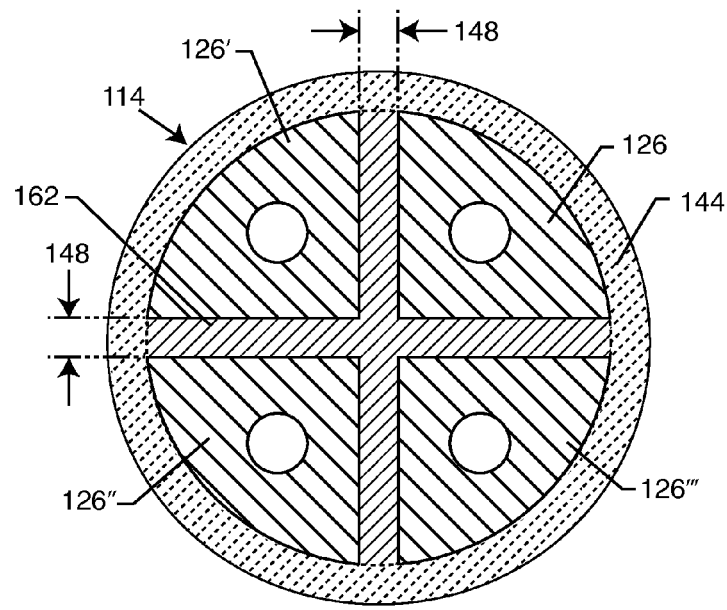
FIG. 6 is a sectional view of the structure of FIG. 4 taken along line 6-6 illustrating an active electrode plate.

FIG. 6 is taken generally from section 6-6 from FIG. 4 and illustrates the capacitor's active electrode plate set 126. These electrode plates are disposed on a dielectric material 144.

Figure 7:
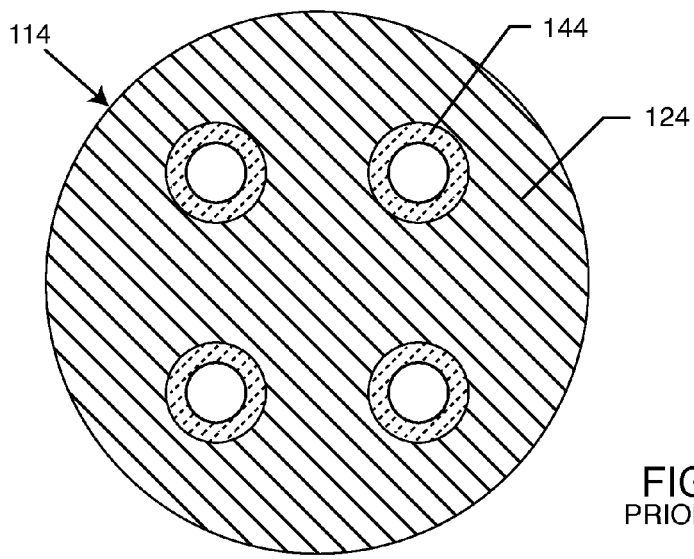
FIG. 7 is a sectional view of the structure of FIG. 4 taken along line 7-7 illustrating a ground electrode plate.

FIG. 7 is a taken generally from section 7-7 from FIG. 4 and illustrates the capacitor's ground electrode plate set 124. These ground electrode plates 124 are designed to be interleaved with the active electrode plate sets 124 described in FIG. 6. One controls the capacitance value by the number of plates that are interleaved and also by the relative overlap area of the active electrode plate 126 and the ground electrode plate 124. If a high voltage capacitor is required one can stack blank dielectric sheets 146 in between the electrodes plates of FIG. 6 and FIG. 7 to build up the dielectric thickness.

Referring once again to FIG. 6, one can see that there are four quadpolar active electrodes that form pie shaped wedges. Each of these pie shaped wedges is separated by a margin 148 to provide electrical clearance from the adjacent panel. As will be shown, the necessity to have these margins 148 subtracts from the effective capacitance area and is deleterious to the volumetric efficiency of the capacitor.

Figure 8:
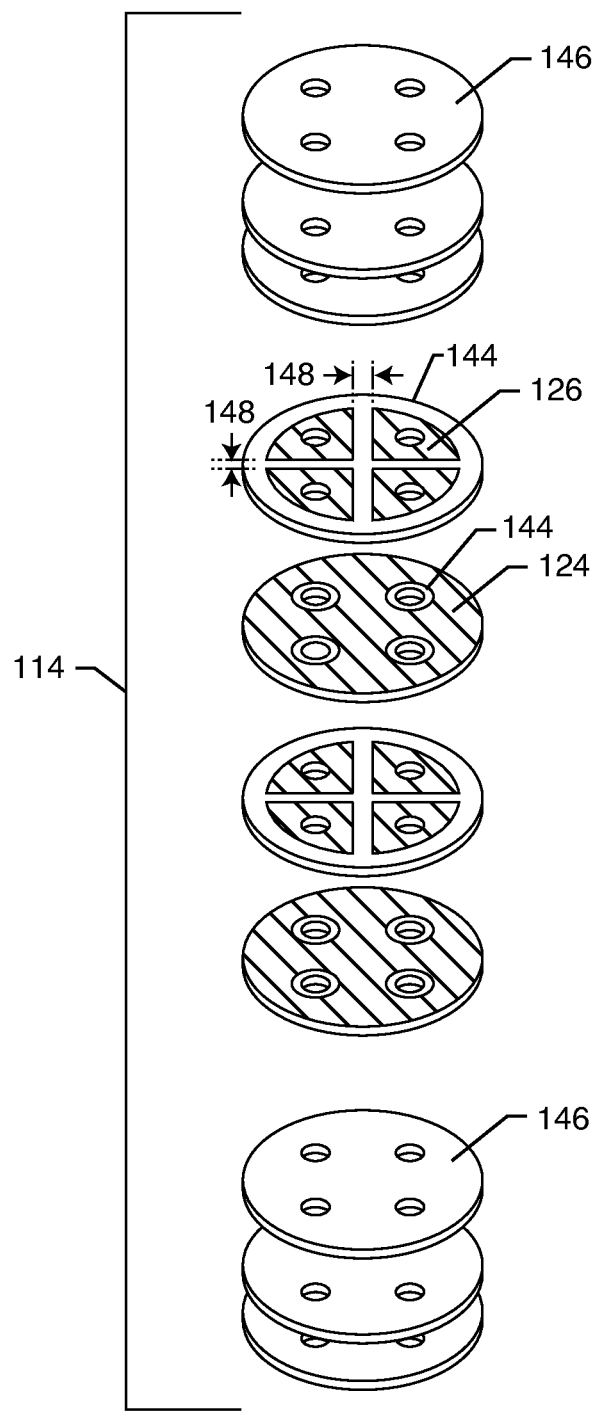
FIG. 8 is an exploded view of the structure of FIGS. 3-4 illustrating the stacking of active and ground electrode plates.

FIG. 8 is an exploded view of the quadpolar feedthrough capacitor 114. Starting from the top, the capacitor stacks up first with blank cover sheets 146 to add insulation and structural rigidity. Then a layer of active electrode plates 126 is shown interleaved with ground electrode plates 124. The terminal pins 116 (not shown) are connected to the active electrode plates 126, but pass through the ground electrode plates 124 in non-conductive relation. As previously stated, one can stack up a total of four electrodes (two active and two grounds as shown) or a much higher number if one desires a higher capacitance value. At the bottom of the stack-up are more cover sheets 146, again to provide insulation and structural rigidity.

Figure 9:
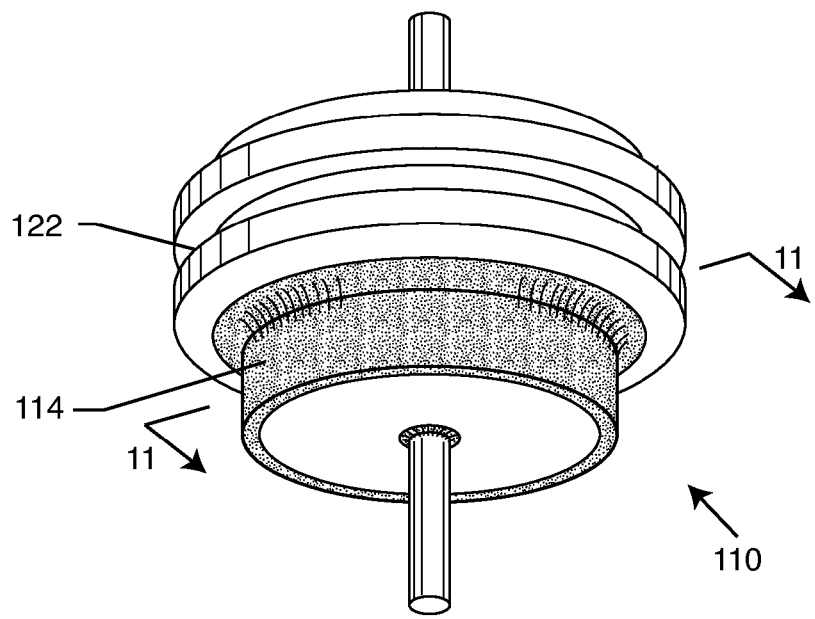
FIG. 9 is a perspective view of a prior art unipolar feedthrough capacitor assembly.

FIG. 9 is a unipolar feedthrough capacitor hermetic terminal assembly 110. The hermetic terminal has a ferrule 122 similar to that previously described in FIG. 3. The unipolar feedthrough capacitor 114 is shown mounted to the ferrule 122.

Figure 10:
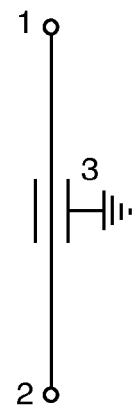
FIG. 10 is an electrical schematic corresponding to the unipolar feedthrough capacitor assembly of FIG. 9.

FIG. 10 is a schematic diagram of the unipolar feedthrough capacitor of FIG. 9 illustrating that it is a three-terminal device similar to description for FIG. 5.

Figure 11:
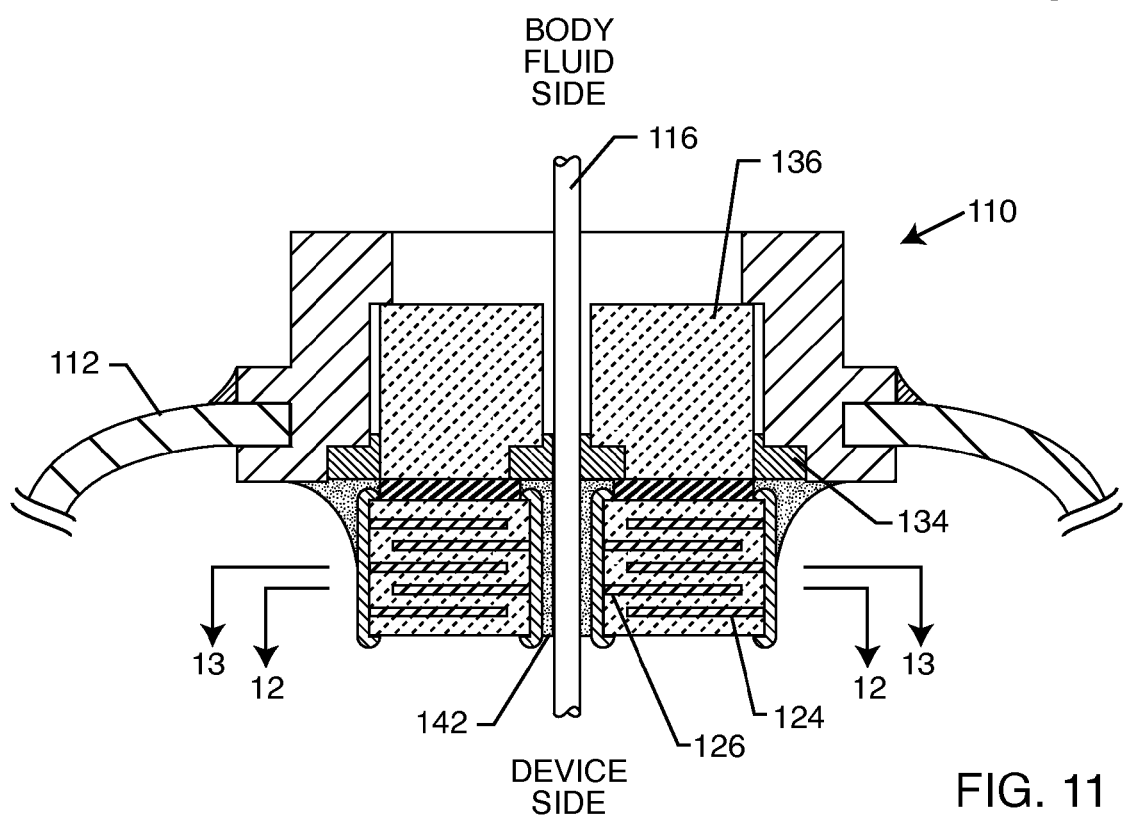
FIG. 11 is a sectional view of the prior art unipolar feedthrough capacitor assembly of FIG. 9 taken along line 11-11.

FIG. 11 is taken generally from section 11-11 from FIG. 9 showing the interior construction details of the unipolar feedthrough assembly. In this case, there is one leadwire 116 that passes through the hermetic terminal insulator 136 in non-conductive relation and is electrically connected to the unipolar capacitor active electrode plate set 126. As previously described for the quadpolar feedthrough capacitor of FIG. 3, the ground electrode plates 124 are electrically connected to the capacitor's external metallization and in turn, to the hermetic terminal ferrule 122. It should be appreciated that the ground electrode plate attachment is very important. One can see that an electrical attachment is made to the gold braze 134. This is important because the titanium ferrule 122 typically will have a heavily oxidized surface. Titanium oxides are excellent insulators and are in fact, a key component of stable paints. Accordingly, an attachment from the capacitor to an oxide-free surface is essential so that it can provide proper high frequency filtering. This is more thoroughly described in U.S. Pat. No. 6,765,779, the contents of which are incorporated herein by reference.

Figure 12:
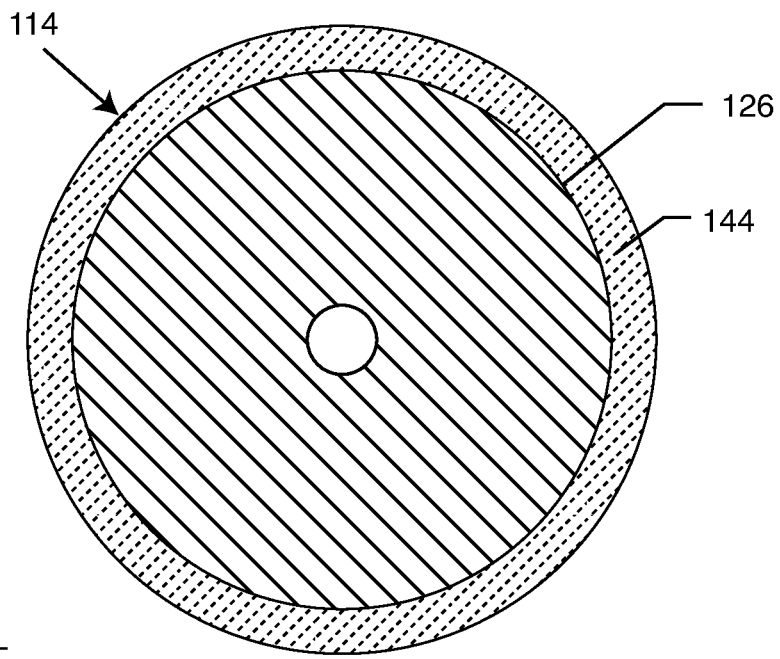
FIG. 12 is a sectional view of the structure of FIG. 11 taken along line 12-12 illustrating an active electrode plate.

FIG. 12 is taken from section 12-12 from FIG. 11 and illustrates the capacitor's active or positive electrode plate set. As defined herein, active electrode 126 or positive electrode will refer to those electrodes that are connected to the leadwire 116 that passes through. In general, the active electrodes 126 are printed onto a base dielectric substrate 144. The active electrodes 126 do not extend to the outside diameter or perimeter of the feedthrough capacitor. This is to keep them from shorting out to ground.

Figure 13:
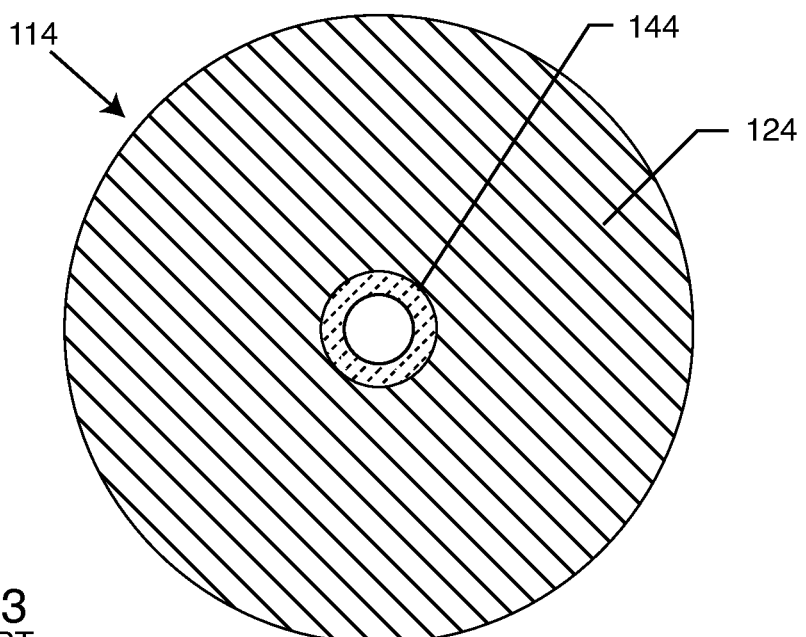
FIG. 13 is a sectional view of the structure of FIG. 11 taken along line 13-13 illustrating a ground electrode plate.

FIG. 13 is taken from section 13-13 from FIG. 11 and shows the unipolar capacitor's ground electrode plate 124. As can be seen, there is a clearance area 144 of dielectric material that prevents the ground electrode plates 124 from shorting out to the active electrode plates 126.

Figure 14:
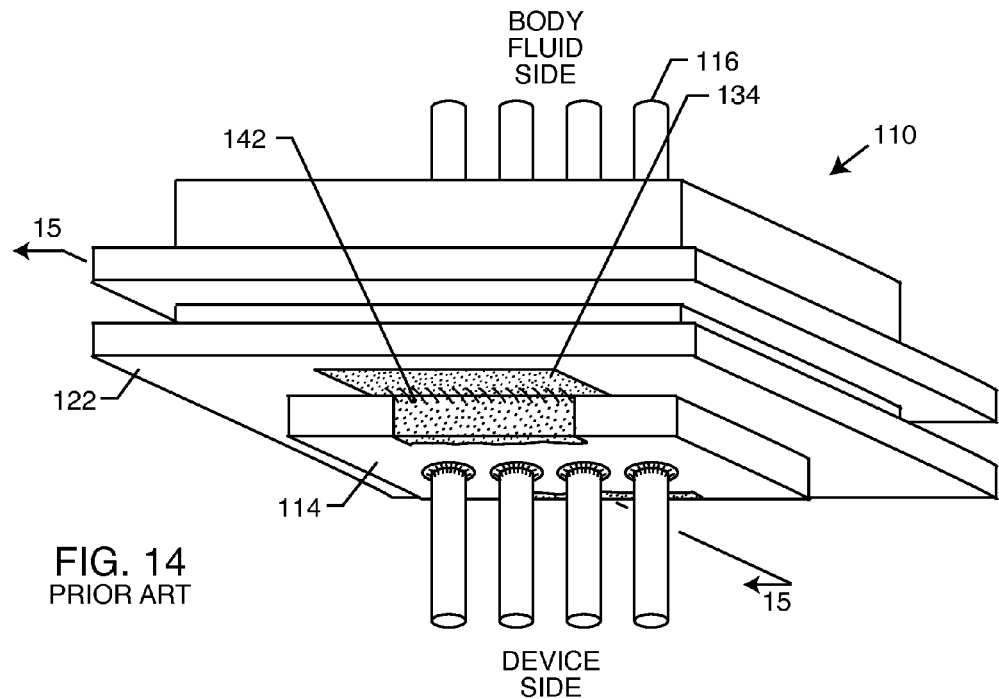
FIG. 14 is a perspective view of a prior art rectangular quadpolar feedthrough filter capacitor assembly.

FIG. 14 is a quadpolar feedthrough capacitor-hermetic terminal assembly very similar to that previously described in FIG. 3 except that in this case, it is rectangular instead of round. Terminal pins 116 pass through ferrule 122 in non-conductive relationship. Feedthrough capacitor 114 is shown with an electrical connection to each of the feedthrough pins 116 to the capacitor inside diameter metallization 140. The capacitor ground electrode plates 124 are electrically connected 142 to the ferrule 122, which acts as a ground for the feedthrough capacitor 114. It is important that the feedthrough capacitor ground connection be to a low impedance non-oxidized surface. Gold bond pad 134 is provided for this purpose, wherein the electrical connection material 142 connects between the capacitor outside diameter metallization 132 and the gold bond pad 134. The importance of making connection to non-oxidized surfaces is more thoroughly described in U.S. Pat. No. 5,905,627, the contents of which are incorporated herein by reference.

Figure 15:
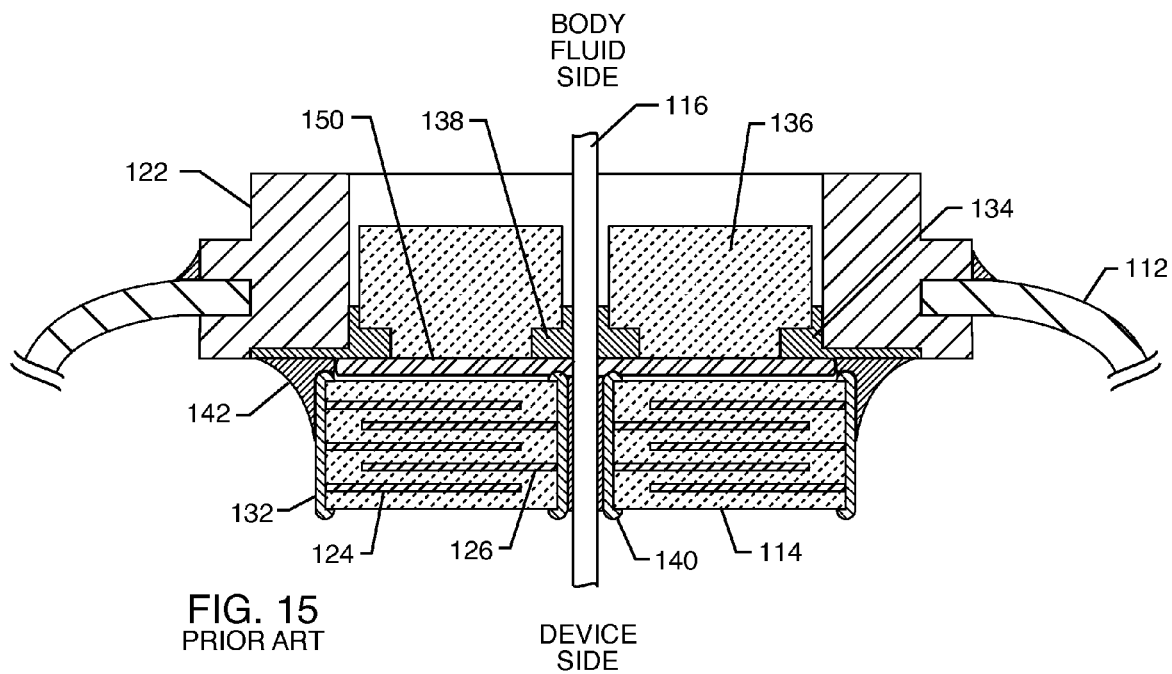
FIG. 15 is a sectional view of the prior art quadpolar feedthrough filter capacitor assembly of FIG. 14 taken along line 15-15.

FIG. 15 is a sectional view taken from section 15-15 from FIG. 14 showing the quadpolar hermetic terminal and capacitor in section. Again, this is very similar to the section as previously described in FIG. 4. Feedthrough capacitor 114 has a terminal pin 116, which is gold brazed 138 to the generally low dielectric constant insulator structure 136. Another gold braze is formed 134, which provides a perimeter hermetic seal for the insulator 136. Accordingly, body fluids are prevented from passing to the device side where they could damage sensitive electronic circuits. The feedthrough capacitor 114 is shown bonded using an insulating washer 150 to the surface of the hermetic terminal assembly 122. One can see that the capacitor's active electrode plates 126 have been electrically connected to the feedthrough terminal pin 116. In like manner, the capacitor ground electrode plates 124 have been connected in parallel by capacitor external metallization 132. There is then an electrical attach material 142 which can consist of a thermal-setting conductive adhesive, a solder, a braze or the like. The electrical connection 142 connects the capacitor ground electrode plate set to the gold braze 134 of the hermetic terminal ferrule 122. This makes for a very efficient EMI filter in that, undesirable high frequency signals that enter from the body fluid side are intercepted by the feedthrough capacitor and diverted to the ferrule and then in turn to the shield housing 112 of the AIMD. Therefore, the housing of the AIMD acts as an overall equipotential surface or an electromagnetic shield, which prevents the entry of EMI to the interior of the AIMD. A draw back of the assembly as illustrated in FIGS. 14 and 15 is that it is relatively large in size (particularly the height). It is also very costly to produce. It is generally produced in two steps where at first, the hermetic terminal subassembly is formed, which consists of ferrule 122, hermetic insulator 136 and feedthrough pins 116. These are first gold brazed 134, 138 and then subjected to extensive mechanical and hermetic seal testing. In a similar manner, the feedthrough capacitor assembly 144 is preassembled through a thick film manufacturing process, wherein the various layers of the capacitor are laid down and sintered at elevated temperature. Then metallization surfaces 140 and 132 are added so that the feedthrough capacitor can be electrically tested. Then in a third operation, the feedthrough capacitor 114 is assembled to the hermetic terminal subassembly, which forms the filtered hermetic terminal subassembly 110.

Figure 16:
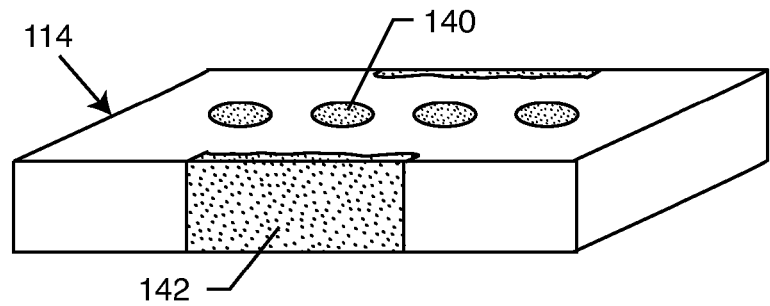
FIG. 16 is a perspective view of a quadpolar feedthrough filter capacitor.

FIG. 16 is an isometric view of the rectangular quadpolar capacitor 114 taken from FIG. 14. Shown are its ground metallization 142 and also feedthrough hole metallization 140.

Figure 17:
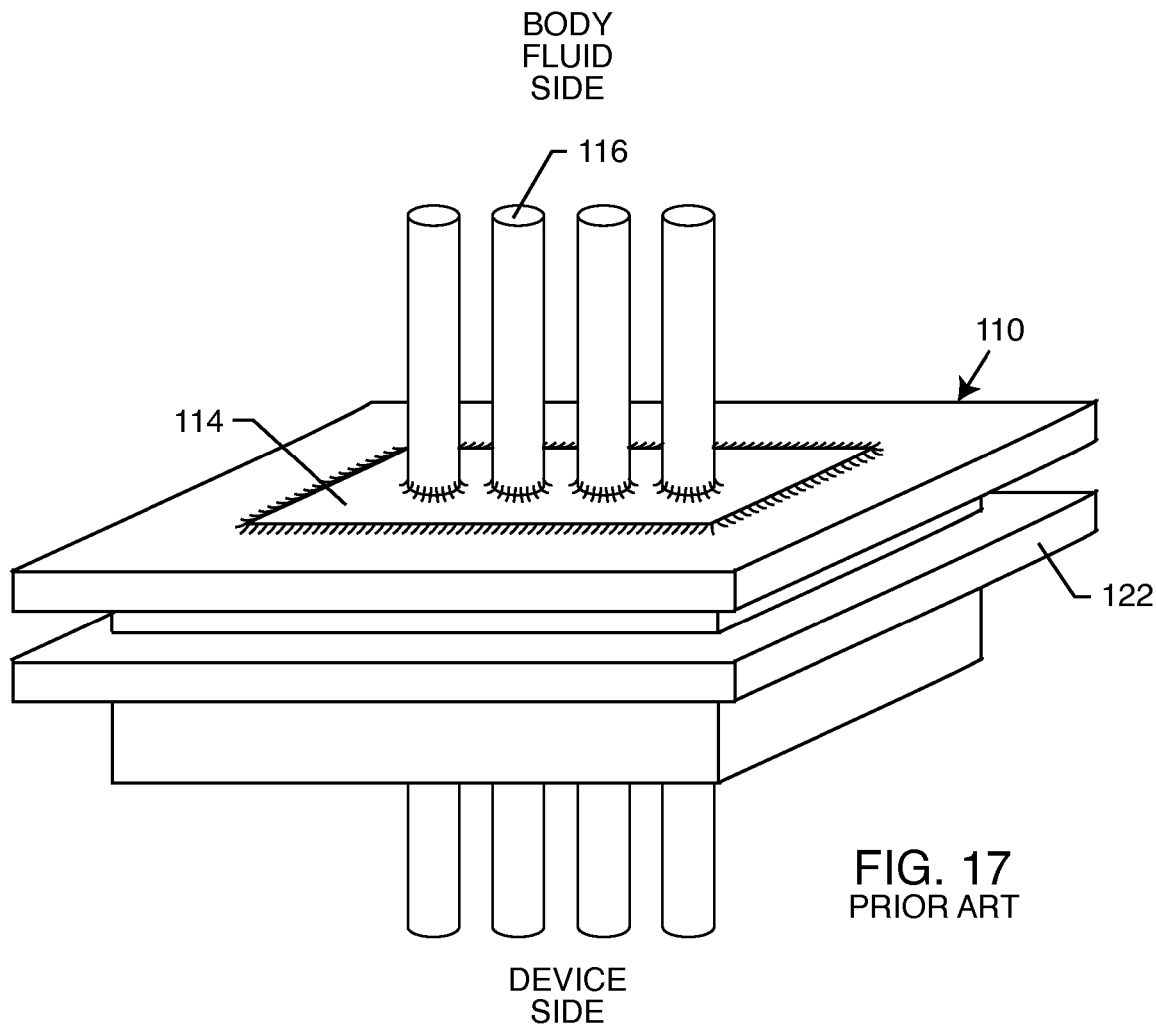
FIG. 17 is a perspective view of the quadpolar feedthrough filter capacitor of FIG. 16 now disposed within a rectangular ferrule.

FIG. 17 is the inline quadpolar hermetic terminal 110 of FIG. 14 shown as its premanufactured subassembly. In this case, the feedthrough pins 116 have been brazed into the insulator 114. The insulator 114 has also been brazed onto the ferrule 122. This forms the hermetic terminal subassembly 110. It will be obvious to those skilled in the art that this could also be replaced by a glass, compression or fused hermetic seal, which would eliminate the need for the gold brazes. The present invention is applicable to either brazed assemblies or glass sealed assemblies.

Figure 18:
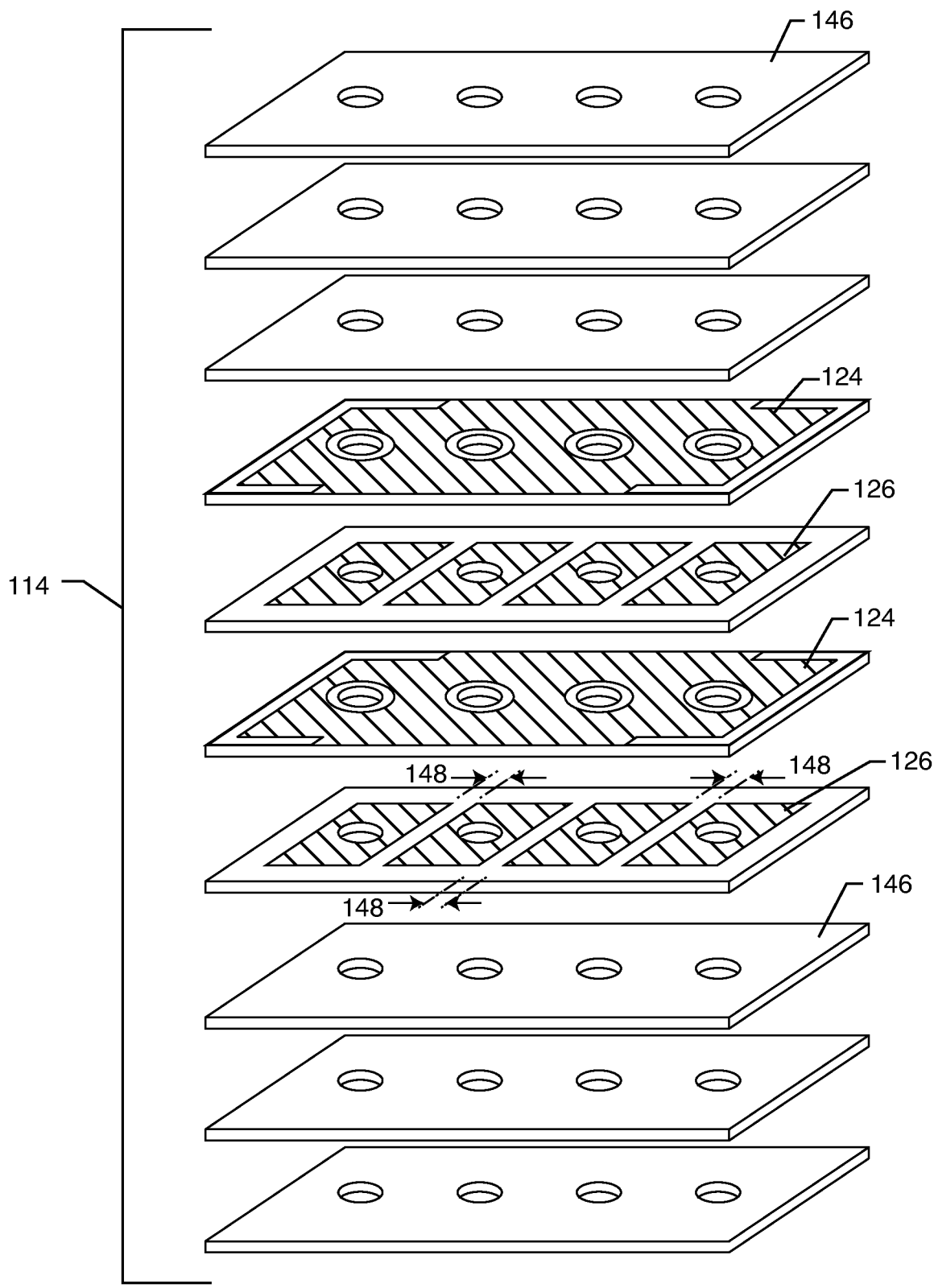
FIG. 18 is an exploded view of the capacitor structures of FIGS. 14-17 illustrating the stacking of active and ground electrode plates.

FIG. 18 is an exploded view of the quadpolar feedthrough capacitor of FIG. 16 showing its electrode stack ups. Shown is the ground electrode plate set 124 and active electrode plate sets 126. As can be seen, there is a margin 148 between each of the active electrodes which takes away from the capacitor's volumetric efficiency.

A description of the manufacturing processes of the prior art is described herein relating to FIGS. 2 through 18 and is required to understand the present invention. In the prior art, the hermetic terminal assembly 110 is pre-manufactured. This is done by machining a titanium ferrule 122 and loading that into a special carbon boat and then also taking a machined or pressed powdered alumina pellet, which has been pre-manufactured and fired, and placing it into the same boat. Then, the platinum iridium leadwires 116 (which are very expensive in their own right) are placed in the fixture along with gold brazed pre-forms 134 and 138. This entire assembly is then placed in a special vacuum gold braze furnace where the gold braze pre-forms are flowed to form the hermetic seals as illustrated in the previous drawings.

In a completely separate manufacturing operation, the feedthrough capacitor 114 is manufactured. This is done in a thick film multilayer process wherein ceramic is, for example, tape cast, then dried and then through silk-screening processes, the active and ground electrode plates 124 and 126 are laid down. A number of capacitors are typically placed in a manufacturing bar and then carefully punched or cut out. The green capacitors are then placed on special zirconia setters where they go through a binder bake-out process and then a sintering process. After the sintering process, they are formed into a hard monolithic ceramic structure. Then, they must go through both outside diameter or perimeter metallization 132 application as well as inside diameter metallization 140. Metallizations can be plated or can be a metal bearing glass frit, such as a palladium silver glass frit. This glass frit is fired on at a subsequent high temperature operation. Then the capacitor goes through a number of electrical and mechanical tests to make sure that it is robust.

The next major assembly process comes in attaching the feedthrough capacitor 114 to the hermetic terminal assembly 110. This attach process is also very time consuming, in that, first the capacitor is attached by an adhesive washer 150 to the insulator 136 of the hermetic terminal (refer to FIG. 4). The capacitor 114 is then inverted and a micro-syringe is used to inject thermal-setting conductive adhesive 130 into leadwires 116 and the inside diameter of the capacitor metallization 140. Then a centrifuge process is used to drive the material down and seat it against the gold braze 138. This process is followed by a pre-cure and then a microblasting operation to clean up excess conductive particles from the capacitor surface. This is a repetitive process in that it is done between four and six times until the inside diameter space is completely filled. After the inside diameter electrical material 130 is cured, then the capacitor outside diameter electrical connection 142 is made. Again, this is done under a microscope using micro-syringes and is a very careful, painstaking process. Because of the complexity of the assembly and mission-critical nature of an implantable medical device, the composite feedthrough capacitor-hermetic terminal assembly is then subjected to a number of high reliability tests including thermal shock, high temperature life test (burn-in), and various electrical and other mechanical measurements, including hermeticity. Accordingly, the prior art structures, as illustrated in FIGS. 2 through 18 herein, are highly complex, difficult to manufacture and are very expensive.

Figure 19:
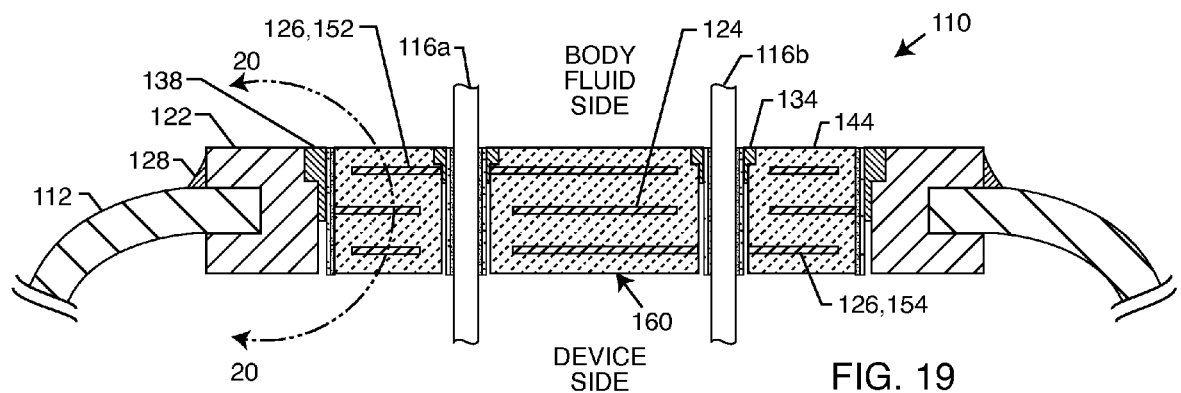
FIG. 19 is a sectional view of an exemplary embodiment of the present invention illustrating offset active electrode plates of a bipolar feedthrough filter capacitor.

FIG. 19 illustrates a bipolar integrated feedthrough capacitor hermetic seal of the present invention. Shown is a ferrule 122 with a laser weld 128 to an AIMD housing 112. In this case, there is no separate hermetic seal insulator 136. The insulator, in fact, has a very low dielectric constant and is of multilayer construction in which capacitor, ground and electrode plates are embedded. For purposes of simplicity, only three electrode plates will be shown. Active electrode 126, 152 is a highly efficient, high effective capacitance area (ECA) offset electrode. It is connected to leadwire 116a as illustrated. A ground electrode plate 124 is disposed in the stack between the two active electrode plates 126. The second active electrode plate 126, 154 is also a highly efficient, high ECA electrode, which in this case, is connected to leadwire 116b.

The hermetic insulator ceramic dielectric material 144 has not changed, in that, it is still an alumina ceramic. An advantage of alumina ceramic is that it is very strong, both in tension and compression and can withstand brazing stresses. Typical prior art capacitor dielectrics are either barium titanate or barium strontinate and have dielectric constants that range as high as 5000. Alumina has a dielectric constant that is less than 10. One is referred to the equation for capacitance $(C=kA(n^{-1})/d$. As one can see, the capacitance is directly related to the dielectric constant. Accordingly, the structure as illustrated in FIG. 19 would tend to have a much lower capacitance than the prior art capacitors as previously described, for example, in the quadpolar capacitor of FIG. 4. However, as will be seen, by use of highly efficient offset high ECA electrodes, part of this loss capacitance can be gained back. Those skilled in the art will realize that it is not possible to directly form a gold braze connection 134 or 138 directly to alumina ceramic. The surface of the alumina ceramic must be prepared to accept the gold braze.

Figure 20:
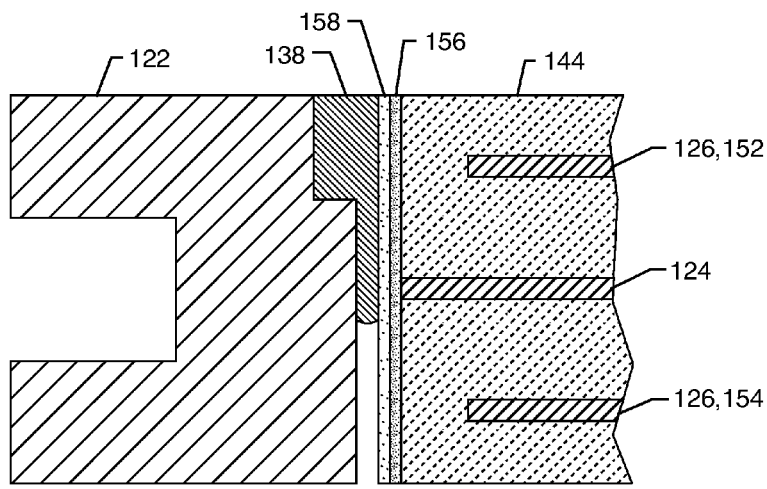
FIG. 20 is an enlarged view of the structure of FIG. 19 taken along line 20-20 illustrating an adhesion and wetting layer electrically connecting the feedthrough filter capacitor to the ferrule with a gold braze.

One is referred to FIG. 20, which is a blown up view taken from section 20-20 from FIG. 19. One can see that there is an adhesion layer 156, which is typically of niobium, aluminum or the like. This surface is generally applied by sputtering directly to the alumina ceramic insulative dielectric. A second layer 158 is then sputtered down on top of layer 132. Layer 158 is commonly referred to as the wetting layer. In a preferred embodiment, the wetting layer 158 would be sputtered titanium, which will readily accept gold braze material 138. The leadwires 116a and 116b are electrically coupled in a similar manner. First an adhesion layer 156 is sputtered on followed by a wetting layer 158 as previously described. A gold braze joint 134 is formed between the wetting layer 158 and the leadwire 116, which is typically a biocompatible material such as platinum iridium or the like. A gold braze is formed at high temperature, which mechanically and hermetically attaches and seals the ferrule 122 to the wetting layer 158. This has the effect of plumbing a highly efficient hermetic seal between the hermetic seal insulator 144 and ferrule 122. It is extremely important that all of the elements of this hermetic seal be mechanically very robust, both in tension and in compression. The reason for this is best explained by referring once again to FIG. 19. When the hermetic terminal subassembly 110 is installed into the housing 112 of the AIMD, it is generally laser welded 128. This laser weld is a continuous weld all around the perimeter or diameter of the ferrule 122. This causes the ferrule 122 to substantially heat up and expand away from the hermetic seal insulator 144. Some of these stresses are absorbed by gold braze material 138, however, it is very important that the wetting layer 158 and the adhesive layer 156 be very strong and firmly attached to the hermetic seal insulator 144. There is also substantial amount of tensile stress during brazing and then compression stress during cooling, that is applied to the ceramic (or glass) insulative material 144. It is a general rule of ceramic engineering that the lower the dielectric constant, the physically stronger the material becomes. Accordingly, the use of high dielectric capacitor materials in place of insulator 144 simply will not work. U.S. Pat. No. 6,008,980 contemplated using high k capacitor dielectric materials to form a hermetic seal insulator with embedded electrodes which would be directly brazed inside of a ferrule. One is referred to FIGS. 1 and 3 of the U.S. Pat. No. 6,008,980, the contents of which are incorporated herein by reference. Several years and over a million dollars were spent by the assignee of the U.S. Pat. No. 6,008,980 to try to achieve reliable producible product in accordance with the patent drawings. This project failed repeatedly and miserably due to the micro cracks that would always be formed within the high k barium titanate ceramic. These micro cracks sometimes destroyed the hermeticity of the hermetic seal. At other times, cracks were formed between adjacent electrode plates which reduced the insulative resistance of the filter capacitor or worse yet, cause short circuits of the filter capacitor. After several years of various attempts, including stress relieving attempts as illustrated in FIG. 9 of the U.S. Pat. No. 6,008,980, it was decided to abandon the project. The conclusion was that high k dielectric materials, such as ceramic dielectric materials, are not strong enough and are therefore not suitable for the hermetic terminals of AIMDs. Not only must an AIMD hermetic terminal withstand the stresses due to insulation by laser welding, they must also withstand the pull and push and bending forces on the leads or terminal pins 116.

Figure 21:
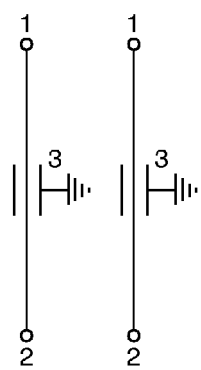
FIG. 21 is an electrical schematic corresponding to the bipolar feedthrough filter capacitor of FIG. 19.

FIG. 21 is the bipolar electrical schematic of the integrated feedthrough capacitor hermetic seal of the present invention previously illustrated in FIG. 19 and similar to FIGS. 5 and 10.

Figure 22:
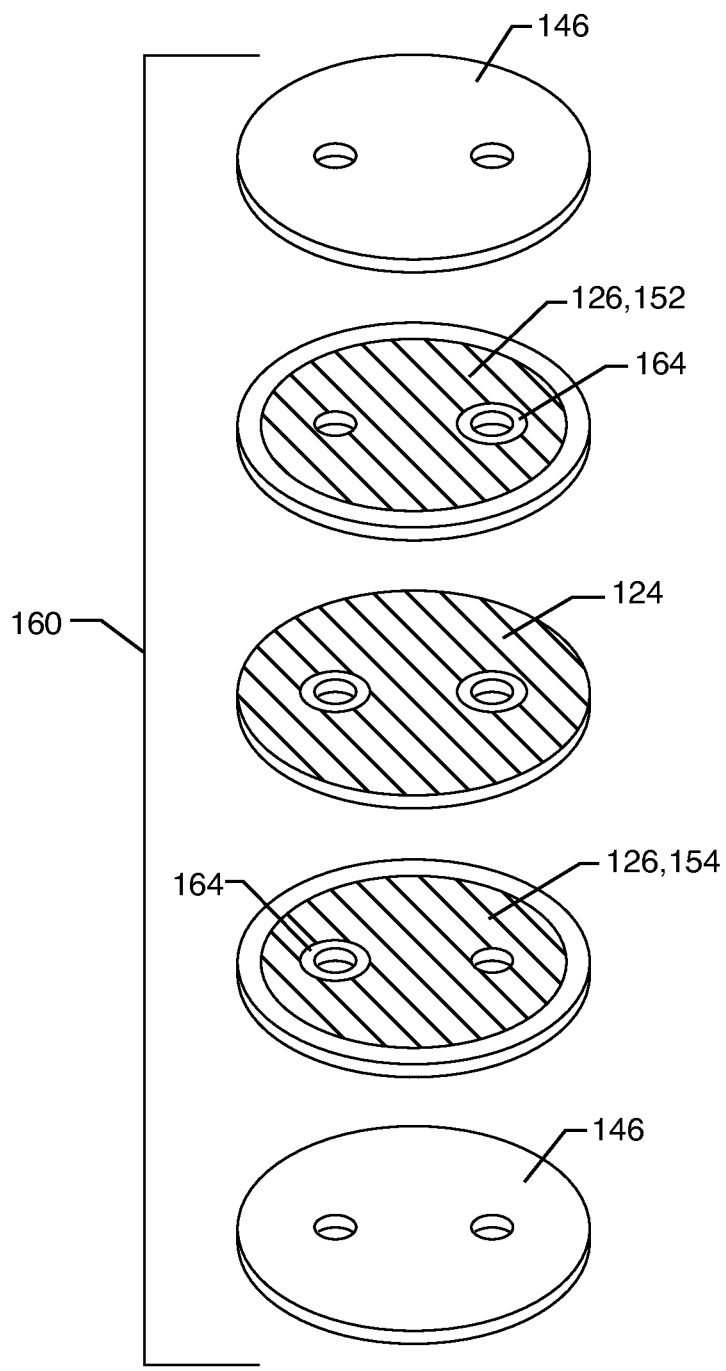
FIG. 22 is an exploded view of the capacitor structure of FIGS. 19-20 illustrating the stacking of active and ground electrode plates.

FIG. 22 illustrates an exploded view of the layers of the high ECA offset electrode capacitor 160 of FIG. 19. Item 146 represents one or more alumina ceramic cover layer(s) blanks to provide mechanical strength, electrical insulation and a stable gold braze surface. In this multilayer construction, novel high ECA active offset electrodes 152 and 154 are shown, which connects to terminal pins 116. Shown, is high ECA active electrode plate 126, 152 which connects to terminal pin 116a (not shown). Disposed next is a ground electrode 124, which connects at the outer diameter through gold braze to the ferrule 122 and in turn, to the overall electromagnetic shield 112. Disposed next is active electrode plate 126, 154 which is also a highly efficient, high ECA electrode, which in this case, is connected to leadwire 116b (not shown). As before, one can add any number of additional active and ground layers as required to achieve a higher capacitance value. At the bottom of the stack up is another insulative cover layer(s) 146 as previously described. The reasons the high ECA electrodes are highly efficient can be best understood by referring back to FIG. 6. One can see that with the existing electrode technology, wherein the active electrodes 126-126''' are generally silk-screened onto a single layer(s) of the multilayer capacitor, one can see that there is a margin width 148. This is essential so that the four active plates don't short out to each other. Unfortunately, this prior art construction results in a wasted area 162 which does not contribute at all to the capacitor overlap or ECA.

Referring once again to FIG. 22, one can see that layers 152 and 154 do not have the margin width 148 and wasted area 162 as previously illustrated in FIG. 6. In the present invention, there is a very small margin area 164 associated with layers 152 and 154 for pin diameter clearance, but it is very small compared to the relatively large area 162 as described in FIG. 6. Calculations by the inventors have shown that volumetric efficiency with using this high ECA electrode approach can result in as much as 40% gain in ECA. This is particularly true as the number of leadwires or poles increases. For example, for a typical octapolar construction, one achieves about a 40% increase in volumetric efficiency using the novel high ECA electrode offset approach. Referring once again to FIG. 19, one can see that this is a high ECA electrode plate integrated feedthrough capacitor-hermetic seal, wherein high frequency filtering and hermetic sealing is accomplished all in one single structure.

The results in FIG. 19 are a highly simplified integrated feedthrough capacitor-hermetic seal wherein, high frequency filtering and hermetic sealing is accomplished all in one single structure. There is still a down side to this approach in that, the ceramic material 146 that is used in the construction is relatively low k (below 10). In prior art feedthrough capacitors used for AIMDs, the capacitance value is typically between 390 and 2500 picofarads. In the present invention as shown in FIG. 19, the capacitance value would generally be on the order of 10 to 400 picofarads. As one can see, this is substantially less than has been used in the prior art. The prior art capacitance values evolved over many years of testing of AIMDs against emitters, such as microwave ovens, cellular telephones, RFID emitters and the like. Accordingly, it is important that the total capacitance still be in the 390 to 4000 picofarad range. However, as will be shown in subsequent drawings, if one intercepts the high frequency energy at the point of leadwire ingress into the AIMD and diverts it into the housing 112 in the AIMD, then the relatively long wavelength energy that is left can be filtered on the circuit board on another location. This results in a dual stage or composite filtering approach, which is extremely effective.

Embedded electrode plates have been previously described in U.S. Pat. No. 6,008,980. In this case, attempts were made to use high k dielectric materials to also affect a hermetic seal. Many years of research went into this at Greatbatch Medical to no avail. Every attempt resulted in cracking or hermetic seal defects. It is a basic principle of ceramic engineering that the higher the k of a material, the weaker it becomes. In contrast, this is why alumina ceramic, with a k of less than 10, makes for a very strong and robust hermetic seal. It can not only withstand all of the brazing stresses and cooling stresses, it can also withstand mechanical stresses during laser welding into an AIMD housing, and subsequent attachment of leads involving pull stresses and the like. U.S. Pat. No. 6,008,980, of course, could be built of alumina; however, without the invention of the highly efficient high ECA offset electrodes, not enough capacitance could be achieved to strip off the high frequency energy. Accordingly, the U.S. Pat. No. 6,008,980 never became commercially viable or successful.

One is also referred to U.S. Pat. No. 7,035,076, the contents of which are incorporated herein by reference. Shown, are ground electrode plates embedded in an alumina ceramic hermetic seal insulator. These ground plates were for the purposes of providing a grounded pin for an internally grounded feedthrough capacitor. Internally grounded feedthrough capacitors are well known in the prior art and are described by U.S. Pat. No. 5,905,627, the contents of which are incorporated herein by this reference.

Figure 23:
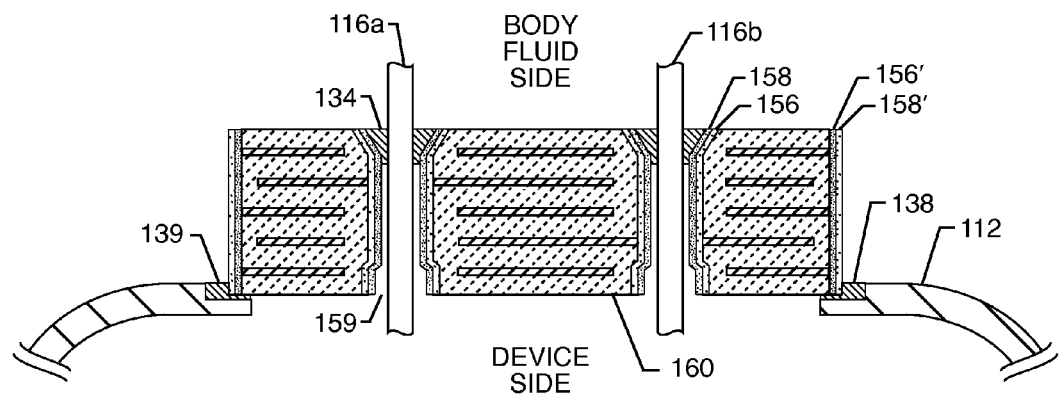
FIG. 23 is a sectional view of a bipolar feedthrough filter capacitor directly attached to the active implantable medical device housing without the use of a ferrule.

FIG. 23 is very similar to FIG. 19 except that the ferrule 122 has been eliminated. Elimination of the ferrule is very important since the ferrule is a very expensive titanium machine structure, which also takes up a substantial amount of volume and also adds undesirable weight to the AIMD. In this case, there is a direct gold braze 138 between the housing of the AIMD 112 and the integrated feedthrough capacitor hermetic terminal insulator 160. Leadwire 116 is installed in the same manner that was previously described for FIG. 19. FIGS. 19 and 23 illustrated that the present invention can be used with or without a ferrule structure 122. Referring once again to FIG. 23, it is extremely important that the insulative dielectric material 160 be of a low k material, such as alumina ceramic. In the present invention, the k of this material is generally less than 10 in order to provide the high mechanical strength necessary for direct brazing 138 as illustrated. This is particularly important when there is no ferrule 122 involved.

The novel EMI filter hermetic seal of FIG. 23 is shown sitting on top of a machined ledge 139 formed in the AIMD housing itself. This ledge eliminates the need for complicated fixturing. During gold brazing operations, a gold pre-form would be placed around the outside perimeter of the hermetic seal-feedthrough capacitor and be flowed at high temperature into place 138. Referring once again to FIG. 23, one can see that there is a convenient counterbore 134, which is actually formed by a drill tip by machining the alumina ceramic hermetic seal in the green state (before firing). Machining the green ceramic is quite easy and does not wear the tools as opposed to trying to drill a countersink into a sintered hard surface. The countersink or counterbore performs two very important functions: 1) it provides a place for a gold pre-form 134 to sit as the entire assembly is placed into a gold braze furnace. This allows an area for the gold braze pre-form 134 to flow and also be dimensionally constrained; and, 2) the counterbore is important to open up a window during sputtering or metallizing the surfaces on the inside diameter of the holes of the composite hermetic seal-feedthrough capacitor.

This generally consists of an adhesion layer 156 and a wetting layer 158 as previously described in FIG. 20. It's hard for the sputter deposition beam to reach the inside of a cylindrical surface. Accordingly, opening up the end with a counterbore allows the beam to penetrate further and allows for a more consistent deposition of the adhesion layer 156 and the wetting layer 158.

Referring once again to FIG. 23, one can see that at the bottom of the capacitor, there is also an optional counterbore or countersink 159. This doesn't have to be nearly as large in diameter as the countersink on top. However, by opening this area up, again, it provides a better angle of approach and a better deposition for the sputtering machine for laying down adhesion layer 156 and wetting layer 158.

Figure 23A:
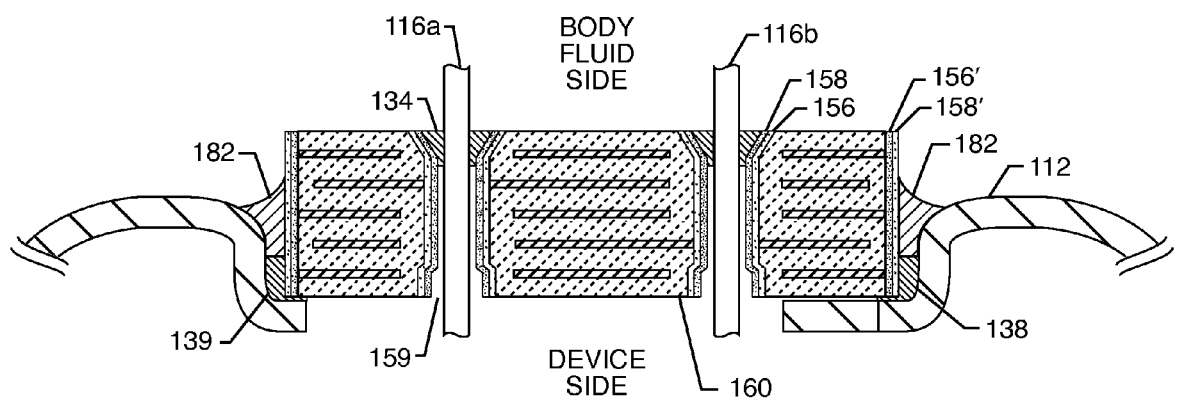
FIG. 23A is a sectional view of a bipolar feedthrough filter capacitor directly attached to the active implantable medical device housing without the use of a ferrule similar to FIG. 23, now showing a drawn or extended housing.
Figure 23B:
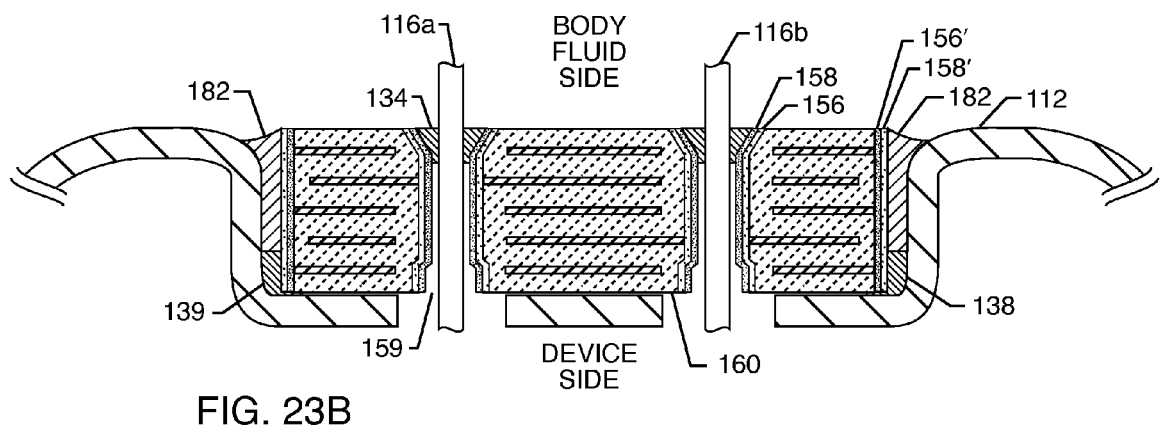
FIG. 23B is a sectional view of a bipolar feedthrough filter capacitor directly attached to the active implantable medical device housing without the use of a ferrule similar to FIG. 23, now showing a deep drawn or deeply extended housing.

FIG. 23A is very similar to FIG. 23 except that in this case, the AIMD housing 112 has not been machined with a step. Instead a deep drawing process is used to bend the metal 112 down and form the step 139 onto which the composite hermetic seal-feedthrough capacitor 160 can sit. This step also forms a place for the gold braze pre-form 138 to sit as the entire subassembly is placed into a gold braze furnace. This step 139 can be partially drawn so that the hermetic seal-feedthrough capacitor sits partially down into this recession. Alternatively, as shown in FIG. 23B, the step can be deep drawn such that the hermetic seal-feedthrough capacitor sits down deeply into the deep drawn step. As shown, the capacitor can be flush mounted, or it could be sub-flush (not shown) or the like.

Referring once again to FIG. 23B, one can see that the bottom of the deep drawn area of the housing 112 is continuous across the entire bottom of the integrated feedthrough capacitor hermetic terminal insulator 160. There are clearance holes for the lead 116 to pass through this web plate in non-conductive relationship. As before, a gold braze pre-form 138 provides a hermetic seal. As shown in FIGS. 23A and 23B, an optional medical sealant 182 is placed over the gold braze 138. This provides 3 important functions: 1) it covers the top of the gold 138 so it cannot electro-migrate or redeposit during long term exposure or electrolyte solution, such as body fluid. This is important since there is a voltage (pacemaker pulses) between leads 116 and the housing 112. It has been demonstrated in previous studies that the gold can electro-migrate and redeposit to an area distant from the hermetic sealer 138. This would undesirably weaken the hermetic seal or even possibly allow for intrusion of body fluids into the electronic housing; 2) the medical grade sealant, such as a silicone, prevents debris or foreign materials from entering into this space surrounding this internally grounded feedthrough capacitor 160; 3) this also makes for a more cosmetically pleasing assembly.

Figure 23C:
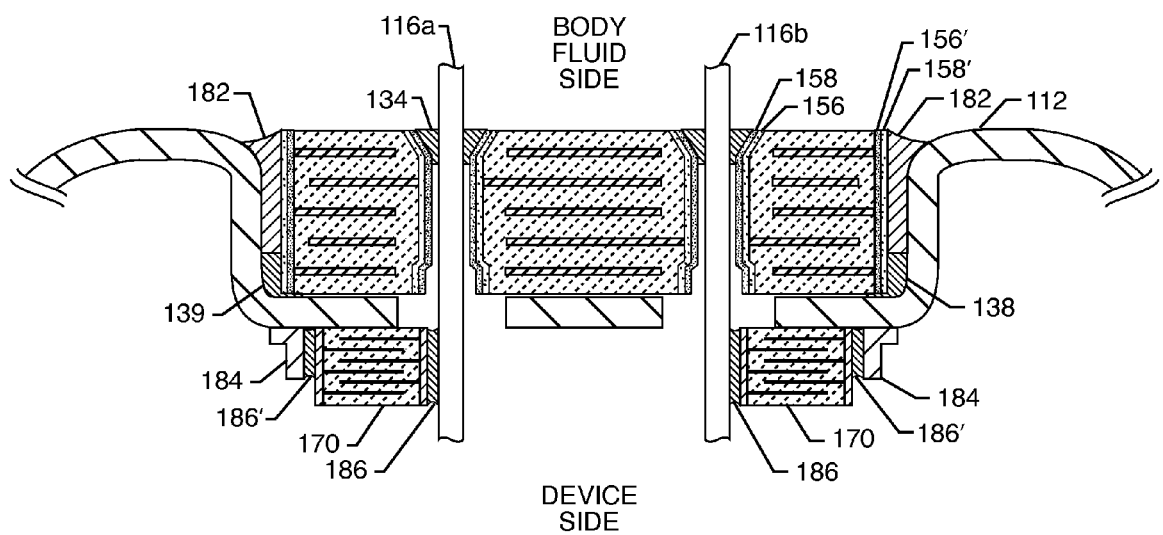
FIG. 23C is a sectional view of a bipolar feedthrough filter capacitor, now including monolithic chip capacitors attached to the terminal pins.

FIG. 23C is very similar to FIG. 23B except in this case, monolithic ceramic chip capacitors (MLCCs) 170 are conveniently installed between terminal pin 116A and 116B and the web plate or housing 112. Optional brackets 184 can be pre-brazed, welded or attached by spot welding to housing 112 to make for a convenient location to solder or use a thermal-setting conductive adhesive to attach to the termination of the ceramic capacitor 170. It will be obvious to one skilled in the art that these attached structures 184 can be L-shaped as shown or a variety of other shapes to facilitate convenient holding and attachment and automated electrical testing of the MLCC capacitors 170. As mentioned, an electrically conductive material, such as a solder, conductive adhesive, braze or the like 186 makes an electrical connection to the pin 116 to the left-hand MLCC capacitor termination 170. The right hand capacitor termination material is attached either directly to the web plate of housing 112 or to an intermediate bracket 184 again by soldering, brazing, thermal-conductive adhesive or the like. The importance of adding supplemental MLCC chip capacitors will be further explained in drawings 49 through 53 herein.

Figure 24:
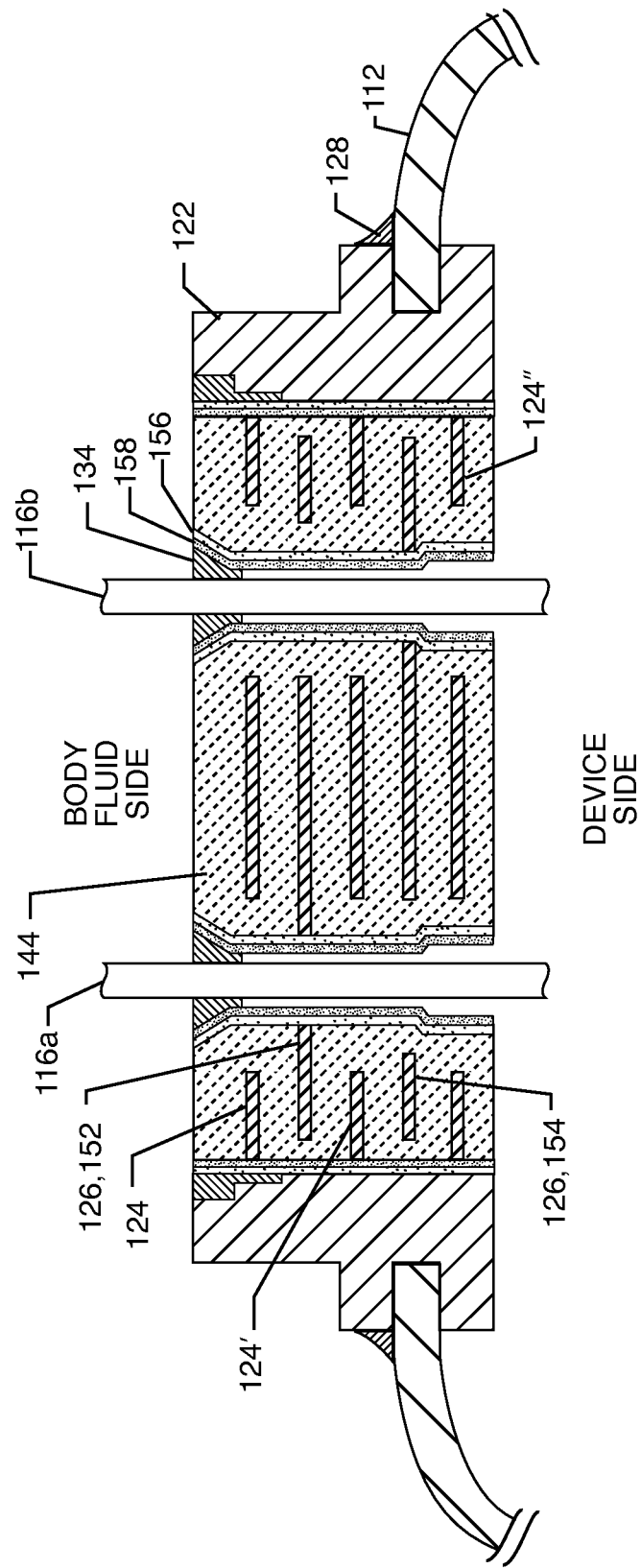
FIG. 24 is a sectional view of another exemplary embodiment of the present invention illustrating offset electrode plates of a bipolar feedthrough filter capacitor.

FIG. 24 is very similar to FIG. 19. As one can see, the ferrule 122 has more of F shape. The important detail is that two additional ground plates have been added. In the embodiment illustrated in FIG. 24, there are three ground plate layers 124, 124' and 124". This greatly increases the volumetric efficiency and also increases the capacitance. This is best understood by studying one of the active electrode plates 126, 152. In FIG. 19, this active electrode plate is only exposed on one side to a ground electrode plate. This has the effect of creating a single effective capacitance area (ECA). Now referring back to FIG. 24, we can see that active electrode plate 126, 152 is sandwiched between two ground electrode plates 124 and 124'. This creates an effective capacitance area both on the top and on the bottom of the active electrode plate 126. Accordingly, the volumetric efficiency of the capacitor is greatly increased. The same thing happens for the other active electrode plate 126, 154 as it is also sandwiched between two ground electrode plates 124' and 124". It will be obvious to those skilled in the art that the electrode pattern as shown in FIG. 24 can be repeated as many times as is necessary. In other words, one can have 5 total electrodes as shown or one could have 10, 15, 20 or even n number of electrodes. An advantage of using a low k material (less that 10), such as alumina, is that the dielectric voltage breakdown strength of such low k materials are very high. In most cases, the dielectric breakdown strength is over 1000 volts per mil. This means that the dielectric layers or the layers that separate the active and ground electrodes can be made very thin. This means that the capacitance can be increased by putting more layers in the same overall package height.

Referring once again to FIG. 24, one can see that the body fluid side and the device side can be easily reversed. That is true of any of the composite feedthrough capacitor-hermetic seals of the present invention. The reason is the ceramic 144 is biocompatible as well as its gold brazes 128, 134. Typically, the material used to form the ferrule 122 is of biocompatible titanium and the like. When the ferrule 122 is in an F shape or is asymmetrical as illustrated in FIG. 24, this gives one the advantage of being able to place the bulk of the composite feedthrough capacitor-hermetic terminal towards the body fluid side (in the header block, for example) or towards the inside of the device. This allows for manufacturing flexibility and also flexibility in inventory in that an inventory filter can be used in various ways. It will be obvious to those skilled in the art that this same principle applies to any of the drawings herein.

Figure 25:
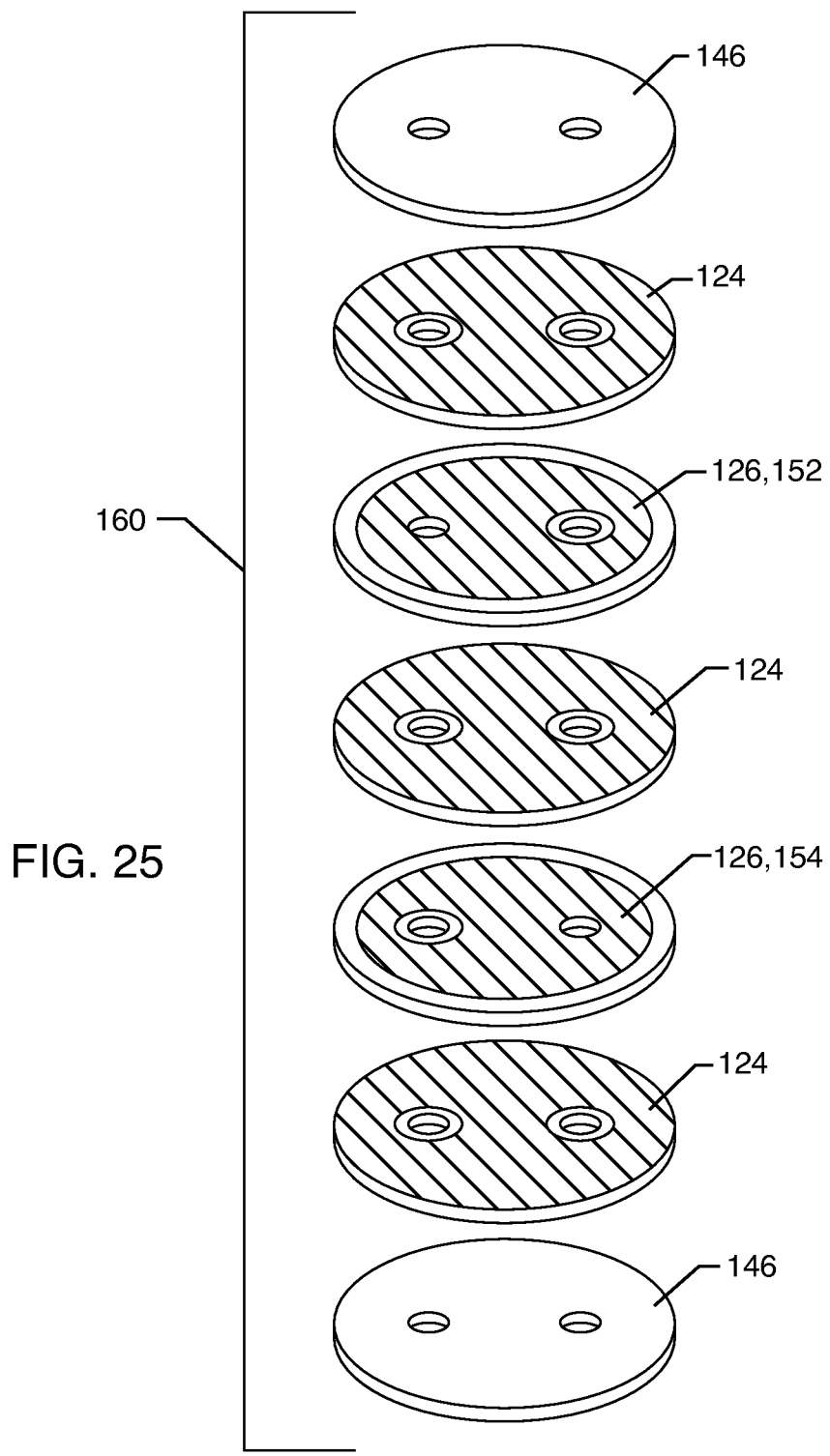
FIG. 25 is an exploded view of the capacitor structure of FIG. 24 illustrating the stacking of active and ground electrode plates.

FIG. 25 illustrates an exploded view of the high ECA offset electrode capacitor 160 of FIG. 24. FIG. 25 is very similar to FIG. 22 except that in this case, the high ECA offset electrodes 126, 152 and 126, 154 are surrounded or sandwiched top and bottom by ground plates 124.

FIG. 26 gives the formula for capacitance, wherein the capacitance is equal to the dielectric constant k times the area which is also known as ECA times $(n^{-1})$ all divided by the dielectric thickness. "n" is the number of electrode plates. Referring back to FIG. 25, one can see that there are a total of 5 electrode plates which yields $n^{-1}$ or four active areas. An advantage of using an extremely high mechanical strength low dielectric constant material, such as alumina, is that they have a very high dielectric breakdown strength. This means that d the dielectric thickness can be very thin (even below 1/1000"). Referring back to the formula of FIG. 26, one can see that the capacitance increases as the dielectric thickness decreases (an inverse relationship). The close dielectric spacing also yields another advantage in that since the electrode layers are spaced very closely together, one can put more of them in the same overall thickness of a hermetic seal. Again, referring back to the equation in FIG. 26, as one increases a number of electrodes n one also again increases the capacitance. Accordingly, the loss and filtering efficiency between prior art high k dielectrics (wherein k is greater than 2000) compared to the present invention (wherein the k is generally less than 10) does not mean that the capacitance is reduced by the ratio of 2000/10 or 200 to 1. The reason for this is as previously stated. By using the low k high mechanical and high electric strength materials, one can make the dielectric thickness thinner and that means that we can add more electrode plates "n". Therefore, the dielectric efficiency loss instead of being 200 to 1 is closer to 50 or 70 to 1. However, one still has much less capacitance in this present integrated hermetic terminal feedthrough capacitor design as compared with placing a prior art feedthrough capacitor on top of the hermetic terminal as previously illustrated, for example, in prior art FIG. 3. It will be shown in subsequent drawings that it is possible to supplement the capacitance by adding additional capacitance in other locations such that the total filtering or attenuation remains about the same as in the prior art.

FIG. 27 is very similar to FIG. 19 except that it illustrates a quadpolar integrated hermetic terminal 110/feedthrough capacitor 160.

FIG. 28 illustrates a prior art quadpolar active electrode plate set which could be used in the composite feedthrough capacitor hermetic terminal as illustrated in FIG. 27. However, as previously described, this electrode plate layout is not particularly efficient because of the wasted area between the active electrodes on the one plane. In accordance with the present invention, the high ECA offset electrode as illustrated in FIG. 29, is the preferred embodiment. In this case, the effective capacitance area increases significantly.

Figure 30:
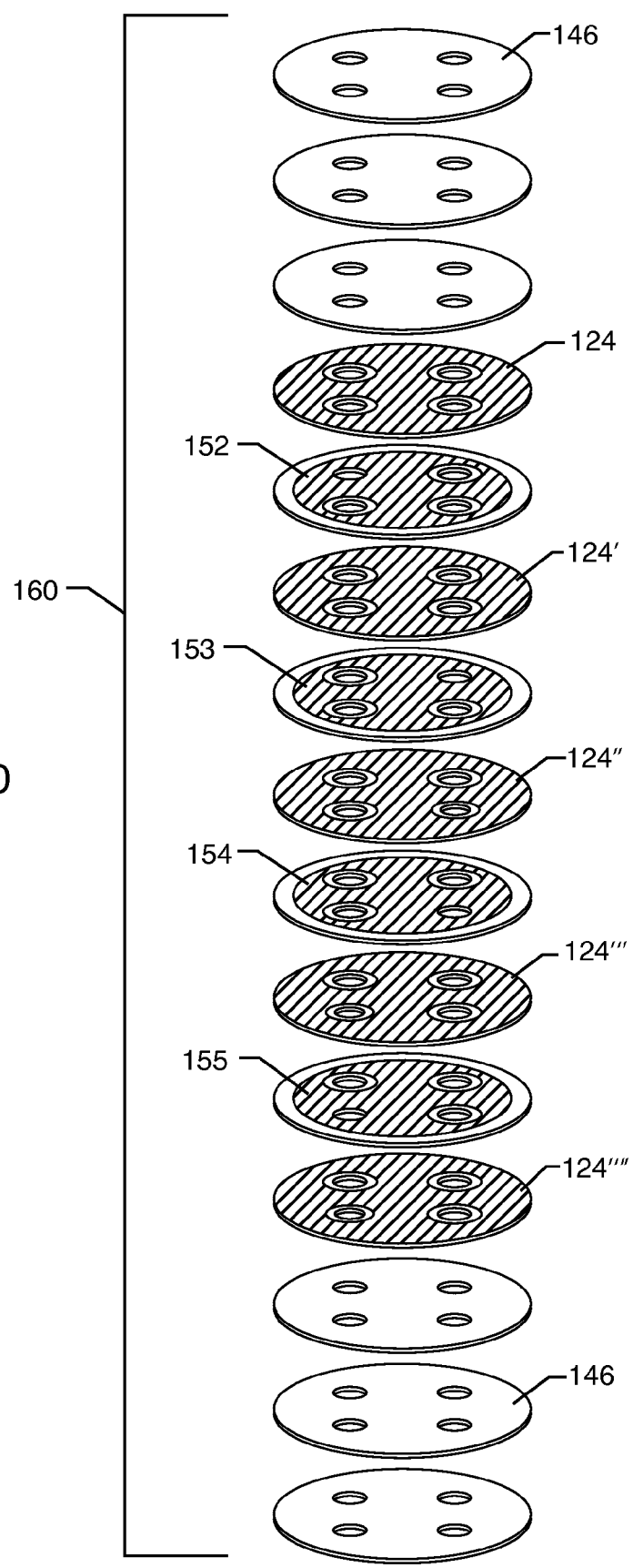
FIG. 30 an exploded view of the capacitor structure of FIG. 27 illustrating the stacking of active and ground electrode plates.

FIG. 30 illustrates an explosion of the high ECA offset electrodes of FIG. 27. One can see that since it is quadpolar, the minimum number of electrode plates is nine. The minimum number of active electrode planes is four with one electrode plate dedicated to each one of the leads. In order to provide a sandwich between two grounds, a total of five ground electrode plates is required. As previously stated, one could repeat this pattern as many times as necessary or as would fit within the physical design constraints of the hermetic terminal subassembly.

Figure 31:
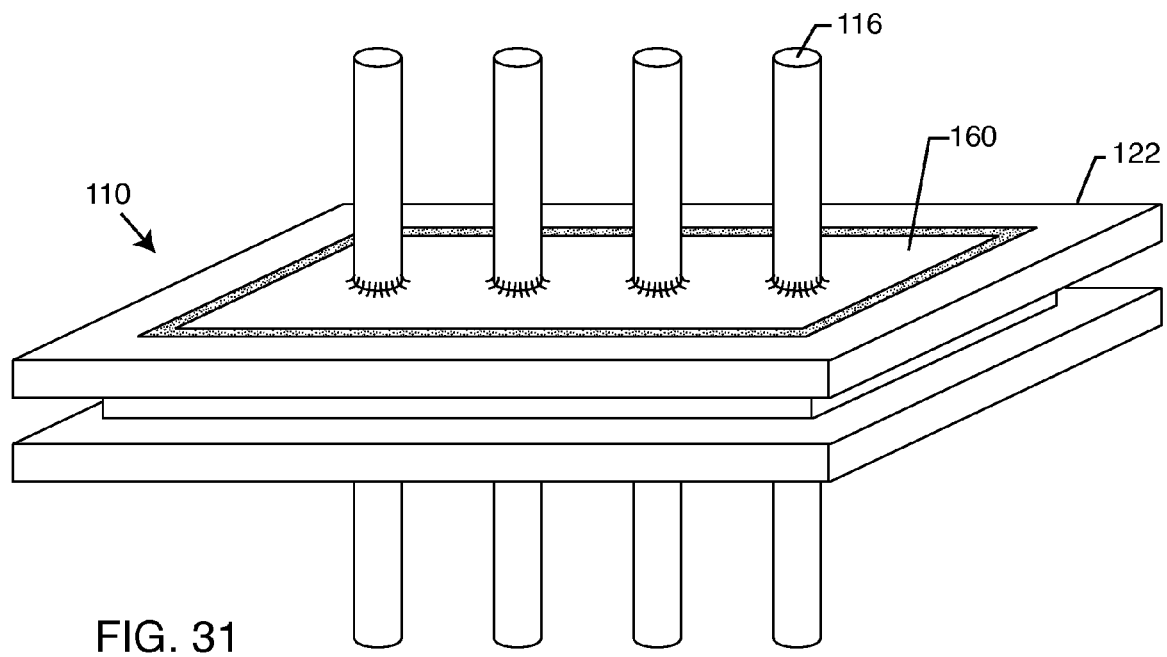
FIG. 31 is a perspective view of a rectangular quadpolar feedthrough filter capacitor assembly embodying the present invention.

FIG. 31 is very similar to the prior art hermetic terminal previously illustrated in FIG. 17. However, in this case, active and ground electrode plates have been embedded into the hermetic seal insulator 160 of the hermetic seal subassembly 110.

Figure 32:
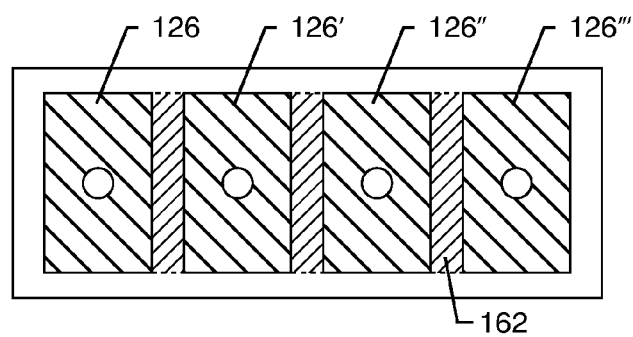
FIG. 32 is a sectional view of a prior art active electrode plate of a prior art rectangular quadpolar feedthrough filter capacitor.
Figure 33:
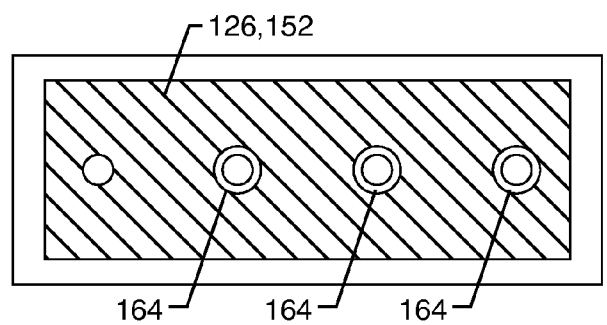
FIG. 33 is a sectional view of an exemplary embodiment of the present invention illustrating one active electrode plate from the rectangular quadpolar feedthrough filter capacitor of FIG. 31.

FIGS. 32 and 33 illustrate two different ways that the active electrodes could be configured inside of the hermetic seal insulator 160 of FIG. 31. FIG. 32 illustrates the prior art and the inefficient way to arrange the active electrodes. In this case, there is a tremendous waste of effective capacitance area 162, which is created by the required margins between having active electrodes in a single plane. FIG. 33 illustrates one plane of a high ECA offset electrode of the present invention. In this case, there is no lost area 162 as previously described in FIG. 32. Accordingly, the volumetric efficiency of the capacitor is significantly increased.

Figure 34:
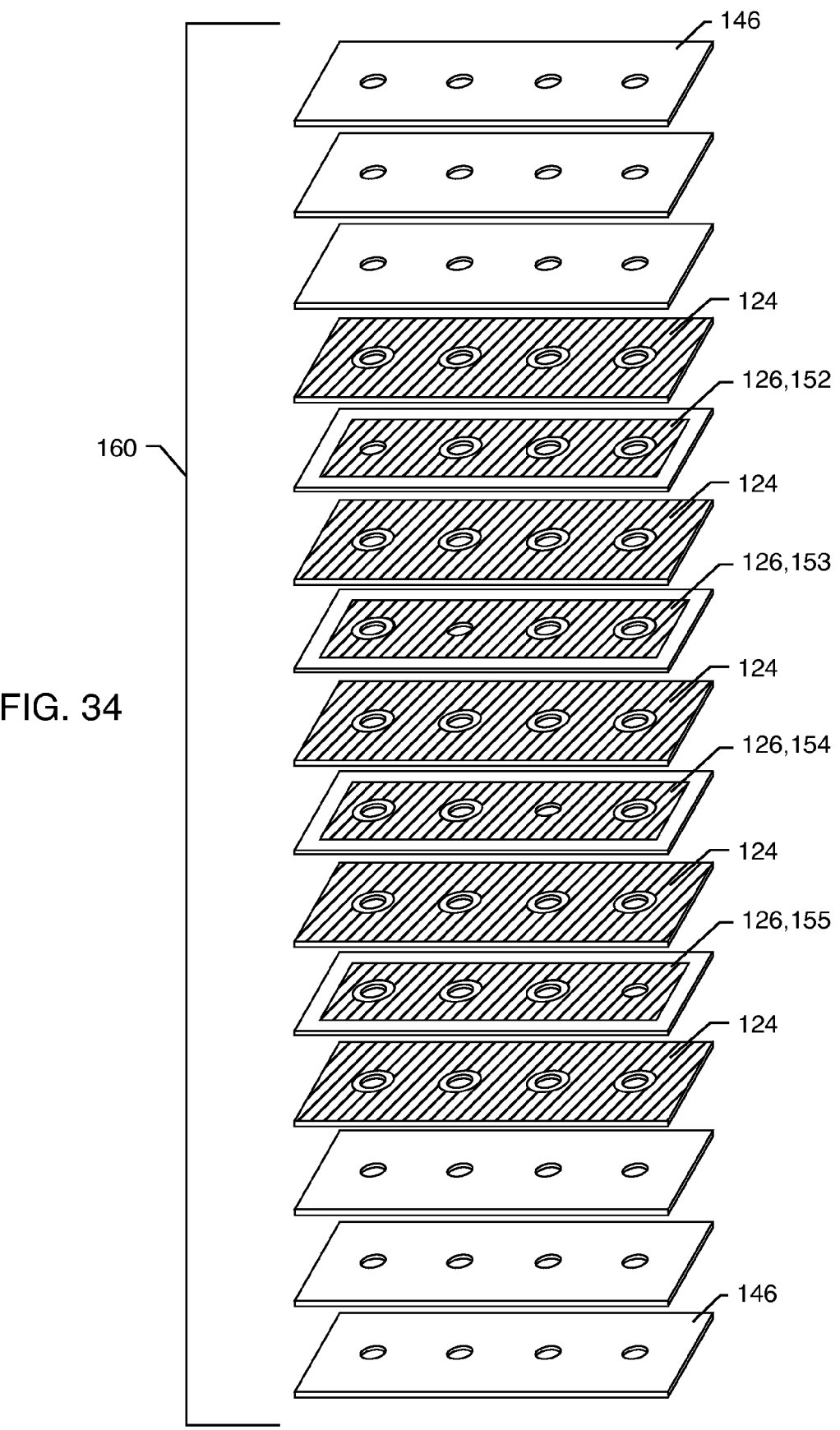
FIG. 34 is an exploded view of an exemplary embodiment of the present invention illustrating the stacking of active and ground electrode plates of the rectangular quadpolar feedthrough filter capacitor of FIG. 31.

FIG. 34 is an exploded view showing the minimum number of active electrode plate sets 152-155 that are interleaved with ground electrode plates 124 of the integrated hermetic seal-feedthrough capacitor assembly 110 as previously illustrated in FIG. 31. One can see that there are four high ECA offset electrodes 126 and five interleaved ground electrodes 124.

Figure 35:
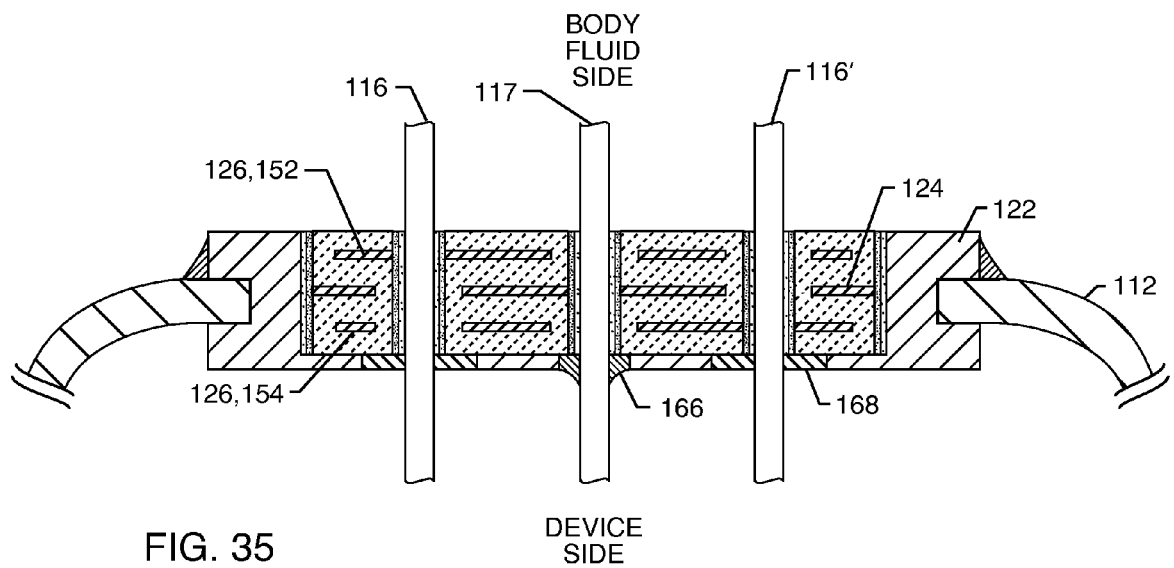
FIG. 35 is a sectional view of an exemplary embodiment of the present invention illustrating an offset electrode capacitor with an internal ground.

FIG. 35 is similar to FIG. 19 except that in this case, the integrated hermetic terminal-feedthrough capacitor is internally grounded. For a more complete description of internally grounded feedthrough capacitors, one is referred to U.S. Pat. Nos. 5,905,627 and 6,529,103, the contents of which are incorporated herein by reference. One can see, in this case, the ferrule 122 has been modified to include a webplate across the entire bottom. Clearance holes are provided along with electrical insulation 168 so that terminal pins 116 and 116' can pass through the ferrule webplate 122 in non-conductive relation. Pin 117 is attached by brazing, soldering or the like to the ferrule webplate and is therefore grounded. In other words, pin 117 is at the same electrical potential as the ferrule 122 and in turn, the AIMD housing 112. All of these are considered ground potential in the present invention. The presence of the grounded pin 117 makes it convenient to attach ground electrode(s) to pin 117. Pin 117 also provides other features and advantages. It is often desirable to be able to program or attach internal circuit board electronics to ground. Accordingly, grounded pin 117 can be attached to an internal circuit board thereby providing a convenient and highly reliable grounding path. It can even be used on the body fluid side to provide a return point for an electrode in contact with body tissue. In modern AIMDs, this feature is often programmable through the use of on board switches of the electronic circuit board.

Figure 36:
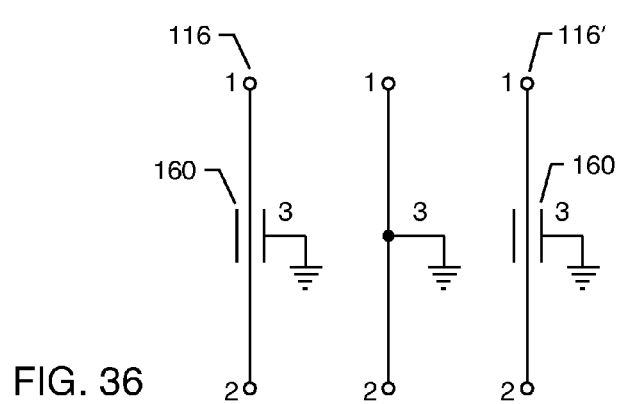
FIG. 36 is an electrical schematic corresponding to the offset electrode capacitor with an internal ground of FIG. 35.

FIG. 36 is the schematic diagram taken from FIG. 35 showing that pins 116 and 116' pass through the composite hermetic seal insulator-through capacitor in non-conductive relation. The feedthrough capacitor 160 is shown with the terminal pin passing through it. This is an electrical circuit convention showing that the feedthrough capacitor is a three-terminal device. On the body fluid side is terminal number one, on the inside of the AIMD is terminal number 2 and ground is shown as terminal number three. This transmission line coaxial capacitor is highly efficient in that it has very little internal inductance and does not exhibit any series self-resonance. This is in marked contrast to two-terminal prior art ship capacitors which have a significant amount of internal inductance and don't make particularly good high frequency filters. This is particularly important in the present invention because pacemakers and other AIMDs are exposed to high frequency emitters, such as cellular telephones, human body communication networks, RFID interrogators and the like. Since many of these frequencies are in the GHz range, it is very important that the feedthrough filter be of very low internal inductance design and be of three-terminal construction.

Figure 37:
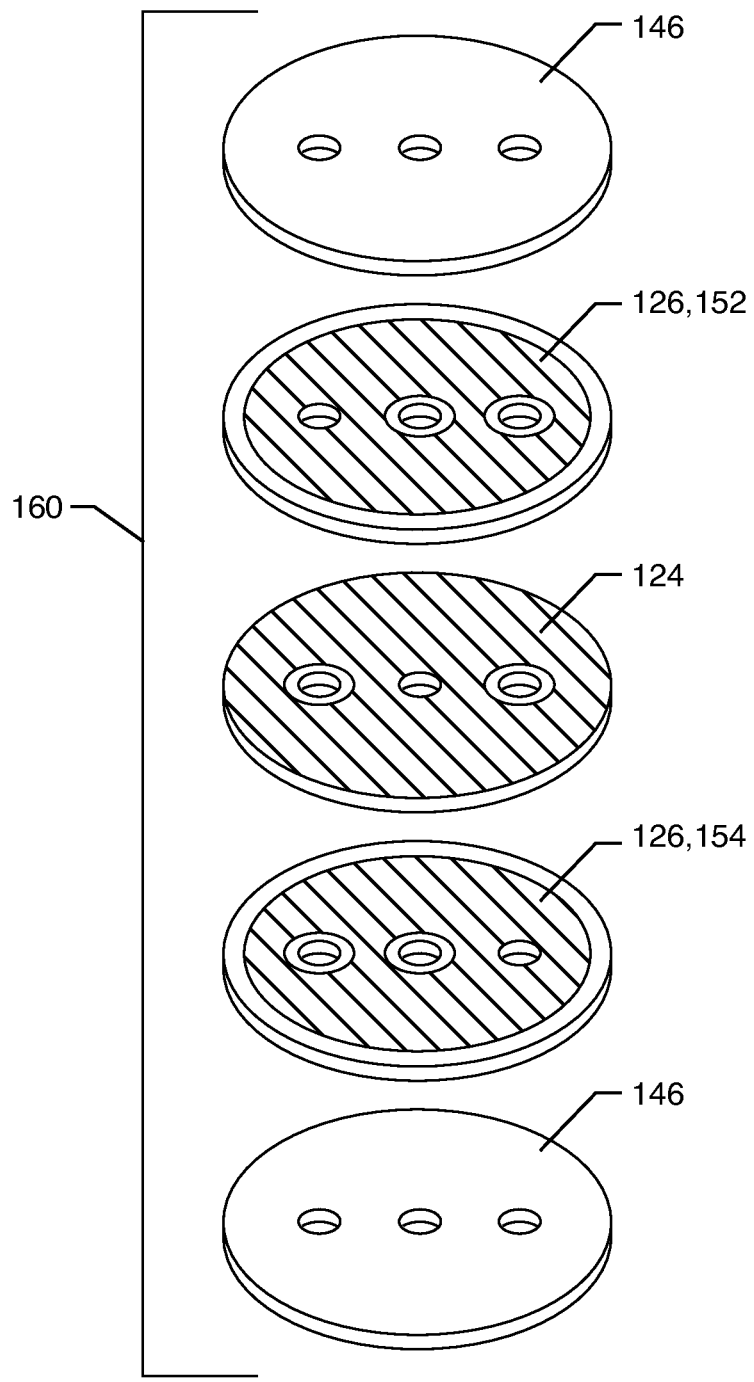
FIG. 37 is an exploded view of the capacitor structure of FIG. 35 illustrating the stacking of active and ground electrode plates.

FIG. 37 is an exploded view showing the internal electrodes of the internally grounded composite hermetic seal-feedthrough capacitor 160 of FIG. 35.

Figure 38:
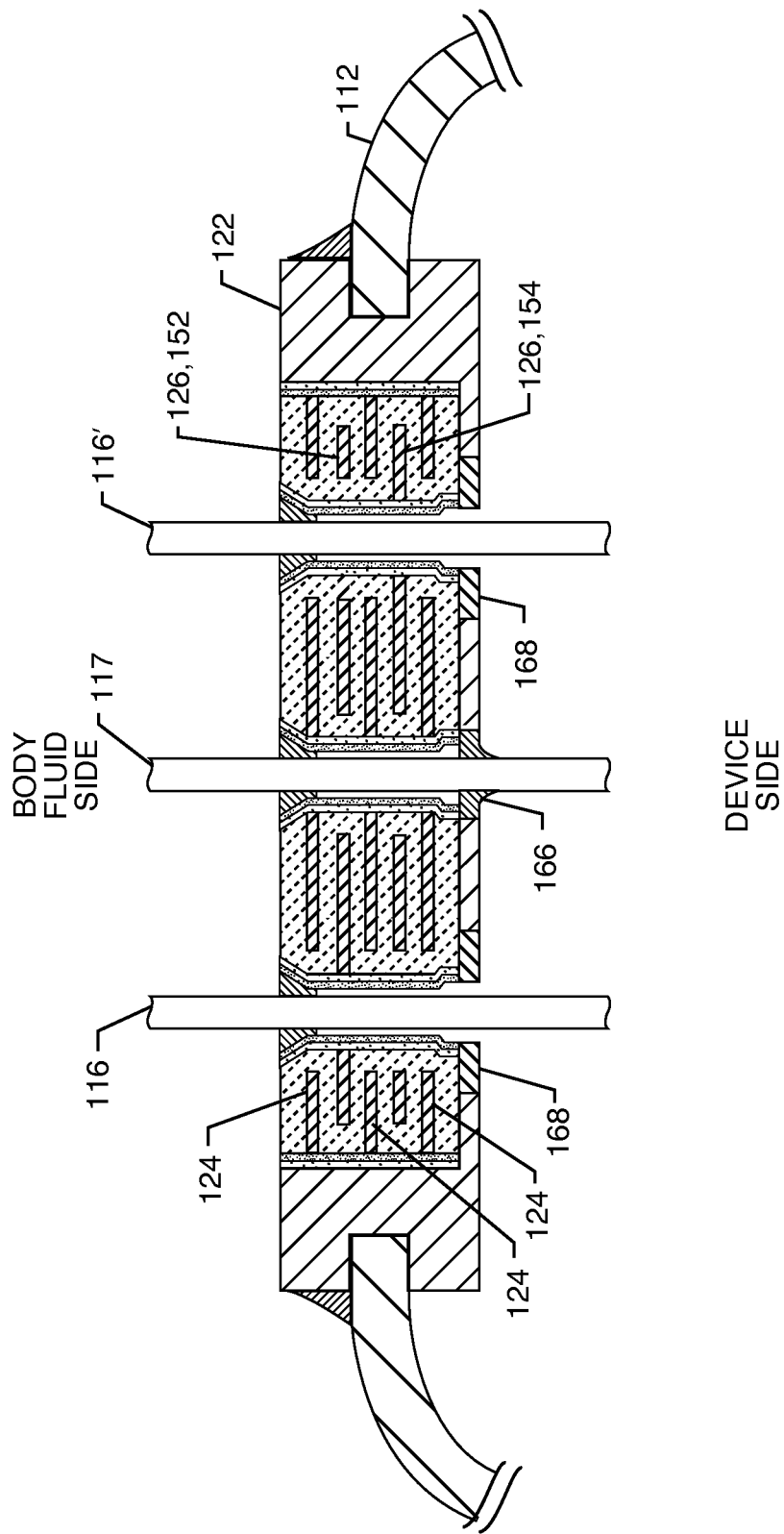
FIG. 38 is a sectional view of another exemplary embodiment of the present invention illustrating an bipolar offset electrode capacitor with an internal ground.

FIG. 38 is very similar to FIG. 35 except that ground plates have been added on the top and the bottom. As previously described, this is a much more volumetrically efficient way to build the composite hermetic seal-feedthrough capacitor. Again, a skilled designer could repeat the electrode pattern shown in FIG. 35 or 38 as many times as were desired to achieve a higher capacitance.

Figure 38A:
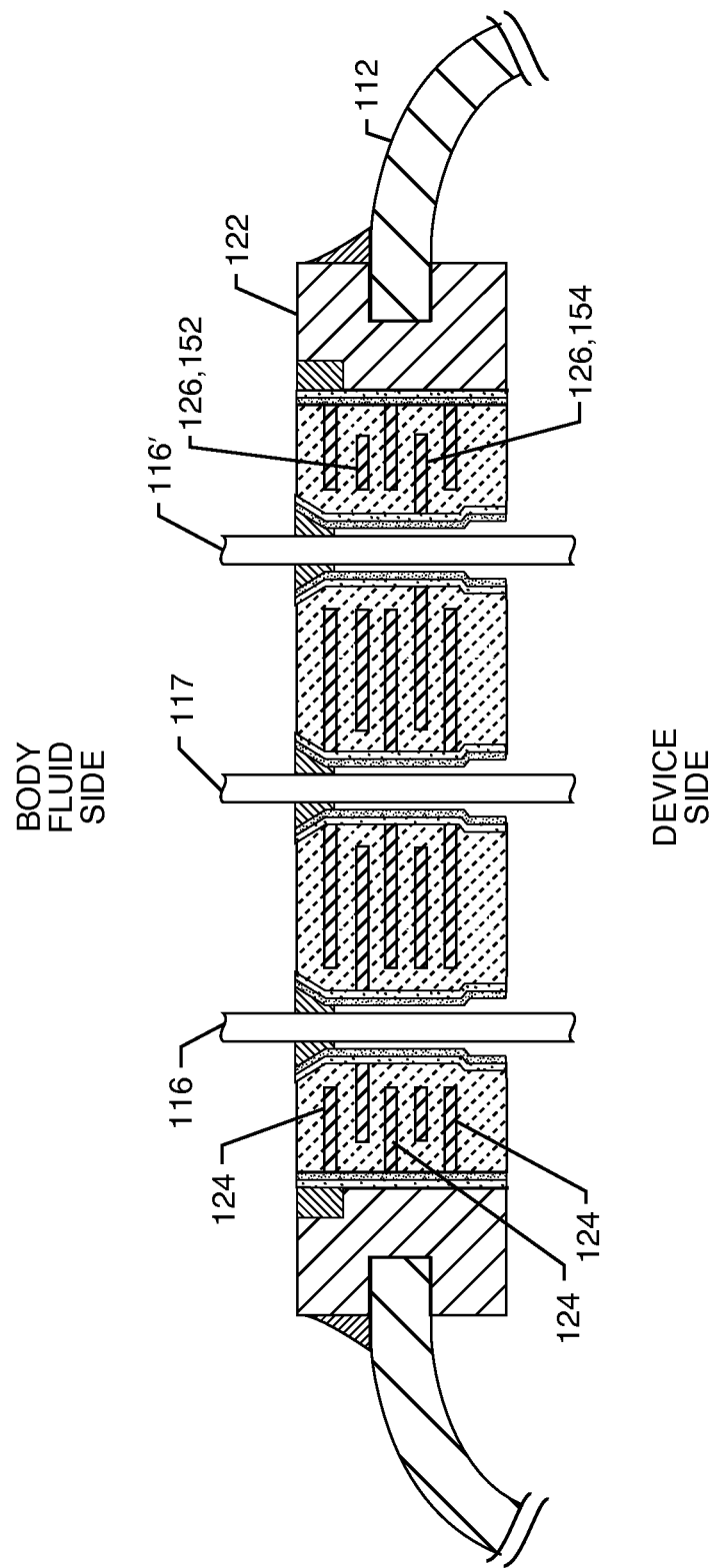
FIG. 38A is a sectional view of another exemplary embodiment similar to FIG. 38, now showing no grounded webplate as part of the ferrule.

FIG. 38A is very similar to FIG. 38 except that there is no grounded webplate formed as part of the ferrule 122. In this case, there is still a ground pin 117 which can be centered as shown or located anywhere in the hermetic seal-feedthrough capacitor assembly. In FIG. 38A, this ground pin receives its ground through ground plate electrodes which connect to the ground pin 117 and in turn are electrically connected to the ferrule 122 and in turn to the AIMD housing 112. This grounded terminal pin 117 does not need to penetrate through onto both sides of the hermetic seal-feedthrough capacitor assembly as shown. For example, it may only protrude out the bottom side for convenient attachment to a circuit board. In this case, it would be cut off so that it does not extend into the body fluid side at all. In other applications, it may be important to only attach to the body fluid side in which case, the protrusion down into the device side would not be needed. In summary, it can go all the way through as shown, stick out the top or stick out the bottom.

Figure 39:
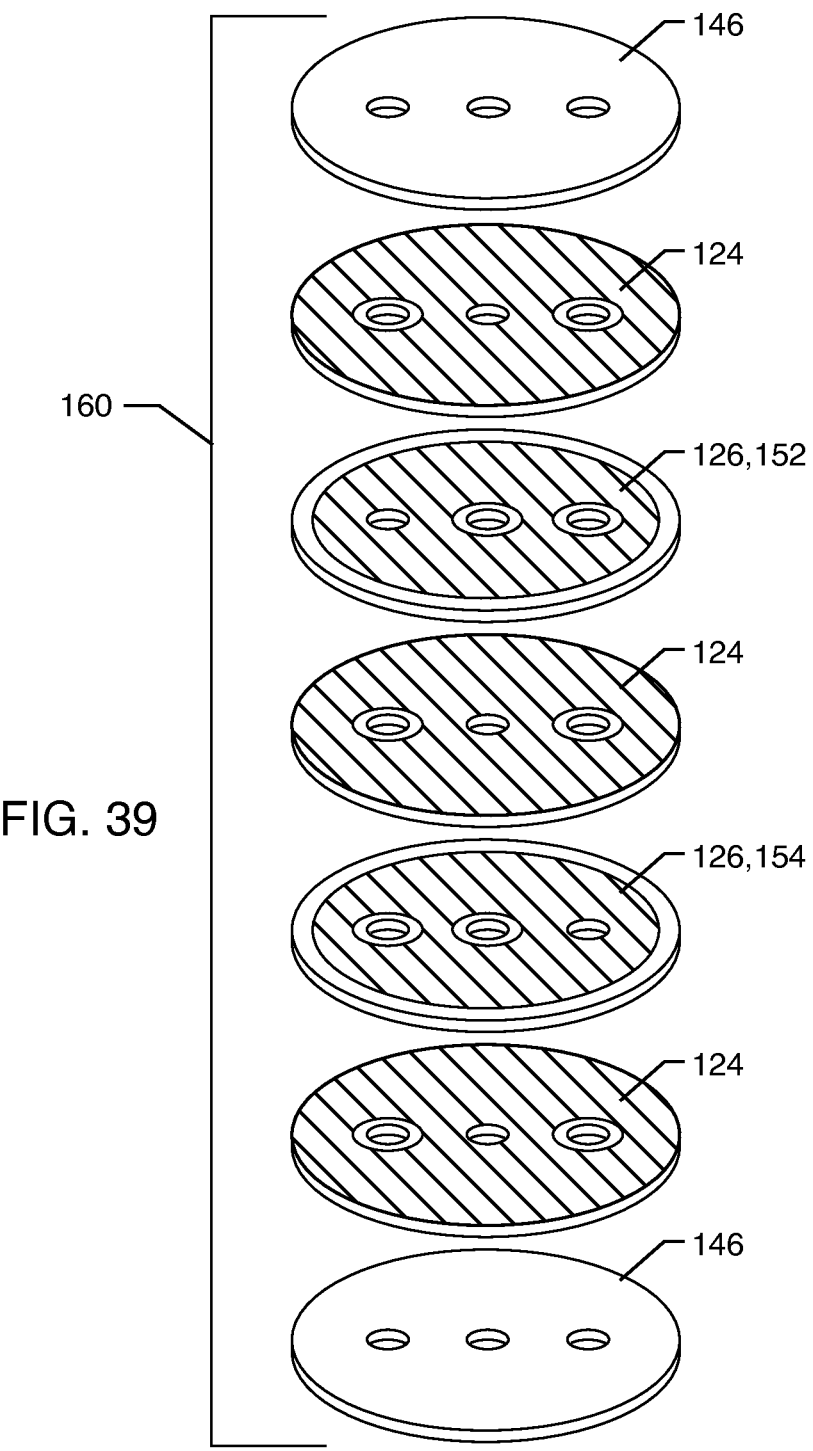
FIG. 39 is an exploded view of the capacitor structure of FIG. 38 illustrating the stacking of active and ground electrode plates.

FIG. 39 is very similar to FIG. 37 except that additional ground electrode plates have been added to the top and bottom. Again, this increases the overall volumetric efficiency of the composite hermetic seal-feedthrough capacitor.

Figure 40:
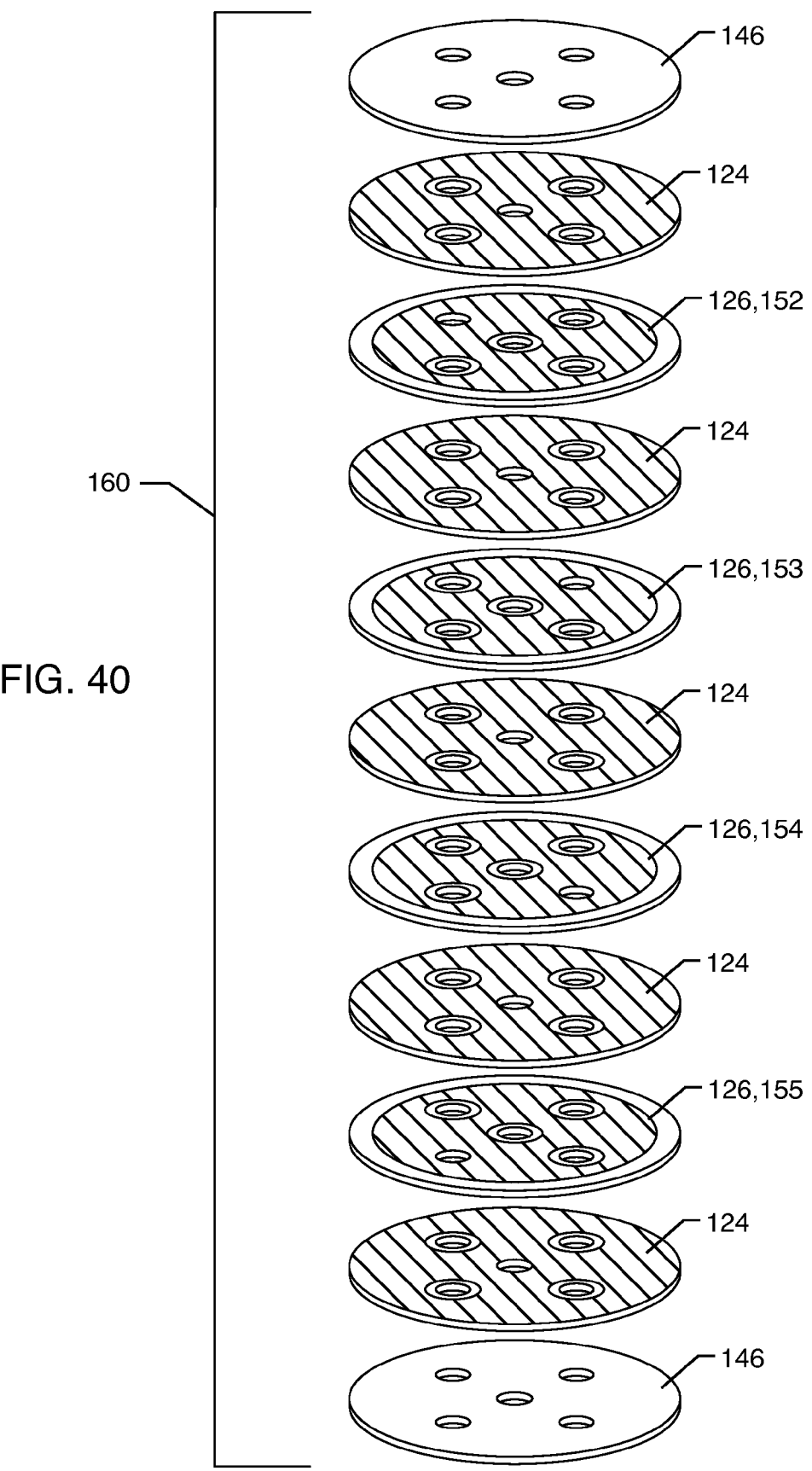
FIG. 40 is an exploded view of a structure of a round quadpolar offset feedthrough filter capacitor with an internal ground.

FIG. 40 is very similar to FIG. 39 except that it's for a quadpolar capacitor. Accordingly, for maximum volumetric efficiency, there are five internally grounded electrode plates 124 and four high ECA offset electrode plates 126, 152-155.

Figure 41:
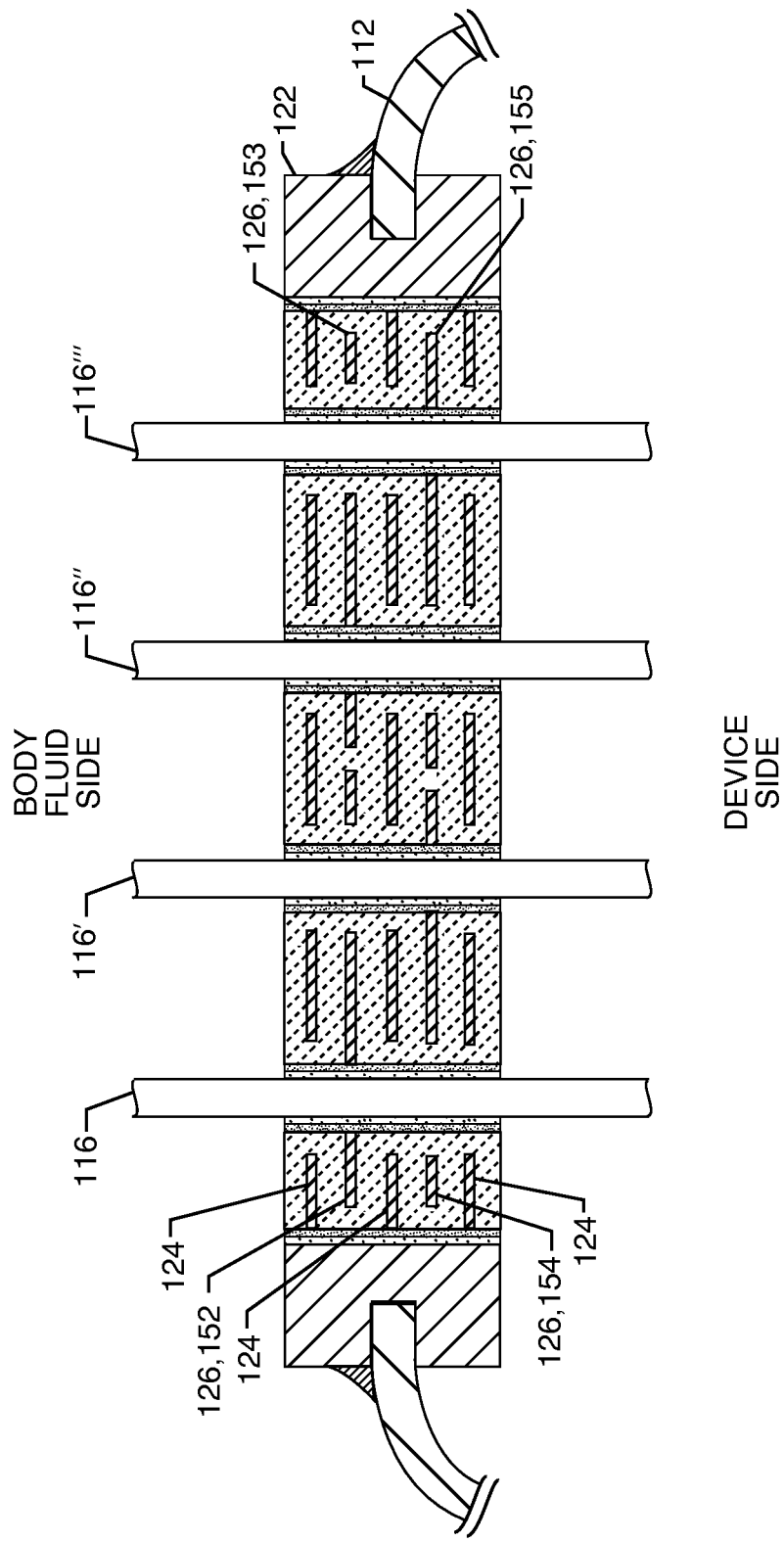
FIG. 41 is a sectional view of an exemplary embodiment of the present invention illustrating a quadpolar feedthrough filter capacitor assembly having coplanar and offset active electrode plates.
Figure 42:
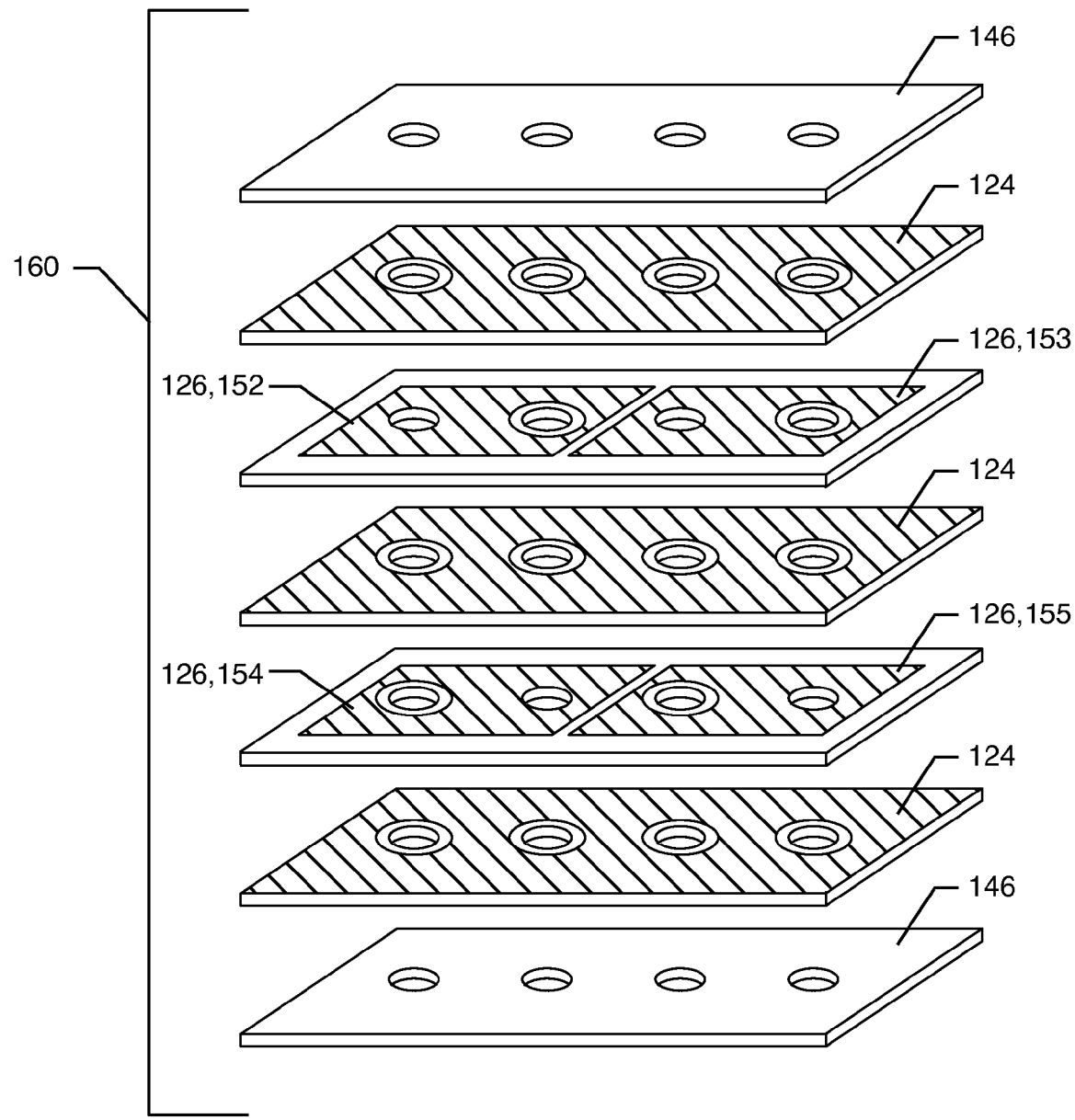
FIG. 42 is an exploded view of the capacitor structure of FIG. 41 illustrating the stacking of active and ground electrode plates.

FIG. 41 is very similar to the inline quadpolar composite hermetic seal-feedthrough capacitor previously illustrated in FIG. 31. The difference is clearly shown in comparing FIG. 42, which is the blown-up electrode plate stack 160 taken from FIG. 41. In this case, there are only two active electrode plate layers each containing two active electrode plate patterns. Active electrode plates 126, 152 and 126, 153 are shown on the same layer or plane. In a similar manner, active electrode plates 126, 154 and 126, 155 are also shown on the same plane. This is in, marked contrast to FIG. 34 where each active electrode is shown in a single plane. The stack-up in FIG. 42 is not quite as efficient as FIG. 34, however, it does simplify the silk-screening and manufacturing of the composite hermetic seal-feedthrough capacitor. In FIG. 42, there is a small loss of ECA efficiency due to the required spacing between the active electrodes on each plane. This represents an "in between" approach where the efficiency has been increased, but not as much as previously illustrated in FIG. 34. The manufacturing trade-off is that the structure as illustrated in FIGS. 41 and 42 is easier to manufacture.

Figure 43:
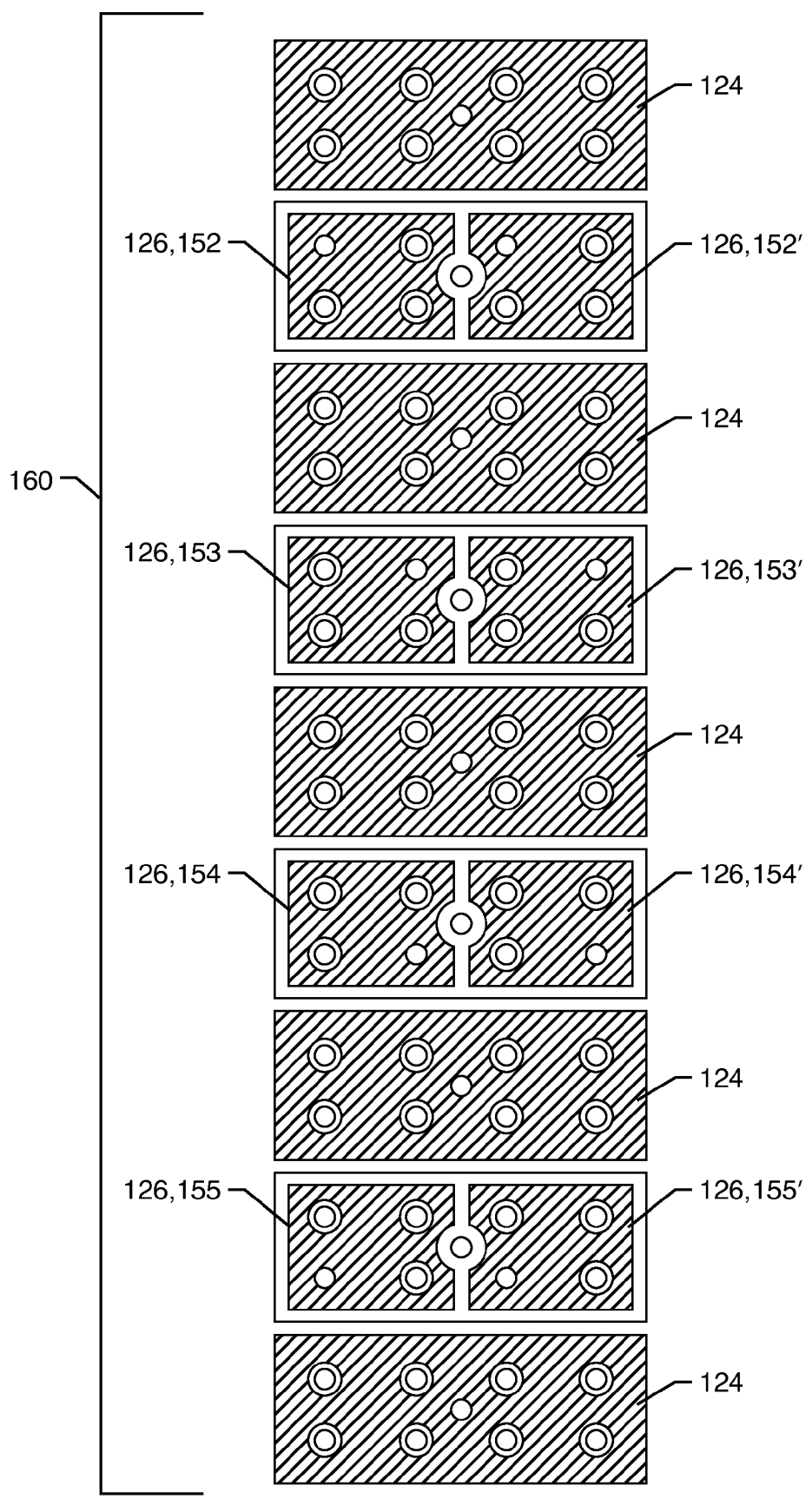
FIG. 43 is an exploded view of an exemplary embodiment of the present invention illustrating a structure of an octapolar offset feedthrough filter capacitor with an internal ground and coplanar active electrode plates.

FIG. 43 is very similar to FIG. 42 except that FIG. 43 illustrates an octapolar feedthrough capacitor. The same technique is used in FIG. 43 as was previously described in FIG. 42, wherein there are two active electrode plates on each one of the active planes or layers. The structure might be very important when one has a very strict limitation on the overall height of the composite feedthrough capacitor-hermetic terminal. This reduces the number of electrode plate layers by a factor of almost two. The ground plates as illustrated in FIG. 43 are interesting in that they are composite ground plates. In other words, they are grounded at a center pin and also grounded at both ends as shown. This is important when the form factor of the electrode plates tends towards long and narrow. It is undesirable to have inductance built up in a ground plate as this will reduce the filtering efficiency on pins that are located a long distance from ground. Accordingly, this composite structure makes for good solid RF design. Multipoint grounding for feedthrough capacitors was taught by U.S. Pat. No. 6,765,779. For example, see FIG. 42 of the '779 patent.

Figure 44:
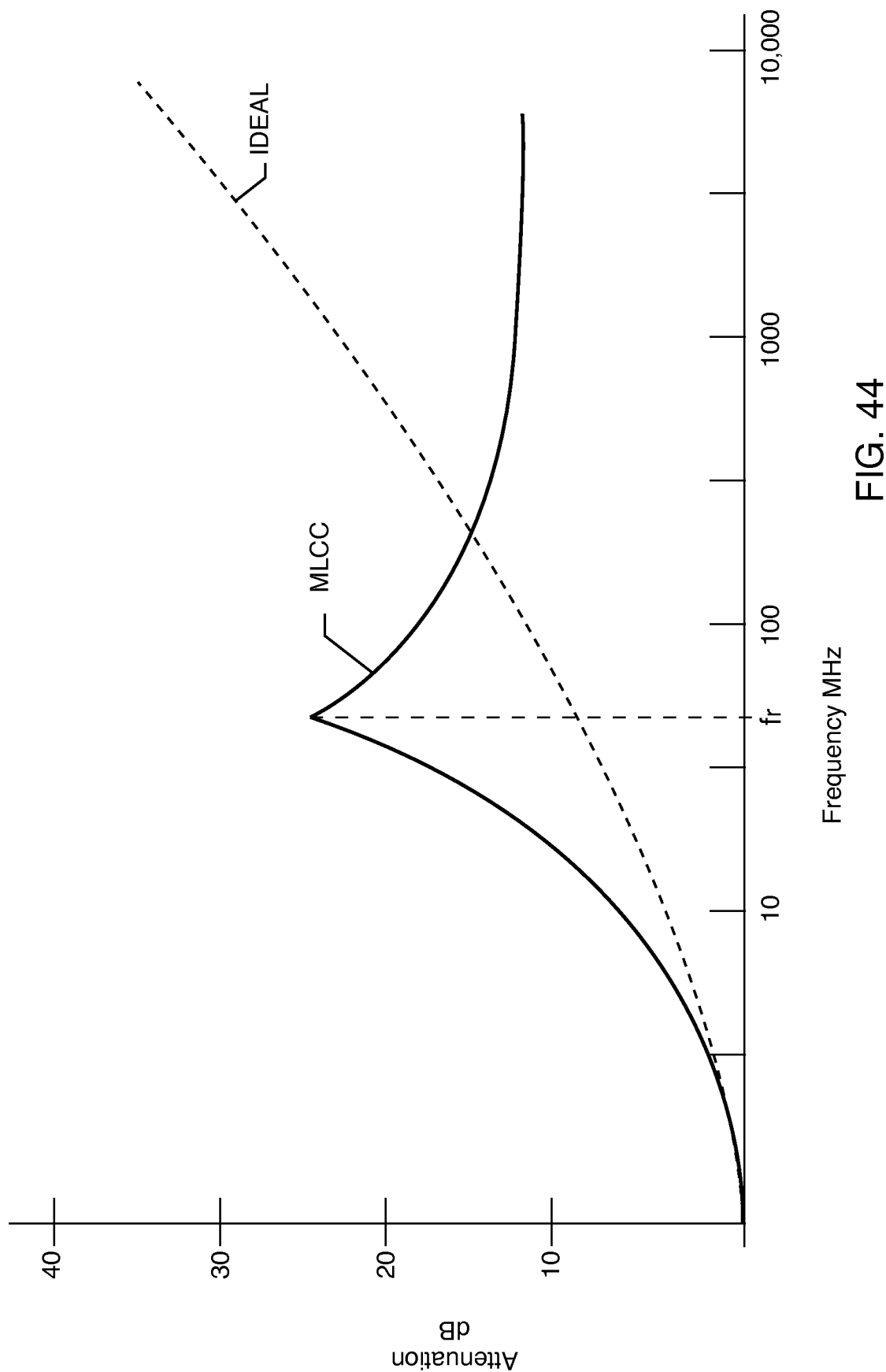
FIG. 44 illustrates a curve of attenuation versus frequency for a low capacitance value feedthrough capacitor.

FIG. 44 illustrates a curve of attenuation versus frequency for a low capacitance value feedthrough capacitor. This is illustrated with a low capacitance value that would be achieved from the composite feedthrough capacitor-hermetic seals of the present invention. The value of feedthrough capacitance is low because of the need to use physically very strong insulative materials with a k generally less than 10. The frequency versus attenuation curve as illustrated in FIG. 44 is not adequate in and of itself to provide enough protection to AIMDs, such as cardiac pacemakers against environmental emitters, such as cellular telephones, microwave ovens and the like. In other words, the attenuation versus frequency, as shown in FIG. 44 is insufficient to ensure the device will not adversely react to EMI from such emitters.

Figure 45:
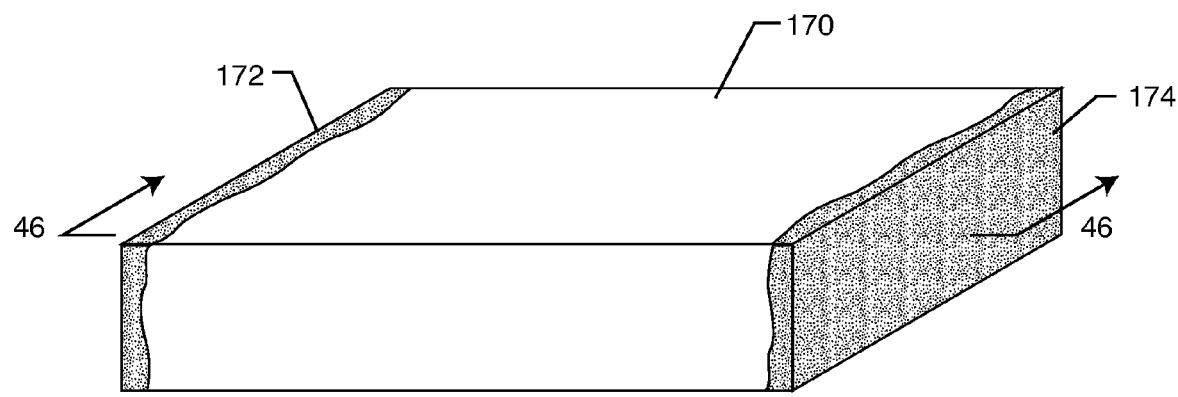
FIG. 45 is a perspective view of a monolithic chip capacitor.

FIG. 45 illustrates a prior art MLCC chip capacitor 170. It has end terminations 172 and 174.

Figure 46:
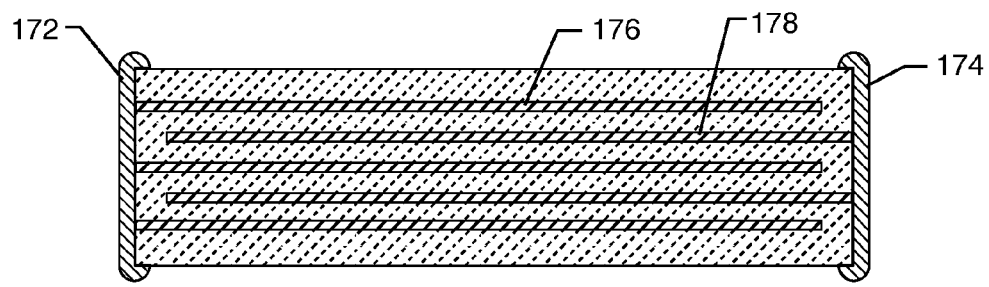
FIG. 46 is a sectional view of the monolithic chip capacitor of FIG. 45 taken along line 46-46.

FIG. 46 illustrates a cross-section of the MLCC capacitor taken generally from section 46-46 from FIG. 45. Shown are internal electrode plates 176 and 178.

Figure 47:
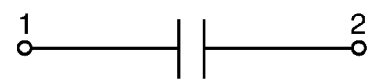
FIG. 47 is an electrical schematic corresponding to the monolithic chip capacitor of FIG. 45.
Figure 48:
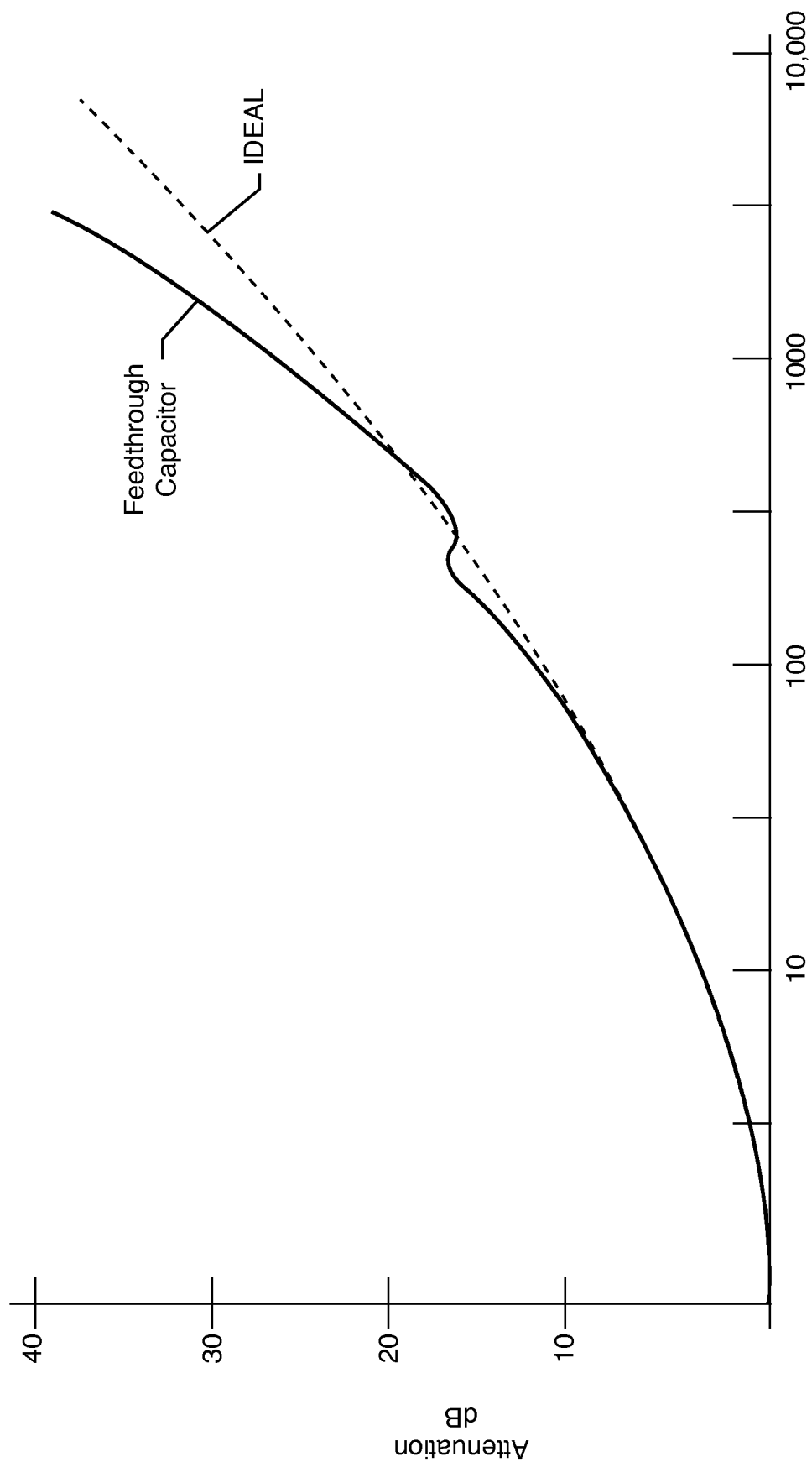
FIG. 48 is a graph illustrating attenuation versus frequency for the monolithic chip capacitor of FIG. 45.

FIG. 47 is the schematic diagram of the prior art MLCC chip capacitor previously illustrated in FIGS. 45 and 46. Referring once again to FIG. 47, one can see that this is a two terminal device with terminals one and two shown. There is no particular ground side to this capacitor, so it can be installed with either polarity. Because it is of two terminal construction, it has a substantial amount of internal inductance. This internal inductance causes the capacitor to have a self-resonant frequency. In this regard, it acts as a L-C trap filter. A typical attenuation curve for the MLCC capacitor of FIG. 45 is shown in FIG. 48. This shows the attenuation versus frequency. All two-terminal capacitors do exhibit self-resonance $f_r$. The resonant frequency for the feedthrough of MLCC capacitor of FIG. 45 $f_r$ is shown on the frequency axis in FIG. 48. As the frequency approaches resonance, the attenuation of the MLCC chip capacitor significantly exceeds that of a theoretical or ideal capacitor. In fact, when its inductive reactance is equal to its capacitive reactance, the capacitor would tend to look like a short circuit and have a very high degree of attenuation. The reason that attenuation is not infinite is due to internal resistive losses (equivalent series resistance or ESR) of the capacitor.

Referring once again to FIG. 48, an MLCC capacitor by itself does not provide adequate filtering for an active implantable medical device, such as a cardiac pacemaker. For example, the attenuation at 1000 MHz is less than 30 dB, which does not provide adequate attenuation against cell phones and other high frequency emitters. This leads to a conundrum. The composite feedthrough capacitor-hermetic seal of the present invention provides good high frequency filtering, but does not provide adequate filtering across the entire frequency range. On the other hand, the MLCC chip capacitor, by itself, does not provide adequate attenuation at high frequency. The solution, in the present invention, is a dual stage filter as illustrated in FIG. 49.

Figure 49:
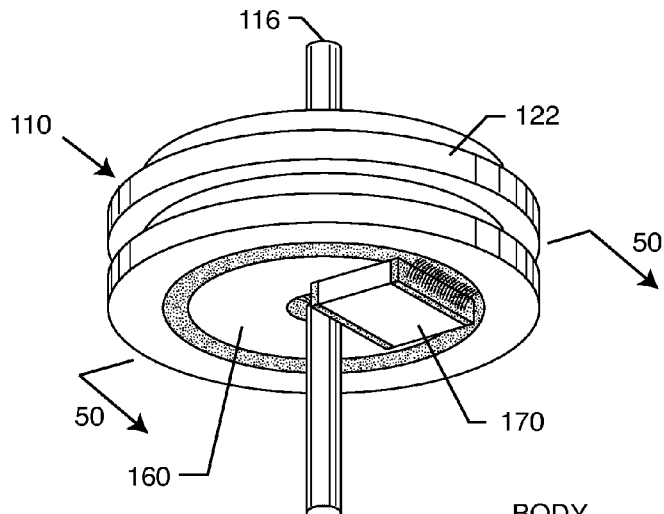
FIG. 49 is a perspective view of a unipolar feedthrough filter capacitor assembly with a monolithic chip capacitor.

FIG. 49 is illustrated as a unipolar composite feedthrough capacitor-hermetic terminal just for simplicity in drawing. The dual stage filtering concept is equally applicable to any of the drawings herein, including bipolar, quadpolar, hexpolar and the like. Referring once again to FIG. 49, one can see that a two-terminal chip capacitor 170 has been attached between lead 116 and ferrule 122 of a composite hermetic seal-feedthrough capacitor 160.

Figure 50:
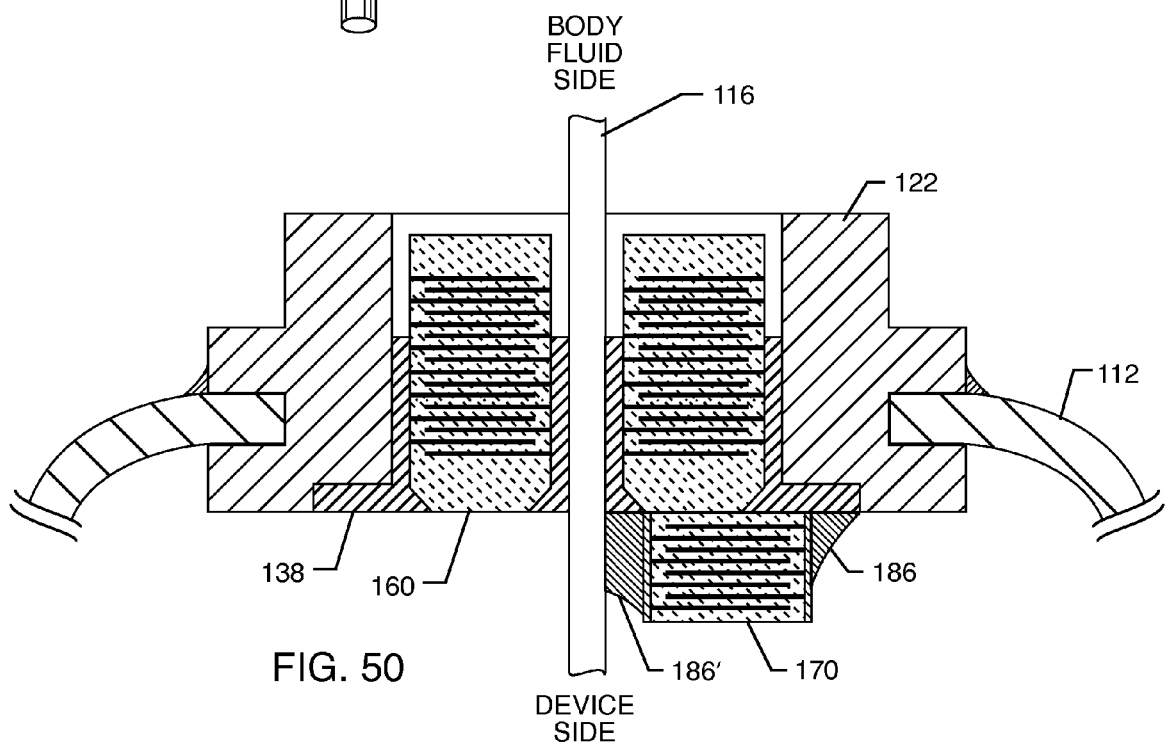
FIG. 50 is a sectional view of the structure of FIG. 49 taken along line 50-50.
Figure 51:
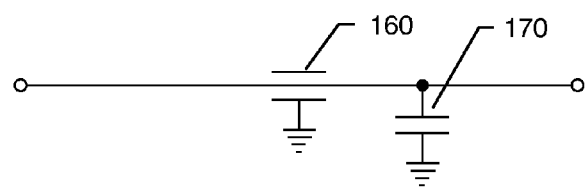
FIG. 51 is an electrical schematic corresponding to the structure of FIGS. 49-50.

FIG. 50 is a sectional view taken generally from section 50-50 from FIG. 49. It shows the internal construction from the integrated feedthrough capacitor hermetic seal 160 and also shows the cross-section of the MLCC capacitor electrode plates 170. One can see that these two capacitors effectively are electrically in parallel. This is better understood by referring to the schematic diagram in FIG. 51, which shows a feedthrough capacitor 160 disposed in parallel with MLCC capacitor chip 170. Because the integrated hermetic seal feedthrough capacitor 160 is particularly effective at filtering high frequencies, it is not necessary that the MLCC chip capacitor 170 be bonded directly to the hermetic terminals assembly as shown. In fact, it can be disposed at any distance inside of the AIMD, including along the flex cable or even on a circuit board.

Figure 52:
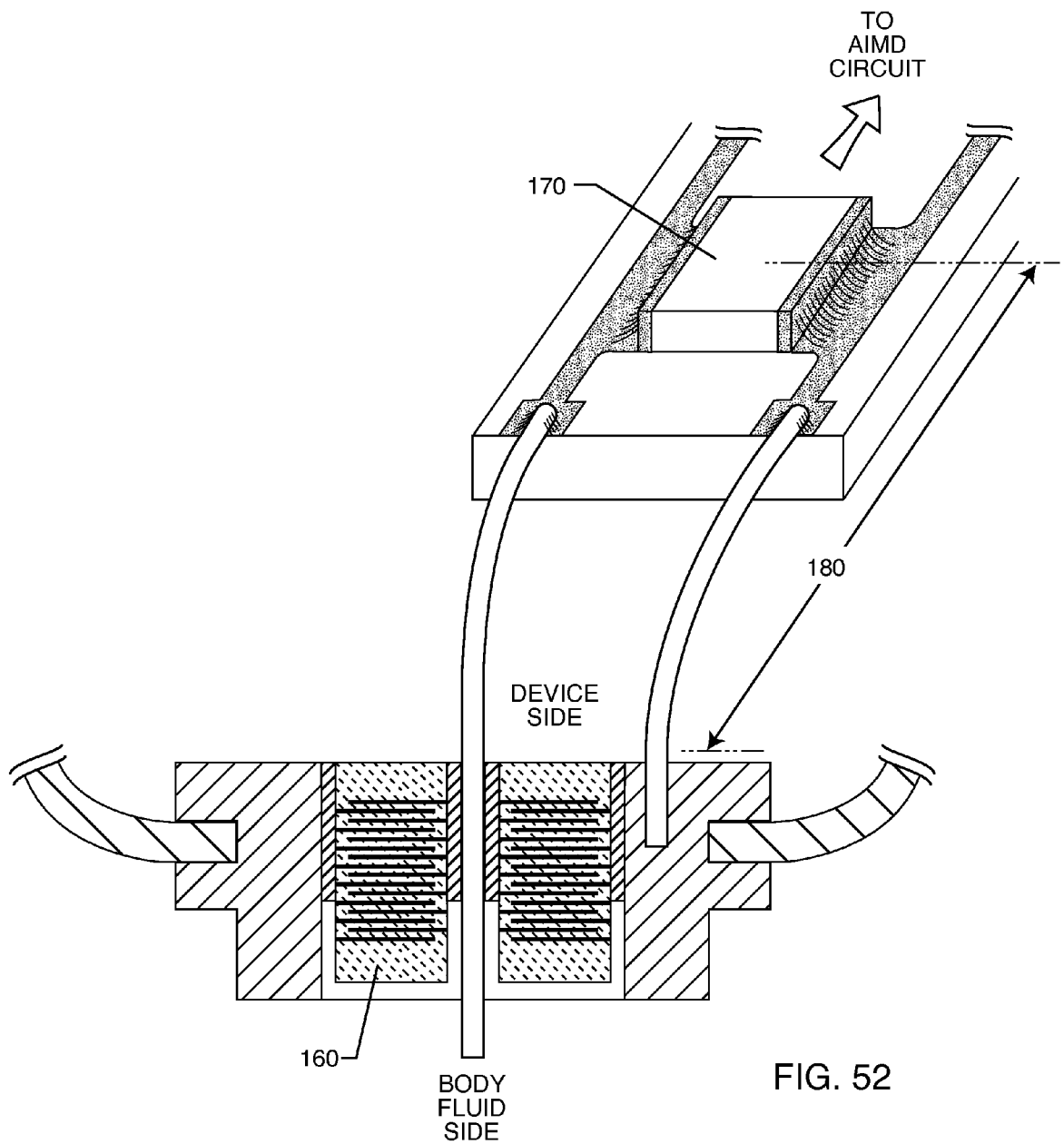
FIG. 52 is a part sectional and part schematic view of a unipolar feedthrough filter capacitor assembly with a monolithic chip capacitor disposed away from the ferrule.

FIG. 52 illustrates the MLCC chip capacitor of FIG. 50 disposed at a distance from the integrated hermetic terminal feedthrough capacitor 160 where it will still provide effective low frequency EMI filtering. Re-radiation of EMI is not too big of a concern since the low frequency signals have a relatively long wave length. In other words, the physical length 180 is so short for low wave length frequencies that it will not act as an effective re-radiating antenna inside of the device. As previously discussed, the chip capacitor 170, could be disposed on a remote circuit board as shown or even along the flex cable.

Figure 53:
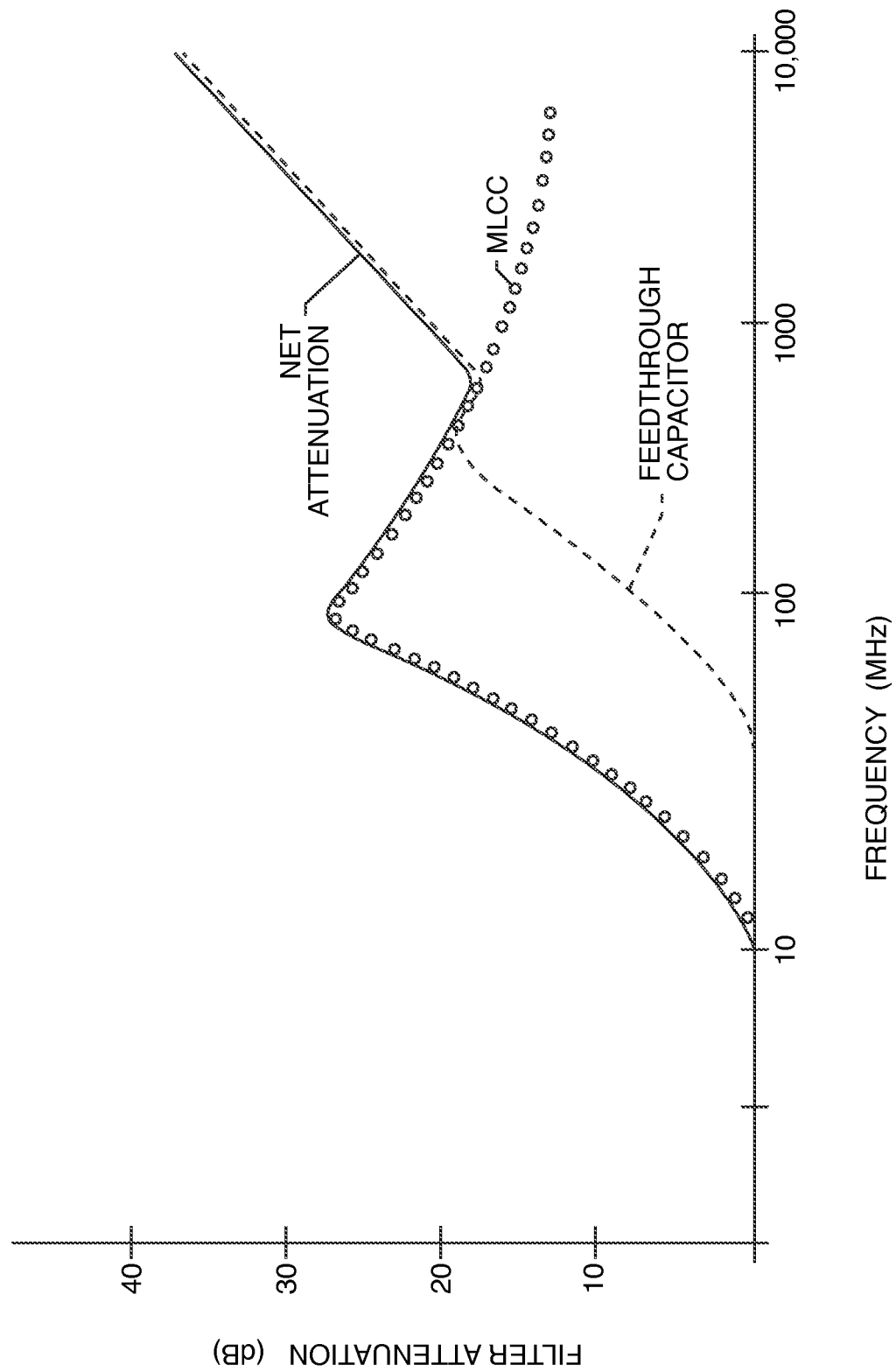
FIG. 53 is a graph illustrating attenuation versus frequency for the combined structure of a feedthrough filter capacitor and a monolithic chip capacitor shown in FIGS. 49-52.

FIG. 53 is a frequency versus overall filter attenuation curve showing the combined attenuation of the dual stage filter consisting of the integrated feedthrough capacitor hermetic seal with one or more added MLCC chip capacitors. The MLCC capacitor curve is shown by circles and the feedthrough capacitor performance is shown by the dashed line. The composite curve (the addition of the two other curves) is shown as a solid line. When one traces the solid line, one sees that adequate attenuation is provided across a very broad frequency range. Accordingly, in the dual stage filter, one or more MLCC chip capacitors (or equivalent capacitor technologies) are added to the composite feedthrough capacitor-hermetic terminal to provide broadband filter attenuation.

It should be obvious to those skilled in the art that all of the descriptions herein are equally applicable to other types of AIMDs. These include implantable cardioverter defibrillators (ICDs), neurostimulators, including deep brain stimulators, spinal cord stimulators, cochlear implants, incontinence stimulators and the like, and drug pumps. The present invention is also applicable to a wide variety of minimally invasive AIMDs. For example, in certain hospital cath lab procedures, one can insert an AIMD for temporary use such as a probe, catheter or femoral artery ICD. Ventricular assist devices also can fall into this type of category. This list is not meant to be limiting, but is only example of the applications of the novel technology currently described herein. Furthermore, the present invention disclosed herein is applicable to all types of hermetic seal packages, including those packages typically used in aerospace, military, commercial aviation, and other external medical and the like. In other words, hermetically sealed packages are very common in places other than in medical implants, therefore, the present invention has applicability to these other applications as well as active implantable medical devices.

Although several embodiments have been described in detail for purposes of illustration, various modifications may be made to each without departing from the scope and spirit of the invention. Accordingly, the invention is not to be limited, except as by the appended claims.

What is claimed is:

1. A multipolar feedthrough filter capacitor hermetic seal assembly for an active implantable medical device, the multipolar feedthrough filter capacitor hermetic seal assembly comprising:
   a) a ferrule of an electrically conductive material comprising a ferrule opening defined by a surrounding ferrule sidewall;
   b) a feedthrough filter capacitor, comprising:
      i) an insulator defined by an insulator sidewall having an outer insulator surface extending from a first insulator end to a second insulator end;
      ii) at least one first active electrode plate, at least one second active electrode plate, and at least one ground electrode plate supported in the insulator in an interleaved spaced relation with each other;
iii) at least two insulator passages extending through the insulator to the first and second insulator ends;
iv) a first terminal pin disposed in a first one of the at least two insulator passageways, and a second terminal pin disposed in a second one of the at least two insulator passageways;
v) a first hermetic seal electrically connecting the first active electrode plate to the first terminal pin and physically sealing the first terminal pin to the insulator at the first insulator passageway, wherein the first hermetic seal does not physically contact the second active electrode plate and the ground plate; and
vi) a second hermetic seal electrically connecting the second active electrode plate to the second terminal pin and physically sealing the second terminal pin to the insulator at the second insulator passageway, wherein the second hermetic seal does not physically contact the first active electrode plate and the ground plate; and
c) wherein with the insulator at least partially disposed in the ferrule opening, a third hermetic seal electrically connects the at least one ground electrode plate at the outer insulator surface to the ferrule and physically seals the insulator to the ferrule.

2. The multipolar feedthrough filter capacitor hermetic seal assembly of claim 1, wherein the first and second conductive terminal pins are in non-conductive relation to the conductive ferrule.

3. The multipolar feedthrough filter capacitor hermetic seal assembly of claim 1, wherein the conductive ferrule is circumferentially disposed about the feedthrough filter capacitor.

4. The multipolar feedthrough filter capacitor hermetic seal assembly of claim 3, wherein the feedthrough filter capacitor is disposed entirely within the ferrule opening.

5. The multipolar feedthrough filter capacitor hermetic seal assembly of claim 1, wherein the at least one ground electrode plate comprises a plurality of ground electrode plates.

6. The multipolar feedthrough filter capacitor hermetic seal assembly of claim 5, wherein there is at least one ground electrode plate disposed intermediate the respective first and second insulator ends and the interleaved first and second active electrode plates.

7. The multipolar feedthrough filter capacitor hermetic seal assembly of claim 1, wherein the insulator comprises a monolithic insulator substrate.

8. The multipolar feedthrough filter capacitor hermetic seal assembly of claim 1, wherein the insulator comprises alumina.

9. The multipolar feedthrough filter capacitor hermetic seal assembly of claim 1, wherein the insulator has a dielectric constant below 10.

10. The multipolar feedthrough filter capacitor hermetic seal assembly of claim 1, including a secondary capacitor electrically coupled between the conductive ferrule and either the first or second conductive terminal pin.

11. The multipolar feedthrough filter capacitor hermetic seal assembly of claim 10, wherein the secondary capacitor comprises a secondary dielectric material having a dielectric constant above 10.

12. The multipolar feedthrough filter capacitor hermetic seal assembly of claim 10, wherein the secondary capacitor comprises a secondary dielectric material having a dielectric constant above 100.

13. The multipolar feedthrough filter capacitor hermetic seal assembly of claim 10, wherein the secondary capacitor comprises a secondary dielectric material having a dielectric constant above 1000.

14. The multipolar feedthrough filter capacitor hermetic seal assembly of claim 10, wherein the secondary capacitor comprises a dielectric substrate comprising barium titanate.

15. The multipolar feedthrough filter capacitor hermetic seal assembly of claim 10, wherein the secondary capacitor comprises a monolithic chip capacitor.

16. The multipolar feedthrough filter capacitor hermetic seal assembly of claim 10, wherein the secondary capacitor is directly attached to the conductive ferrule.

17. The multipolar feedthrough filter capacitor hermetic seal assembly of claim 10, wherein the secondary capacitor is configured for electrical connection to a circuit board.

18. The multipolar feedthrough filter capacitor hermetic seal assembly of claim 10, wherein the secondary capacitor is not directly attached to the conductive ferrule.

19. The multipolar feedthrough filter capacitor hermetic seal assembly of claim 1, wherein the feedthrough filter capacitor is defined as comprising a body fluid side and a device side, and wherein both the body fluid side and the device side are biocompatible.

20. The multipolar feedthrough filter capacitor hermetic seal assembly of claim 1 wherein the first, second and third hermetic seals comprise an adhesive layer contacting the insulator, a braze material contacting the respective first and second terminal pins and the ferrule, and an intermediate wetting layer contacting the adhesive layer and the braze material.

21. A multipolar feedthrough filter capacitor hermetic seal assembly for an active implantable medical device, the multipolar feedthrough filter capacitor hermetic seal assembly comprising:
a) a ferrule of an electrically conductive material comprising a ferrule opening defined by a surrounding ferrule sidewall having an inner ferrule surface;
b) a feedthrough filter capacitor, comprising:
i) an insulator defined by an insulator sidewall having an outer insulator surface extending from a first insulator end to a second insulator end, wherein the insulator has a dielectric constant below 10;
ii) at least one first active electrode plate, at least one second active electrode plate, and at least one ground electrode plate supported in the insulator in an interleaved spaced relation with each other;
iii) at least one first insulator passageway extending through the insulator to the first and second insulator ends, and at least one second insulator passageway extending through the insulator to the first and second insulator ends;
iv) a first terminal pin disposed in the at least one first insulator passageway, and a second terminal pin disposed in the at least one second insulator passageway;
v) a first hermetic seal electrically connecting the first active electrode plate to the first terminal pin and physically sealing the first terminal pin to the insulator at the first insulator passageway, wherein the first hermetic seal does not physically contact the second active electrode plate and the ground plate; and
vi) a second hermetic seal electrically connecting the second active electrode plate to the second terminal pin and physically sealing the second terminal pin to the insulator at the second insulator passageway, wherein the second hermetic seal does not physically contact the first active electrode plate and the ground plate; and c) wherein with the insulator at least partially disposed in the ferrule opening, a third hermetic seal electrically connects the at least one ground electrode plate at the outer insulator surface to the ferrule and physically seals the insulator to the ferrule; and d) a secondary capacitor electrically coupled between the conductive ferrule and either the first or second conductive terminal pin.

22. The multipolar feedthrough filter capacitor hermetic seal assembly of claim 21, wherein the first and second conductive terminal pins are in non-conductive relation to the conductive ferrule.

23. The multipolar feedthrough filter capacitor hermetic seal assembly of claim 21, wherein the conductive ferrule is circumferentially disposed about the feedthrough filter capacitor.

24. The multipolar feedthrough filter capacitor hermetic seal assembly of claim 23, wherein the feedthrough filter capacitor is disposed entirely within the ferrule opening.

25. The multipolar feedthrough filter capacitor hermetic seal assembly of claim 21, wherein the at least one ground electrode plate comprises a plurality of ground electrode plates.

26. The multipolar feedthrough filter capacitor hermetic seal assembly of claim 25, wherein there is at least one ground electrode plate disposed intermediate the respective first and second insulator ends and the interleaved first and second active electrode plates.

27. The multipolar feedthrough filter capacitor hermetic seal assembly of claim 21, wherein the insulator comprises a monolithic dielectric substrate.

28. The multipolar feedthrough filter capacitor hermetic seal assembly of claim 27, wherein the insulator comprises alumina.

29. The multipolar feedthrough filter capacitor hermetic seal assembly of claim 21, wherein the secondary capacitor comprises a secondary dielectric material having a dielectric constant above 1000.

30. The multipolar feedthrough filter capacitor hermetic seal assembly of claim 21, wherein the secondary capacitor comprises a dielectric substrate comprising barium titanate.

31. The multipolar feedthrough filter capacitor hermetic seal assembly of claim 21, wherein the secondary capacitor comprises a monolithic chip capacitor.

32. The multipolar feedthrough filter capacitor hermetic seal assembly of claim 21, wherein the secondary capacitor is directly attached to the conductive ferrule.

33. The multipolar feedthrough filter capacitor hermetic seal assembly of claim 21, wherein the secondary capacitor is configured for electrical connection to a circuit board.

34. The multipolar feedthrough filter capacitor hermetic seal assembly of claim 21, wherein the secondary capacitor is not directly attached to the conductive ferrule.

35. The multipolar feedthrough filter capacitor hermetic seal assembly of claim 21, wherein the feedthrough filter capacitor is defined as comprising a body fluid side and a device side, and wherein both the body fluid side and the device side are biocompatible.

36. The multipolar feedthrough filter capacitor hermetic seal assembly of claim 21 wherein the first, second and third hermetic seals comprise an adhesive layer contacting the insulator, a braze material contacting the respective first and second terminal pins and the ferrule, and an intermediate wetting layer contacting the adhesive layer and the braze material.

37. A multipolar feedthrough filter capacitor hermetic seal assembly for an active implantable medical device, the multipolar feedthrough filter capacitor hermetic seal assembly comprising:

a) a ferrule of an electrically conductive material comprising a ferrule opening defined by a surrounding ferrule sidewall;

b) a feedthrough filter capacitor, comprising:
  i) an insulator defined by an insulator sidewall having an outer insulator surface extending from a first insulator end to a second insulator end;
  ii) at least one first active electrode plate, at least one second active electrode plate, and a plurality of ground electrode plates supported in the insulator in an interleaved spaced relation with each other, wherein there is at least one ground electrode plate disposed intermediate the respective first and second insulator ends and the interleaved first and second active electrode plates;
  iii) at least one first, second and third insulator passageways, wherein at least the first and second passageways extend through the insulator to the first and second insulator ends;
  iv) a first terminal pin disposed in the first insulator passageway, a second terminal pin disposed in the second insulator passageway, and a third ground pin disposed in the third insulator passageway, wherein the first and second terminal pins are intermediate the third ground pin and the ferrule;
  v) a first hermetic seal electrically connecting the first active electrode plate to the first terminal pin and physically sealing the first terminal pin to the insulator at the first insulator passageway, wherein the first hermetic seal does not physically contact the second active electrode plate and the ground plate; and
  vi) a second hermetic seal electrically connecting the second active electrode plate to the second terminal pin and physically sealing the second terminal pin to the insulator at the second insulator passageway, wherein the second hermetic seal does not physically contact the first active electrode plate and the ground plate; and c) wherein with the insulator at least partially disposed in the ferrule opening, a third hermetic seal electrically connects the at least one ground electrode plate at the outer insulator surface to the ferrule and physically seals the insulator to the ferrule.

38. The multipolar feedthrough filter capacitor hermetic seal assembly of claim 37, wherein the third insulator passageway extends through the insulator to the first and second insulator ends and wherein a fourth hermetic seal electrically connects the at least one ground electrode plate to the third ground pin and physically seals the third ground pin to the insulator at the third insulator passageway, wherein the fourth hermetic seal does not physically contact the first and second active electrode plates.

39. The multipolar feedthrough filter capacitor hermetic seal assembly of claim 37, wherein the conductive ferrule is circumferentially disposed about the feedthrough filter capacitor.

40. The multipolar feedthrough filter capacitor hermetic seal assembly of claim 39, wherein the feedthrough filter capacitor is disposed entirely within the ferrule opening.

41. The multipolar feedthrough filter capacitor hermetic seal assembly of claim 37, wherein the first and second conductive terminal pins are in non-conductive relation to the ferrule.

42. The multipolar feedthrough filter capacitor hermetic seal assembly claim 37, wherein the insulator comprises alumina.

43. The multipolar feedthrough filter capacitor hermetic seal assembly of claim 37, wherein the insulator has a dielectric constant below 10.

44. The multipolar feedthrough filter capacitor hermetic seal assembly of claim 37, including a secondary capacitor electrically coupled between the conductive ferrule and either the first or second conductive terminal pin.

45. The multipolar feedthrough filter capacitor hermetic seal assembly of claim 44, wherein the secondary capacitor comprises a dielectric substrate comprising barium titanate.

46. The multipolar feedthrough filter capacitor hermetic seal assembly of claim 44, wherein the secondary capacitor comprises a monolithic chip capacitor.

47. The multipolar feedthrough filter capacitor hermetic seal assembly of claim 44, wherein the secondary capacitor is directly attached to the conductive ferrule.

48. The multipolar feedthrough filter capacitor hermetic seal assembly of claim 44, wherein the secondary capacitor is configured for electrical connection to a circuit board.

49. The multipolar feedthrough filter capacitor hermetic seal assembly of claim 44, wherein the secondary capacitor is not directly attached to the conductive ferrule.

50. The multipolar feedthrough filter capacitor hermetic seal assembly of claim 37, wherein the feedthrough filter capacitor is defined as comprising a body fluid side and a device side, and wherein both the body fluid side and the device side are biocompatible.

51. The multipolar feedthrough filter capacitor hermetic seal assembly of claim 38 wherein the first, second, third and fourth hermetic seals comprise an adhesive layer contacting the insulator, a braze material contacting the respective first and second terminal pins, the ferrule, and the ground pin, and an intermediate wetting layer contacting the adhesive layer and the braze material.

52. A multipolar feedthrough filter capacitor hermetic seal assembly for an active implantable medical device, the multipolar feedthrough filter capacitor hermetic seal assembly comprising:
  a) a ferrule of an electrically conductive material comprising a ferrule opening defined by a surrounding ferrule sidewall;
  b) a feedthrough filter capacitor, comprising:
    i) an insulator defined by an insulator sidewall having an outer insulator surface extending from a first insulator end to a second insulator end;
    ii) at least one first active electrode plate, at least one second active electrode plate, and at least one ground electrode plate supported in the insulator in an interleaved spaced relation with each other;
    iii) at least one first, second and third insulator passageways, each of the first, second and third insulator passageways extending through the insulator to the first and second insulator ends;
    iv) a first terminal pin disposed in the first insulator passageway, a second terminal pin disposed in the second insulator passageway, and a ground pin disposed in the third insulator passageway;
    v) a first hermetic seal electrically connecting the first active electrode plate to the first terminal pin and physically sealing the first terminal pin to the insulator at the first insulator passageway, wherein the first hermetic seal does not physically contact the second active electrode plate and the ground plate;
    vi) a second hermetic seal electrically connecting the second active electrode plate to the second terminal pin and physically sealing the second terminal pin to the insulator at the second insulator passageway, wherein the second hermetic seal does not physically contact the first active electrode plate and the ground plate; and
    vii) a third hermetic seal electrically connecting the ground electrode plate to the third ground pin and physically sealing the third ground pin to the insulator at the third insulator passageway, wherein the third hermetic seal does not physically contact the first and second active electrode plates; and
  c) wherein with the insulator at least partially disposed in the ferrule opening, a fourth hermetic seal electrically connects the at least one ground electrode plate at the outer insulator surface to the ferrule and physically seals the insulator to the ferrule.

53. The multipolar feedthrough filter capacitor hermetic seal assembly of claim 52, wherein the insulator comprises alumina.

54. The multipolar feedthrough filter capacitor hermetic seal assembly of claim 52, wherein the insulator has a dielectric constant below 10.

55. The multipolar feedthrough filter capacitor hermetic seal assembly of claim 52, including a secondary capacitor electrically coupled between the conductive ferrule and either the first or second conductive terminal pin.

56. The multipolar feedthrough filter capacitor hermetic seal assembly of claim 55, wherein the secondary capacitor comprises a secondary dielectric material having a dielectric constant above 1000.

57. The multipolar feedthrough filter capacitor hermetic seal assembly of claim 55, wherein the secondary capacitor comprises a dielectric substrate comprising barium titanate.

58. The multipolar feedthrough filter capacitor hermetic seal assembly of claim 52, wherein the feedthrough filter capacitor is defined as comprising a body fluid side and a device side, and wherein both the body fluid side and the device side are biocompatible.

59. The multipolar feedthrough filter capacitor hermetic seal assembly of claim 52 wherein the first, second, third and fourth hermetic seals comprise an adhesive layer contacting the insulator, a braze material contacting the respective first and second terminal pins, the ground pin, and the ferrule, and an intermediate wetting layer contacting the adhesive layer and the braze material.

60. A multipolar feedthrough filter capacitor hermetic seal assembly for an active implantable medical device, the multipolar feedthrough filter capacitor hermetic seal assembly comprising:
  a) a ferrule of an electrically conductive material comprising a ferrule opening defined by a surrounding ferrule sidewall;
  b) a feedthrough filter capacitor, comprising:
    i) an insulator defined by an insulator sidewall having an outer insulator surface extending from a first insulator end to a second insulator end;
    ii) at least one first active electrode plate, at least one second active electrode plate, and a plurality of ground electrode plates supported in the insulator in an interleaved spaced relation with each other, wherein there is at least one ground electrode plate disposed intermediate the respective first and second insulator ends and the interleaved first and second active electrode plates;

iii) at least two insulator passageways extending through the insulator to the first and second insulator ends;

iv) a first terminal pin disposed in a first one of the insulator passageways, and a second terminal pin disposed in a second one of the insulator passageways;

v) a first hermetic seal electrically connecting the first active electrode plate to the first terminal pin and physically sealing the first terminal pin to the insulator at the first insulator passageway, wherein the first hermetic seal does not physically contact the second active electrode plate and the ground plate;

vi) a second hermetic seal electrically connecting the second active electrode plate to the second terminal pin and physically sealing the second terminal pin to the insulator at the second insulator passageway, wherein the second hermetic seal does not physically contact the first active electrode plate and the ground plate; and c) wherein with the insulator at least partially disposed in the ferrule opening, a third hermetic seal electrically connects the plurality of ground electrode plates at the outer insulator surface to the ferrule and physically seals the insulator to the ferrule.

61. The multipolar feedthrough filter capacitor hermetic seal assembly of claim 60, wherein the insulator comprises alumina.

62. The multipolar feedthrough filter capacitor hermetic seal assembly of claim 60, wherein the insulator has a dielectric constant below 10.

63. The multipolar feedthrough filter capacitor hermetic seal assembly of claim 60, including a secondary capacitor electrically coupled between the conductive ferrule and either the first or second conductive terminal pin.

64. The multipolar feedthrough filter capacitor hermetic seal assembly of claim 63, wherein the secondary capacitor comprises a secondary dielectric material having a dielectric constant above 1000.

65. The multipolar feedthrough filter capacitor hermetic seal assembly of claim 64, wherein the secondary capacitor comprises a dielectric substrate comprising barium titanate.

66. The multipolar feedthrough filter capacitor hermetic seal assembly of claim 60 defined as comprising a body fluid side and a device side, and wherein both the body fluid side and the device side are biocompatible.

67. The multipolar feedthrough filter capacitor hermetic seal assembly of claim 60 wherein the first, second and third hermetic seals comprise an adhesive layer contacting the insulator, a braze material contacting the respective first and second terminal pins and the ferrule, and an intermediate wetting layer contacting the adhesive layer and the braze material.

68. A multipolar feedthrough filter capacitor hermetic seal assembly for an active implantable medical device, the multipolar feedthrough filter capacitor hermetic seal assembly comprising:

a) a ferrule of an electrically conductive material comprising a ferrule opening defined by a surrounding ferrule sidewall;

b) a feedthrough filter capacitor, comprising:

i) an insulator defined by an insulator sidewall having an outer insulator surface extending from a first insulator end to a second insulator end;

ii) at least one first active electrode plate, at least one second active electrode plate, at least one third active electrode plate, at least one fourth active electrode plate, and a plurality of ground electrode plates supported in the insulator, wherein the first and second active electrode plates are disposed substantially within a first plane in non-conductive relation with each other, and wherein the third and fourth active electrode plates are disposed substantially within a second plane in non-conductive relation with each other, and wherein at least one of the ground electrode plates is disposed between the first and second planes in the insulator;

iii) at least one first insulator passageway, at least one second insulator passageway, at least one third insulator passageway, and at least one fourth insulator passageway, each of the first, second, third and fourth insulator passageways extending through the insulator to the first and second insulator ends;

iv) a first terminal pin disposed in the first insulator passageway, a second terminal pin disposed in the second insulator passageway, a third terminal pin disposed in the third insulator passageway, and a fourth terminal pin disposed in the fourth insulator passageway;

v) a first hermetic seal electrically connecting the first active electrode plate to the first terminal pin and physically sealing the first terminal pin to the insulator at the first insulator passageway, wherein the first hermetic seal does not physically contact the second, third and fourth active electrode plates and the ground electrode plates;

vi) a second hermetic seal electrically connecting the second active electrode plate to the third terminal pin and physically sealing the third terminal pin to the insulator at the second insulator passageway, wherein the second hermetic seal does not physically contact the first, third and fourth active electrode plates and the ground electrode plates;

vii) a third hermetic seal electrically connecting the third active electrode plate to the second terminal pin and physically sealing the second terminal pin to the insulator at the third insulator passageway, wherein the third hermetic seal does not physically contact the first, second and fourth active electrode plates and the ground electrode plates; and viii) a fourth hermetic seal electrically connecting the fourth active electrode plate to the fourth terminal pin and physically sealing the fourth terminal pin to the insulator at the fourth insulator passageway, wherein the fourth hermetic seal does not physically contact the first, second and third active electrode plates and the ground electrode plates; and c) wherein with the insulator at least partially disposed in the ferrule opening, a fifth electrically conductive material connects the at least one ground electrode plate at the outer insulator surface to the ferrule, and wherein in addition to electrically connecting the at least one ground electrode plate to the ferrule, the fifth electrically conductive material provides a fifth hermetic seal from the insulator to the ferrule.

69. The multipolar feedthrough filter capacitor hermetic seal assembly of claim 68, wherein the first, second, third and fourth terminal pins extends along a longitudinal axis of the insulator, the longitudinal axis being substantially perpendicular to the first, second, third and fourth passageways.

70. The multipolar feedthrough filter capacitor hermetic seal assembly of claim 68, wherein the first, second, third and fourth conductive terminal pins are in non-conductive relation to the conductive ferrule.

71. The multipolar feedthrough filter capacitor hermetic seal assembly of claim 68, wherein the insulator comprises alumina.

72. The multipolar feedthrough filter capacitor hermetic seal assembly of claim 68, including a secondary capacitor electrically coupled between the conductive ferrule and either the first, second, third or fourth conductive terminal pin.

73. The multipolar feedthrough filter capacitor hermetic seal assembly of claim 72, wherein the secondary capacitor comprises a secondary dielectric material having a dielectric constant above 1000.

74. The multipolar feedthrough filter capacitor hermetic seal assembly of claim 73, wherein the secondary capacitor is directly attached to the conductive ferrule.

75. The multipolar feedthrough filter capacitor hermetic seal assembly of claim 73, wherein the secondary capacitor is configured for connection to a circuit board.

76. The multipolar feedthrough filter capacitor hermetic seal assembly of claim 68, wherein the feedthrough filter capacitor is defined as comprising a body fluid side and a device side, and wherein both the body fluid side and the device side are biocompatible.

77. The multipolar feedthrough filter capacitor hermetic seal assembly of claim 68 wherein the first, second, third, fourth and fifth hermetic seals comprise an adhesive layer contacting the insulator, a braze material contacting the respective first, third, second, and fourth terminal pins and the ferrule, and an intermediate wetting layer contacting the adhesive layer and the braze material.

78. A multipolar feedthrough filter capacitor, comprising:
a) an insulator defined by an insulator sidewall having an outer insulator surface extending from a first insulator end to a second insulator end;
b) at least one first active electrode plate, at least one second active electrode plate, and at least one ground electrode plate supported in the insulator in an interleaved spaced relation with each other;
c) at least one first insulator passageway extending through the insulator to the first and second insulator ends, and at least one second insulator passageway extending through the insulator to the first and second insulator ends;
d) a first terminal pin disposed in the at least one first insulator passageway, and a second terminal pin disposed in the at least one second insulator passageway;
e) a first hermetic seal electrically connecting the first active electrode plate to the first terminal pin and physically sealing the first terminal pin to the first insulator passageway through the insulator, wherein the first hermetic seal does not physically contact the second active electrode plate and the ground plate; and
f) a second hermetic seal electrically connecting the second active electrode plate to the second terminal pin and physically sealing the second terminal pin to the second insulator passageway through the insulator, wherein the second hermetic seal does not physically contact the first active electrode plate and the ground plate,
g) wherein the at least one ground electrode plate extends to the outer insulator surface.

79. The multipolar feedthrough filter capacitor of claim 78, wherein the at least one ground electrode plate comprises a plurality of ground electrode plates.

80. The multipolar feedthrough filter capacitor of claim 78, wherein the at least one first and second active electrode plates are disposed between the plurality of ground electrode plates.

81. The multipolar feedthrough filter capacitor of claim 78, wherein the insulator comprises a monolithic dielectric substrate.

82. The multipolar feedthrough filter capacitor of claim 78, wherein the insulator comprises alumina.

83. The multipolar feedthrough filter capacitor of claim 78, wherein the insulator has a dielectric constant below 10.

84. The multipolar feedthrough filter capacitor of claim 78, wherein the feedthrough filter capacitor is defined as comprising a body fluid side and a device side, and wherein both the body fluid side and the device side are biocompatible.

85. The multipolar feedthrough filter capacitor of claim 78, wherein the first and second hermetic seals comprise an adhesive layer contacting the insulator, a braze material contacting the respective first and second terminal pins, and an intermediate wetting layer contacting the adhesive layer and the braze material.

* * * * *